United States Patent
Boulanger et al.

(10) Patent No.: US 12,521,432 B2
(45) Date of Patent: Jan. 13, 2026

(54) PRODUCTION AND FUNCTIONALIZATION OF NANOPARTICLES DERIVED FROM PHAGE T5 AND THERAPEUTIC USES

(71) Applicants: CENTRE NATIONAL DE LA RECHERCHE SCIENTIFIQUE (CNRS), Paris (FR); UNIVERSITE PARIS-SACLAY, Gif-sur-Yvette (FR)

(72) Inventors: Pascale Boulanger, Limours (FR); Emeline Vernhes, Toulouse (FR); Nicolas Ducrot, Igny (FR); Linda Larbi Cherif, Maisons Alfort (FR); Karim Benihoud, Paris (FR)

(73) Assignees: CENTRE NATIONAL DE LA RECHERCHE SCIENTIFIQUE (CNRS), Paris (FR); UNIVERSITE PARIS-SACLAY, Saint Aubin (FR)

( * ) Notice: Subject to any disclaimer, the term of this patent is extended or adjusted under 35 U.S.C. 154(b) by 966 days.

(21) Appl. No.: 17/761,403

(22) PCT Filed: Sep. 18, 2020

(86) PCT No.: PCT/FR2020/051628
§ 371 (c)(1),
(2) Date: Mar. 17, 2022

(87) PCT Pub. No.: WO2021/053309
PCT Pub. Date: Mar. 25, 2021

(65) Prior Publication Data
US 2023/0190925 A1    Jun. 22, 2023

(30) Foreign Application Priority Data

Sep. 18, 2019 (FR) ..................... 1910305

(51) Int. Cl.
| | | |
|---|---|---|
| *A61K 39/385* | (2006.01) | |
| *A61K 39/39* | (2006.01) | |
| *C07K 14/005* | (2006.01) | |
| *C12N 1/20* | (2006.01) | |
| *C12N 7/00* | (2006.01) | |
| *A61K 39/00* | (2006.01) | |

(52) U.S. Cl.
CPC ........... *A61K 39/385* (2013.01); *A61K 39/39* (2013.01); *C07K 14/005* (2013.01); *C12N 1/205* (2021.05); *C12N 7/00* (2013.01); *A61K 2039/5258* (2013.01); *A61K 2039/55566* (2013.01); *C12N 2795/10022* (2013.01); *C12N 2795/10023* (2013.01)

(58) Field of Classification Search
CPC ........... A61K 39/385; A61K 2039/572; A61K 2039/5258; A61K 2039/55566; A61K 39/39; C07K 14/005; C07K 2319/00; C07K 2319/40; C07K 2319/55; C12N 2795/10023; C12N 2795/10042; C12N 7/00; C12N 2795/10022; C12N 1/205
See application file for complete search history.

(56) References Cited

FOREIGN PATENT DOCUMENTS

| JP | H06504907 A | 6/1994 |
|---|---|---|
| JP | 2000513949 A | 10/2000 |
| JP | 2013530707 A | 8/2013 |
| WO | WO-2019045791 A1 | 3/2019 |

OTHER PUBLICATIONS

Vernhes et al. (2) (npj./vaccine 2024, vol. 9, (6), pp. 1-6. Please see Fig. 1).*
Abbas et al., *Cellular and Molecular Immunology E-Book*, Elsevier Health Sciences (Aug. 22, 2014).
AW Norman, G Litwack, Hormones, Academie Press (1997).
Dobbs, Clinical Neurotoxicology E-Book: Syndromes, Substances, Environments, Elsevier Health Sciences (Jul. 22, 2009).
Drouhet et al., *Fungal Antigens: Isolation, Purification, and Détection*, Springer Science & Business Media (Nov. 11, 2013).
Graziano et al., *Tumor Antigens and Tumor Antigen Discovery. In: Khleif S. N. (eds) Tumor Immunology and Cancer Vaccines*, 123 Cancer Treatment and Research (2005).

(Continued)

*Primary Examiner* — Bao Q Li
(74) *Attorney, Agent, or Firm* — Panitch Schwarze Belisario & Nadel LLP; Erin M. Dunston

(57) ABSTRACT

The present invention relates to phage T5 capsids that are devoid of genomic DNA from the phage and exposing, on their surface, at least one fusion protein of interest. The invention relates in particular to a phage T5 capsid that is deprived of genomic DNA from the phage and on its surface exposes at least one fusion protein, the fusion protein comprising: —at least one peptide fragment or protein fragment with at least 80% identity with a fragment of a decoration protein ph10; and —at least one functional fragment of an antigen, or at least one functional fragment of a toxin, or at least one receptor fragment, or at least one functional fragment of an addressing or targeting or transportation signal, or at least one functional fragment of an enzyme, or at least one functional fragment of a hormone, or at least one functional fragment of an antibody, or at least one antigen, or at least one toxin, or at least one receptor, or at least one addressing or targeting or transportation signal, or at least one enzyme, or at least one hormone, or at least one antibody, or any combination of these. The present invention also relates to methods for producing such a capsid and to vectors that enable the production thereof. The invention further relates to the fusion proteins of interest that are exposed on the capsid and to the nucleic acids encoding them. The invention also relates to nanoparticles comprising such functionalized capsids, pharmaceutical compositions comprising such nanoparticles and/or such functionalized capsids, and to therapeutic uses thereof, particularly as a medication and/or vaccine.

20 Claims, 10 Drawing Sheets
Specification includes a Sequence Listing.

(56) References Cited

OTHER PUBLICATIONS

IUBMB (1992), Enzyme Nomenclature, Academie Press, San Diego (1992).
Kastin, Handbook of biologically active peptides, Academie Press (2013).
Liébecq, IUPAC-IUBMB Joint Commission on Biochemical Nomenclature (JCBN) and Nomenclature Committee of IUBMB (NC-IUBMB), 43(5) Biochemistry and Molecular Biology International 1151-1156 (1997).
Nossal et al., Antigens, *Lymphoid Cells and the Immune Response*, Academie Press, (1971).
Office Action issued in counterpart Japanese Patent Application No. 2022-518200 (Aug. 27, 2024).
Parker, Protein Toxin Structure, Springer Science & Business Media (Jun. 29, 2013).
Pollard et al., Cell Biology E-Book, Elsevier Health Sciences (Nov. 1, 2016).
Robertson et al., *Engineered T4 Viral Nanoparticles for Cellular Imaging and Flow Cytometry*, 22 Bioconjugate Chem. 595-604 (2011).
Schomburg et al., *Dietmar Enzyme Databases*, 609 Methods in Molecular Biology 113-120 (2010).
Schomburg et al., Springer Handbook of Enzymes. 2 edn. Heidelberg: Springer; 2001-2009.
Van Regenmortel, Structure of Antigens, vol. 3 CRC Press (Dec. 20, 1995).
Wang et al., *Monoclonal Antibody Pharmacokinetics and Pharmacodynamies*, 84(5) Clin Pharmacol Ther. 548-558 (2008) (abstract only).
Zourob, *Récognition Receptors in Biosensors*, DOI 10.1007/978-1-4419-0919-0, Springer-Verlag New York (2010).
Chang et al., *BRENDA in 2015: exciting developments in its 25th year of existence*, 43 Nucleic Acids Research D439-D446 (2015).
Davies, P.J., *The Plant Hormones: Their Nature, Occurrence, and Functions*, Plant Hormones 1-15 (2010).
Davis et al., *The Comparative Toxicogenomics Database: update 2013*, 41 Nucleic Acids Research D1104-D1114 (2013).
Edgar et al., *High-sensitivity bacterial detection using biotin-tagged phage and quantum-dot nanocomplexes*, 103(13) PNAS 4841-4845 (Mar. 28, 2006).
Galperin et al., *The 24th annual Nucleic Acids Research database issue: a look back and upcoming changes*, 45 Nucleic Acids Research D1-D11 (2017).
Huet et al., *Correct Assembly of the Bateriophage T5 Procapsid Requires Both the Maturation Protease and the Portal Complex*, 428 Journal of Molecular Biology 165-181 (2016).
Isberg et al., *GPCRdb: an information system for G protein-coupled receptors*, 44 Nucleic Acids Research D356-D364 (2016).
Letarov et al., *Prospects of the Use of Bacteriophage-based Virus-like Particles in the Creation of Anthrax Vaccines*, 52(9) Applied Biochemistry and Microbiology 818-827 (2016).
Preux et al., *A Two-State Cooperative Expansion Converts the Procapsid Shell of Bacteriophage T5 into a Highly Stable Capsid Isomorphous to the Final Virion Head*, 425 Journal of Molecular Biology 1999-2014 (2013).
Razazan et al., *Lambda bacteriophage nanoparticles displaying GP2, a HER2/neu derived peptide, induce prophylactic and therapeutic activities against TUBO tumor model in mice*, 9(2221) Scientific Reports 1-11 (2019).
Tao et al., *Bacteriophage T4 nanoparticles for vaccine delivery against infectious diseases*, 145 Advanced Drug Delivery Reviews 57-72 (2019).
Tao et al., In vitro and in vivo *delivery of genes and proteins using the bateriophage T4 DNA packaging machine*, 110(15) PNAS 5846-5851 (Apr. 9, 2013).
Vernhes et al., *High affinity anchoring of the decoration protein pb10 onto the bacteriophage T5 capsid*, 7 Scientific Reports 1-13 (2017).
Vilariño et al., *Human Poisoning from Marine Toxins: Unknowns for Optimal Consumer Protection*, 10(8) Toxins 1-38 (Aug. 9, 2018).
Walker et al.,*Entomo-venomics: The evolution, biology and biochemistry of insect venoms*, 154 Toxicon 15-27 (Nov. 2018).
Zivanovic et al., *Insights into Bacteriophage T5 Structure from Analysis of Its Morphogenesis Genes and Protein Components*, 88(2) Journal of Virology 1162-1174 (Jan. 2014).
Tao et al., *A Bacteriophage T4 Nanoparticle-Based Dual Vaccine against Anthrax and Plague*, 9(5) MBIO 1-13 (Sep./Oct. 2018).
Preliminary Report in Appeal No. 2025-009568 in Japanese Patent Application No. JP 2022-518200, with English translation (Aug. 14, 2025).

\* cited by examiner

SEQUENCE LISTING

```
<160> NUMBER OF SEQ ID NOS: 16

<210> SEQ ID NO 1
<211> LENGTH: 167
<212> TYPE: PRT
<213> ORGANISM: Phage T5

<400> SEQUENCE: 1

Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
            20                  25                  30

Pro Ser Tyr Ala Phe Leu Arg Arg Glu Leu Gly Leu Ser Ser Ala His
        35                  40                  45

Thr Asn Arg Lys Val Trp Lys Lys Phe Val Glu Ala Tyr Gly Lys Ala
    50                  55                  60

Ile Pro Pro Ala Pro Ala Pro Pro Leu Thr Leu Ser Lys Asp Leu
65                  70                  75                  80

Thr Ala Ser Met Ser Val Glu Glu Gly Ala Ala Leu Thr Leu Ser Val
                85                  90                  95

Thr Ala Thr Gly Gly Thr Gly Pro Tyr Thr Tyr Ala Trp Thr Lys Asp
                100                 105                 110

Gly Ser Pro Ile Pro Asp Ala Ser Gly Ala Thr Tyr Thr Lys Pro Thr
            115                 120                 125

Ala Ala Ala Glu Asp Ala Gly Ser Tyr Lys Val Thr Val Thr Asp Ser
        130                 135                 140

Lys Gln Val Ser Lys Asp Ser Thr Thr Cys Ala Val Thr Val Asn Pro
145                 150                 155                 160

Thr Val Pro Gly Gly Leu Glu
                165

<210> SEQ ID NO 2
<211> LENGTH: 173
<212> TYPE: PRT
<213> ORGANISM: Artificial
<220> FEATURE:
<223> OTHER INFORMATION: pb10H6

<400> SEQUENCE: 2

Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
            20                  25                  30

Pro Ser Tyr Ala Phe Leu Arg Arg Glu Leu Gly Leu Ser Ser Ala His
        35                  40                  45

Thr Asn Arg Lys Val Trp Lys Lys Phe Val Glu Ala Tyr Gly Lys Ala
    50                  55                  60
```

Ile Pro Pro Ala Pro Pro Ala Pro Pro Leu Thr Leu Ser Lys Asp Leu
65                  70                  75                  80

Thr Ala Ser Met Ser Val Glu Glu Gly Ala Ala Leu Thr Leu Ser Val
                85                  90                  95

Thr Ala Thr Gly Gly Thr Gly Pro Tyr Thr Tyr Ala Trp Thr Lys Asp
            100                 105                 110

Gly Ser Pro Ile Pro Asp Ala Ser Gly Ala Thr Tyr Thr Lys Pro Thr
        115                 120                 125

Ala Ala Ala Glu Asp Ala Gly Ser Tyr Lys Val Thr Val Thr Asp Ser
130                 135                 140

Lys Gln Val Ser Lys Asp Ser Thr Thr Cys Ala Val Thr Val Asn Pro
145                 150                 155                 160

Thr Val Pro Gly Gly Leu Glu His His His His His His
                165                 170

<210> SEQ ID NO 3
<211> LENGTH: 80
<212> TYPE: PRT
<213> ORGANISM: Artificial
<220> FEATURE:
<223> OTHER INFORMATION: N ter pb10

<400> SEQUENCE: 3

Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
                20                  25                  30

Pro Ser Tyr Ala Phe Leu Arg Arg Glu Leu Gly Leu Ser Ser Ala His
            35                  40                  45

Thr Asn Arg Lys Val Trp Lys Lys Phe Val Glu Ala Tyr Gly Lys Ala
        50                  55                  60

Ile Pro Pro Ala Pro Pro Ala Pro Pro Leu Thr Leu Ser Lys Leu Glu
65                  70                  75                  80

<210> SEQ ID NO 4
<211> LENGTH: 86
<212> TYPE: PRT
<213> ORGANISM: Artificial
<220> FEATURE:
<223> OTHER INFORMATION: N ter pb10 H6 (pb10Nter H6)

<400> SEQUENCE: 4

Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
                20                  25                  30

Pro Ser Tyr Ala Phe Leu Arg Arg Glu Leu Gly Leu Ser Ser Ala His
            35                  40                  45

Thr Asn Arg Lys Val Trp Lys Lys Phe Val Glu Ala Tyr Gly Lys Ala
        50                  55                  60

Ile Pro Pro Ala Pro Pro Ala Pro Pro Leu Thr Leu Ser Lys Leu Glu
65                  70                  75                  80

His His His His His His
                85

<210> SEQ ID NO 5
<211> LENGTH: 551
<212> TYPE: PRT

<213> ORGANISM: Artificial
<220> FEATURE:
<223> OTHER INFORMATION: Fusion pb10 OVA

<400> SEQUENCE: 5

```
Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
            20                  25                  30

Pro Ser Tyr Ala Phe Leu Arg Arg Glu Leu Gly Leu Ser Ser Ala His
        35                  40                  45

Thr Asn Arg Lys Val Trp Lys Lys Phe Val Glu Ala Tyr Gly Lys Ala
50                  55                  60

Ile Pro Pro Ala Pro Pro Ala Pro Pro Leu Thr Leu Ser Lys Asp Leu
65                  70                  75                  80

Thr Ala Ser Met Ser Val Glu Glu Gly Ala Ala Leu Thr Leu Ser Val
                85                  90                  95

Thr Ala Thr Gly Gly Thr Gly Pro Tyr Thr Tyr Ala Trp Thr Lys Asp
            100                 105                 110

Gly Ser Pro Ile Pro Asp Ala Ser Gly Ala Thr Tyr Thr Lys Pro Thr
        115                 120                 125

Ala Ala Ala Glu Asp Ala Gly Ser Tyr Lys Val Thr Val Thr Asp Ser
130                 135                 140

Lys Gln Val Ser Lys Asp Ser Thr Thr Cys Ala Val Thr Val Asn Pro
145                 150                 155                 160

Thr Val Pro Gly Gly Met Gly Ser Ile Gly Ala Ala Ser Met Glu Phe
                165                 170                 175

Cys Phe Asp Val Phe Lys Glu Leu Lys Val His His Ala Asn Glu Asn
            180                 185                 190

Ile Phe Tyr Cys Pro Ile Ala Ile Met Ser Ala Leu Ala Met Val Tyr
        195                 200                 205

Leu Gly Ala Lys Asp Ser Thr Arg Thr Gln Ile Asn Lys Val Val Arg
210                 215                 220

Phe Asp Lys Leu Pro Gly Phe Gly Asp Ser Ile Glu Ala Gln Cys Gly
225                 230                 235                 240

Thr Ser Val Asn Val His Ser Ser Leu Arg Asp Ile Leu Asn Gln Ile
                245                 250                 255

Thr Lys Pro Asn Asp Val Tyr Ser Phe Ser Leu Ala Ser Arg Leu Tyr
            260                 265                 270

Ala Glu Glu Arg Tyr Pro Ile Leu Pro Glu Tyr Leu Gln Cys Val Lys
        275                 280                 285

Glu Leu Tyr Arg Gly Gly Leu Glu Pro Ile Asn Phe Gln Thr Ala Ala
290                 295                 300

Asp Gln Ala Arg Glu Leu Ile Asn Ser Trp Val Glu Ser Gln Thr Asn
305                 310                 315                 320

Gly Ile Ile Arg Asn Val Leu Gln Pro Ser Ser Val Asp Ser Gln Thr
                325                 330                 335

Ala Met Val Leu Val Asn Ala Ile Val Phe Lys Gly Leu Trp Glu Lys
            340                 345                 350

Ala Phe Lys Asp Glu Asp Thr Gln Ala Met Pro Phe Arg Val Thr Glu
        355                 360                 365

Gln Glu Ser Lys Pro Val Gln Met Met Tyr Gln Ile Gly Leu Phe Arg
370                 375                 380
```

Val Ala Ser Met Ala Ser Glu Lys Met Lys Ile Leu Glu Leu Pro Phe
385                 390                 395                 400

Ala Ser Gly Thr Met Ser Met Leu Val Leu Leu Pro Asp Glu Val Ser
                405                 410                 415

Gly Leu Glu Gln Leu Glu Ser Ile Ile Asn Phe Glu Lys Leu Thr Glu
            420                 425                 430

Trp Thr Ser Ser Asn Val Met Glu Glu Arg Lys Ile Lys Val Tyr Leu
        435                 440                 445

Pro Arg Met Lys Met Glu Glu Lys Tyr Asn Leu Thr Ser Val Leu Met
    450                 455                 460

Ala Met Gly Ile Thr Asp Val Phe Ser Ser Ala Asn Leu Ser Gly
465                 470                 475                 480

Ile Ser Ser Ala Glu Ser Leu Lys Ile Ser Gln Ala Val His Ala Ala
                485                 490                 495

His Ala Glu Ile Asn Glu Ala Gly Arg Glu Val Val Gly Ser Ala Glu
            500                 505                 510

Ala Gly Val Asp Ala Ala Ser Val Ser Glu Glu Phe Arg Ala Asp His
        515                 520                 525

Pro Phe Leu Phe Cys Ile Lys His Ile Ala Thr Asn Ala Val Leu Phe
    530                 535                 540

Phe Gly Arg Cys Val Ser Pro
545                 550

<210> SEQ ID NO 6
<211> LENGTH: 459
<212> TYPE: PRT
<213> ORGANISM: Artificial
<220> FEATURE:
<223> OTHER INFORMATION: Fusion N Ter pb10 OVA

<400> SEQUENCE: 6

Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
                20                  25                  30

Pro Ser Tyr Ala Phe Leu Arg Arg Glu Leu Gly Leu Ser Ser Ala His
            35                  40                  45

Thr Asn Arg Lys Val Trp Lys Lys Phe Val Glu Ala Tyr Gly Lys Ala
        50                  55                  60

Ile Pro Pro Ala Pro Ala Pro Pro Met Gly Ser Ile Gly Ala Ala
65                  70                  75                  80

Ser Met Glu Phe Cys Phe Asp Val Phe Lys Glu Leu Lys Val His His
                85                  90                  95

Ala Asn Glu Asn Ile Phe Tyr Cys Pro Ile Ala Ile Met Ser Ala Leu
            100                 105                 110

Ala Met Val Tyr Leu Gly Ala Lys Asp Ser Thr Arg Thr Gln Ile Asn
        115                 120                 125

Lys Val Val Arg Phe Asp Lys Leu Pro Gly Phe Gly Asp Ser Ile Glu
    130                 135                 140

Ala Gln Cys Gly Thr Ser Val Asn Val His Ser Ser Leu Arg Asp Ile
145                 150                 155                 160

Leu Asn Gln Ile Thr Lys Pro Asn Asp Val Tyr Ser Phe Ser Leu Ala
                165                 170                 175

Ser Arg Leu Tyr Ala Glu Glu Arg Tyr Pro Ile Leu Pro Glu Tyr Leu
            180                 185                 190

-continued

Gln Cys Val Lys Glu Leu Tyr Arg Gly Gly Leu Glu Pro Ile Asn Phe
            195                 200                 205

Gln Thr Ala Ala Asp Gln Ala Arg Glu Leu Ile Asn Ser Trp Val Glu
210                 215                 220

Ser Gln Thr Asn Gly Ile Ile Arg Asn Val Leu Gln Pro Ser Ser Val
225                 230                 235                 240

Asp Ser Gln Thr Ala Met Val Leu Val Asn Ala Ile Val Phe Lys Gly
            245                 250                 255

Leu Trp Glu Lys Ala Phe Lys Asp Glu Asp Thr Gln Ala Met Pro Phe
            260                 265                 270

Arg Val Thr Glu Gln Glu Ser Lys Pro Val Gln Met Met Tyr Gln Ile
            275                 280                 285

Gly Leu Phe Arg Val Ala Ser Met Ala Ser Glu Lys Met Lys Ile Leu
            290                 295                 300

Glu Leu Pro Phe Ala Ser Gly Thr Met Ser Met Leu Val Leu Leu Pro
305                 310                 315                 320

Asp Glu Val Ser Gly Leu Glu Gln Leu Glu Ser Ile Ile Asn Phe Glu
            325                 330                 335

Lys Leu Thr Glu Trp Thr Ser Ser Asn Val Met Glu Glu Arg Lys Ile
            340                 345                 350

Lys Val Tyr Leu Pro Arg Met Lys Met Glu Glu Lys Tyr Asn Leu Thr
            355                 360                 365

Ser Val Leu Met Ala Met Gly Ile Thr Asp Val Phe Ser Ser Ser Ala
            370                 375                 380

Asn Leu Ser Gly Ile Ser Ser Ala Glu Ser Leu Lys Ile Ser Gln Ala
385                 390                 395                 400

Val His Ala Ala His Ala Glu Ile Asn Glu Ala Gly Arg Glu Val Val
            405                 410                 415

Gly Ser Ala Glu Ala Gly Val Asp Ala Ala Ser Val Ser Glu Glu Phe
            420                 425                 430

Arg Ala Asp His Pro Phe Leu Phe Cys Ile Lys His Ile Ala Thr Asn
            435                 440                 445

Ala Val Leu Phe Phe Gly Arg Cys Val Ser Pro
            450                 455

<210> SEQ ID NO 7
<211> LENGTH: 403
<212> TYPE: PRT
<213> ORGANISM: Phage T5

<400> SEQUENCE: 7

Met Gly Phe Lys Ser Trp Ile Thr Glu Lys Leu Asn Pro Gly Gln Arg
1               5                   10                  15

Ile Ile Arg Asp Met Glu Pro Val Ser His Arg Thr Asn Arg Lys Pro
            20                  25                  30

Phe Thr Thr Gly Gln Ala Tyr Ser Lys Ile Glu Ile Leu Asn Arg Thr
            35                  40                  45

Ala Asn Met Val Ile Asp Ser Ala Ala Glu Cys Ser Tyr Thr Val Gly
50                  55                  60

Asp Lys Tyr Asn Ile Val Thr Tyr Ala Asn Gly Val Lys Thr Lys Thr
65                  70                  75                  80

Leu Asp Thr Leu Leu Asn Val Arg Pro Asn Pro Phe Met Asp Ile Ser
            85                  90                  95

Thr Phe Arg Arg Leu Val Val Thr Asp Leu Phe Glu Gly Cys Ala
                100                 105                 110

Tyr Ile Tyr Trp Asp Gly Thr Ser Leu Tyr His Val Pro Ala Ala Leu
            115                 120                 125

Met Gln Val Glu Ala Asp Ala Asn Lys Phe Ile Lys Lys Phe Ile Phe
130                 135                 140

Asn Asn Gln Ile Asn Tyr Arg Val Asp Glu Ile Ile Phe Ile Lys Asp
145                 150                 155                 160

Asn Ser Tyr Val Cys Gly Thr Asn Ser Gln Ile Ser Gly Gln Ser Arg
                165                 170                 175

Val Ala Thr Val Ile Asp Ser Leu Glu Lys Arg Ser Lys Met Leu Asn
            180                 185                 190

Phe Lys Glu Lys Phe Leu Asp Asn Gly Thr Val Ile Gly Leu Ile Leu
        195                 200                 205

Glu Thr Asp Glu Ile Leu Asn Lys Lys Leu Arg Glu Arg Lys Gln Glu
    210                 215                 220

Glu Leu Gln Leu Asp Tyr Asn Pro Ser Thr Gly Gln Ser Ser Val Leu
225                 230                 235                 240

Ile Leu Asp Gly Gly Met Lys Ala Lys Pro Tyr Ser Gln Ile Ser Ser
                245                 250                 255

Phe Lys Asp Leu Asp Phe Lys Glu Asp Ile Glu Gly Phe Asn Lys Ser
            260                 265                 270

Ile Cys Leu Ala Phe Gly Val Pro Gln Val Leu Leu Asp Gly Gly Asn
        275                 280                 285

Asn Ala Asn Ile Arg Pro Asn Ile Glu Leu Phe Tyr Tyr Met Thr Ile
    290                 295                 300

Ile Pro Met Leu Asn Lys Leu Thr Ser Ser Leu Thr Phe Phe Phe Gly
305                 310                 315                 320

Tyr Lys Ile Thr Pro Asn Thr Lys Glu Val Ala Ala Leu Thr Pro Asp
                325                 330                 335

Lys Glu Ala Glu Ala Lys His Leu Thr Ser Leu Val Asn Asn Gly Ile
            340                 345                 350

Ile Thr Gly Asn Glu Ala Arg Ser Glu Leu Asn Leu Gly Pro Leu Asp
        355                 360                 365

Asp Glu Gln Met Asn Lys Ile Arg Ile Pro Ala Asn Val Ala Gly Ser
    370                 375                 380

Ala Thr Gly Val Ser Gly Gln Glu Gly Arg Pro Lys Gly Ser Thr
385                 390                 395                 400

Glu Gly Asp

<210> SEQ ID NO 8
<211> LENGTH: 458
<212> TYPE: PRT
<213> ORGANISM: Phage T5

<400> SEQUENCE: 8

Met Thr Ile Asp Ile Asn Lys Leu Lys Glu Glu Leu Gly Leu Gly Asp
1               5                   10                  15

Leu Ala Lys Ser Leu Glu Gly Leu Thr Ala Ala Gln Lys Ala Gln Glu
            20                  25                  30

Ala Glu Arg Met Arg Lys Glu Gln Glu Lys Glu Leu Ala Arg Met
        35                  40                  45

Asn Asp Leu Val Ser Lys Ala Val Gly Glu Asp Arg Lys Arg Leu Glu
    50                  55                  60

```
Glu Ala Leu Glu Leu Val Lys Ser Leu Asp Glu Lys Ser Lys Lys Ser
 65                  70                  75                  80

Asn Glu Leu Phe Ala Gln Thr Val Glu Lys Gln Gln Glu Thr Ile Val
             85                  90                  95

Gly Leu Gln Asp Glu Ile Lys Ser Leu Leu Thr Ala Arg Glu Gly Arg
                100                 105                 110

Ser Phe Val Gly Asp Ser Val Ala Lys Ala Leu Tyr Gly Thr Gln Glu
            115                 120                 125

Asn Phe Glu Asp Glu Val Glu Lys Leu Val Leu Leu Ser Tyr Val Met
        130                 135                 140

Glu Lys Gly Val Phe Thr Glu His Gly Gln Arg His Leu Lys Ala
145                 150                 155                 160

Val Asn Gln Ser Ser Ser Val Glu Val Ser Glu Ser Tyr Glu Thr
                165                 170                 175

Ile Phe Ser Gln Arg Ile Ile Arg Asp Leu Gln Lys Glu Leu Val Val
                180                 185                 190

Gly Ala Leu Phe Glu Glu Leu Pro Met Ser Ser Lys Ile Leu Thr Met
            195                 200                 205

Leu Val Glu Pro Asp Ala Gly Lys Ala Thr Trp Val Ala Ala Ser Thr
210                 215                 220

Tyr Gly Thr Asp Thr Thr Thr Gly Glu Glu Val Lys Gly Ala Leu Lys
225                 230                 235                 240

Glu Ile His Phe Ser Thr Tyr Lys Leu Ala Ala Lys Ser Phe Ile Thr
                245                 250                 255

Asp Glu Thr Glu Glu Asp Ala Ile Phe Ser Leu Leu Pro Leu Leu Arg
            260                 265                 270

Lys Arg Leu Ile Glu Ala His Ala Val Ser Ile Glu Glu Ala Phe Met
        275                 280                 285

Thr Gly Asp Gly Ser Gly Lys Pro Lys Gly Leu Leu Thr Leu Ala Ser
290                 295                 300

Glu Asp Ser Ala Lys Val Val Thr Glu Ala Lys Ala Asp Gly Ser Val
305                 310                 315                 320

Leu Val Thr Ala Lys Thr Ile Ser Lys Leu Arg Arg Lys Leu Gly Arg
                325                 330                 335

His Gly Leu Lys Leu Ser Lys Leu Val Leu Ile Val Ser Met Asp Ala
            340                 345                 350

Tyr Tyr Asp Leu Leu Glu Asp Glu Trp Gln Asp Val Ala Gln Val
        355                 360                 365

Gly Asn Asp Ser Val Lys Leu Gln Gly Gln Val Gly Arg Ile Tyr Gly
        370                 375                 380

Leu Pro Val Val Val Ser Glu Tyr Phe Pro Ala Lys Ala Asn Ser Ala
385                 390                 395                 400

Glu Phe Ala Val Ile Val Tyr Lys Asp Asn Phe Val Met Pro Arg Gln
                405                 410                 415

Arg Ala Val Thr Val Glu Arg Glu Gln Ala Gly Lys Gln Arg Asp
            420                 425                 430

Ala Tyr Tyr Val Thr Gln Arg Val Asn Leu Gln Arg Tyr Phe Ala Asn
        435                 440                 445

Gly Val Val Ser Gly Thr Tyr Ala Ala Ser
450                 455

<210> SEQ ID NO 9
<211> LENGTH: 210
```

```
<212> TYPE: PRT
<213> ORGANISM: Phage T5

<400> SEQUENCE: 9

Met Thr Gln Ala Ala Ile Asp Tyr Asn Lys Leu Lys Ser Ala Pro Val
1               5                   10                  15

His Leu Asp Ala Tyr Ile Lys Ser Ile Asp Ser Glu Ser Lys Glu Gly
            20                  25                  30

Val Val Lys Ile Arg Gly Phe Ala Asn Thr Ile Ser Lys Asp Arg Ala
        35                  40                  45

Gly Asp Val Ile Pro Ala Ser Ala Trp Lys Thr Ser Asn Ala Leu Thr
    50                  55                  60

Asn Tyr Met Lys Asn Pro Ile Ile Leu Phe Gly His Asp His Arg Arg
65              70                  75                  80

Pro Ile Gly Lys Cys Ile Asp Leu Asn Pro Thr Glu Met Gly Leu Glu
            85                  90                  95

Ile Glu Cys Glu Ile Tyr Glu Ser Ser Asp Pro Ala Ile Phe Ser Leu
            100                 105                 110

Ile Lys Asn Gly Val Leu Lys Thr Phe Ser Ile Gly Phe Arg Cys Leu
        115                 120                 125

Asp Ala Glu Trp Asp Glu Ala Thr Asp Ile Phe Ile Ile Lys Asp Leu
    130                 135                 140

Glu Leu Tyr Glu Val Ser Val Val Ser Val Pro Cys Asn Gln Asp Ser
145                 150                 155                 160

Thr Phe Asn Leu Ala Lys Ser Met Asn Gly His Asp Tyr Thr Glu Trp
                165                 170                 175

Arg Lys Ser Phe Thr Ala Ile Ser Ser Lys Ala Val Pro Ala Gln Glu
            180                 185                 190

Arg Asn Leu Ser Glu Leu Glu Lys Leu Ala Ile Ala Leu Gly Tyr Val
        195                 200                 205

Lys Glu
    210

<210> SEQ ID NO 10
<211> LENGTH: 3739
<212> TYPE: DNA
<213> ORGANISM: Artificial
<220> FEATURE:
<223> OTHER INFORMATION: Operon capT5 pb7 pb10 pb11 pb8

<400> SEQUENCE: 10
atgggtttta aaagctggat tactgaaaag ctaaatccgg gtcaacgtat tataagagac      60
atggaaccag ttagtcatcg cactaaccgt aagccttta ccactggaca agcctacagt     120
aaaattgaga ttctcaatag aactgctaat atggttatag atagtgcggc ggagtgttct     180
tatactgtcg gagataaata atatattgtt acgtacgcta atggcgtcaa acaaagact     240 ctagacactc tcttaaatgt acgacctaat ccattcatgg atataagcac attccgtaga     300
cttgtagtca ctgacctact ttttgaaggt tgtgcataca tctattggga tggcacatcg     360
ctttaccatg tcccggccgc tcttatgcag gtcgaggcag atgccaataa gtttatcaaa     420
aaatttatat ttaataatca gataaactat cgcgtagatg agattatctt tataaaggat     480
aacagttacg tgtgtggcac aaactctcaa atttctggcc aatctcgtgt tgctactgtt     540
attgattctc ttgagaagcg ttctaagatg cttaacttta agagaaatt cctcgataac     600 ggaaccgtga ttggtcttat tcttgagacg gatgaaatcc tgaacaagaa attgcgtgag     660
```

```
cgtaaacaag aagaattaca actcgattat aatcctagta cgggtcagtc ctctgtcctg   720
attctagatg gtggtatgaa agctaaaccg tactcccaaa tatcctcttt taaagatcta   780
gactttaagg aagacataga agggtttaat aaatctattt gtctagcctt tggagttccg   840
caagtactgc ttgatggtgg taataatgcg aatattcgac caaacatcga attgttctat   900
tatatgacta tcattcctat gctgaacaaa ctgactagtt ctcttacttt cttttttggt   960
tataagatca ctcctaatac taaggaagtc gcagcattaa caccagataa agaagcagag  1020
gctaaacatt taacctcatt ggttaataat ggtattataa ccggtaacga agctcgttca  1080
gagctgaacc tggagccttt agatgatgag cagatgaata agatccgtat tcctgctaac  1140
gtcgctggtt ctgcaacagg tgtatctggt caagaaggtg gtagacctaa aggttccacc  1200
gagggagatt aagaatgatt gattatagtg gtctaaggac catttttggt gaaaaactac  1260
cagaatctca tatcttcttt gctacggttg ctgcgcataa atatgttcct agctatgctt  1320
ttctgcgtag agaactaggg ctttcatctg cgcatactaa ccgtaaagta tggaagaaat  1380
ttgtagaggc ttatggtaaa gcaattcctc cggcccacc ggctccacca ttaactcttt  1440
ctaaagattt aactgctagc atgtcagttg aagagggagc agcattaaca ctttctgtta  1500
ctgcaactgg tggtactggt ccatatactt atgcatggac taaagatggt tctcctattc  1560
cggatgcttc aggagctacc tatactaagc ctacagcagc agctgaggat gccggctctt  1620
ataaagtaac tgtaacagat agtaagcaag taagtaagga ttctactaca tgtgctgtga  1680
cagttaatcc tactgttcct ggaggctaat aaatgacaca agctgctatt gactataaca  1740
agttaaaatc agcacccgtt catttagatg cttatattaa atctattgat agcgaatcca  1800
aagaaggtgt tgtaaaaatc cgtggattcg ctaacacaat tagtaaagat cgcgctggtg  1860
atgtaattcc tgcttctgcg tggaaaacgt ctaatgcact tactaactac atgaaaaacc  1920
cgattattct tttcggacac gatcatcgtc gtccaatcgg taagtgtatt gatcttaacc  1980
ctactgaaat gggtctcgaa atcgaatgtg agatctatga agttctgac ccggctatct  2040 tttcactaat taaaaacggt gtactgaaaa cttttagtat cggattccgc tgcctagatg  2100
cagagtggga tgaagctact gatatattta ttattaaaga tttagaacta tacgaagttt  2160
cggtagtttc tgtaccttgt aatcaggact caacattcaa tctcgctaag agcatgaatg  2220
gtcatgatta tactgaatgg cgtaaatctt ttactgcaat aagttctaaa gctgtcccag  2280
ctcaagaacg taatctttct gaactagaaa aacttgcgat agctttaggc tacgttaaag  2340
aataacggag aattatttaa aaatgactat tgatattaat aagctgaaag aagaacttgg  2400
tctgggtgat ctggctaaat ctctggaagg tctgaccgct gctcagaaag ctcaggaagc  2460
tgaacgtatg cgtaaagagc aggaagaaaa agaactggct cgtatgaatg acctggtttc  2520
taaagcagtt ggcgaagacc gtaagcgtct ggaagaggct ctggaactgg ttaagtcgct  2580
ggatgagaaa tctaagaaga gtaatgaact gtttgcgcag acagtagaaa acagcagga  2640 aactattgtt ggtcttcagg atgaaatcaa atctctgctg acagctcgtg aaggtcgttc  2700
cttcgtcggt gatagcgtag ctaaagcact gtatggtact caggaaaact tgaagacga  2760 agtagaaaaa ctggttctgt tatcttatgt aatggaaaaa ggcgtattcg agaccgagca  2820
tggtcagaga cacctgaaag cagtgaatca gtcttcttcc gtagaagttt ctagtgaaag  2880
ctatgaaact atttttctctc agcgtattat ccgcgacctg cagaaagagc tggtagttgg  2940
cgcactgttc gaagaactgc cgatgtccag taagattctt actatgctgg ttgaaccgga  3000
tgctggtaaa gctacttggg ttgctgcttc tacttatggt accgatacaa ctactggtga  3060
```

```
ggaagttaaa ggagctctta aagaaatcca cttcagtact tacaaactgg ctgccaagtc    3120
ctttattact gatgaaactg aagaagatgc aatcttctcc ctgctgccgc tgttgcgtaa    3180
gcgtctgatt gaagcacacg ctgtttctat cgaagaagct ttcatgactg gtgatggttc    3240
tggtaagccg aaaggtctgc tgacccttgc tagtgaagat agtgctaagg ttgttactga    3300
ggctaaagct gatggttctg ttctagtaac tgctaaaact atctccaaac tgcgtcgtaa    3360
actgggtcgt catggtctga aactgagcaa actggtactg atcgtatcta tggatgctta    3420
ctacgatctg ctggaagatg aagaatggca ggatgttgcc caggttggta acgattctgt    3480
taaactgcaa ggtcaggttg gtcgtattta tggtctgccg gttgtagttt ccagtatt     3540 cccagctaaa gctaactcag cagagttcgc agttattgtt tataaagata acttcgtaat    3600
gccacgtcag cgcgctgtta ctgttgaacg tgagcgccaa gctggtaaac agcgtgatgc    3660
gtactacgtt actcagcgtg ttaacctgca acgttacttt gcaaatggcg ttgtatctgg    3720
tacttacgct gcgtcttaa                                                 3739

<210> SEQ ID NO 11
<211> LENGTH: 3298
<212> TYPE: DNA
<213> ORGANISM: Artificial
<220> FEATURE:
<223> OTHER INFORMATION: Operon capT5Deltadec pb7 Deltapb10 pb11 pb8

<400> SEQUENCE: 11
atgggtttta aaagctggat tactgaaaag ctaaatccgg gtcaacgtat tataagagac      60
atggaaccag ttagtcatcg cactaaccgt aagccttta ccactggaca agcctacagt     120
aaaattgaga ttctcaatag aactgctaat atggttatag atagtgcggc ggagtgttct    180
tatactgtcg gagataaata taatattgtt acgtacgcta atggcgtcaa aacaaagact    240
ctagacactc tcttaaatgt acgacctaat ccattcatgg atataagcac attccgtaga    300
cttgtagtca ctgacctact ttttgaaggt tgtgcataca tctattggga tggcacatcg    360
ctttaccatg tcccggccgc tcttatgcag gtcgaggcag atgccaataa gtttatcaaa    420
aaatttatat ttaataatca gataaactat cgcgtagatg agattatctt tataaaggat    480
aacagttacg tgtgtggcac aaactctcaa atttctggcc aatctcgtgt tgctactgtt    540
attgattctc ttgagaagcg ttctaagatg cttaacttta agagaaatt cctcgataac    600 ggaaccgtga ttggtcttat tcttgagacg gatgaaatcc tgaacaagaa attgcgtgag    660
cgtaaacaag aagaattaca actcgattat aatcctagta cgggtcagtc ctctgtcctg    720
attctagatg gtggtatgaa agctaaaccg tactcccaaa tatcctcttt taaagatcta    780
gactttaagg aagacataga agggtttaat aaatctattt gtctagcctt tggagttccg    840
caagtactgc ttgatggtgg taataatgcg aatattcgac caaacatcga attgttctat    900
tatatgacta tcattcctat gctgaacaaa ctgactagtt ctcttacttt cttttttggt    960
tataagatca ctcctaatac taaggaagtc gcagcattaa caccagataa agaagcagag    1020
gctaaacatt taacctcatt ggttaataat ggtattataa ccggtaacga agctcgttca    1080
gagctgaacc tggagccttt agatgatgag cagatgaata agatccgtat tcctgctaac    1140
gtcgctggtt ctgcaacagg tgtatctggt caagaaggtg gtagacctaa aggttccacc    1200
gagggagatt aagaatggat tctactacat gtgctgtgac agttaatcct actgttcctg    1260
gaggctaata aatgacacaa gctgctattg actataacaa gttaaaatca gcaccgttc    1320
```

```
atttagatgc ttatattaaa tctattgata gcgaatccaa agaaggtgtt gtaaaaatcc      1380
gtggattcgc taacacaatt agtaaagatc gcgctggtga tgtaattcct gcttctgcgt      1440
ggaaaacgtc taatgcactt actaactaca tgaaaaaccc gattattctt ttcggacacg      1500
atcatcgtcg tccaatcggt aagtgtattg atcttaaccc tactgaaatg ggtctcgaaa      1560
tcgaatgtga gatctatgaa agttctgacc cggctatctt ttcactaatt aaaaacggtg      1620
tactgaaaac ttttagtatc ggattccgct gcctagatgc agagtgggat gaagctactg      1680
atatatttat tattaaagat ttagaactat acgaagtttc ggtagtttct gtaccttgta      1740
atcaggactc aacattcaat ctcgctaaga gcatgaatgg tcatgattat actgaatggc      1800
gtaaatcttt tactgcaata agttctaaag ctgtcccagc tcaagaacgt aatctttctg      1860
aactagaaaa acttgcgata gctttaggct acgttaaaga ataacggaga attatttaaa      1920
aatgactatt gatattaata agctgaaaga agaacttggt ctgggtgatc tggctaaatc      1980
tctggaaggt ctgaccgctg ctcagaaagc tcaggaagct gaacgtatgc gtaaagagca      2040
ggaagaaaaa gaactggctc gtatgaatga cctggtttct aaagcagttg gcgaagaccg      2100
taagcgtctg gaagaggctc tggaactggt taagtcgctg gatgagaaat ctaagaagag      2160
taatgaactg tttgcgcaga cagtagaaaa acagcaggaa actattgttg gtcttcagga      2220
tgaaatcaaa tctctgctga cagctcgtga aggtcgttcc ttcgtcggtg atagcgtagc      2280
taaagcactg tatggtactc aggaaaaact tgaagacgaa gtagaaaaac tggttctgtt      2340
atcttatgta atggaaaaag gcgtattcga gaccgagcat ggtcagagac acctgaaagc      2400
agtgaatcag tcttcttccg tagaagtttc tagtgaaagc tatgaaacta ttttctctca      2460
gcgtattatc cgcgaccctg agaaagagct ggtagttggc gcactgttcg aagaactgcc      2520
gatgtccagt aagattctta ctatgctggt tgaaccggat gctggtaaag ctacttgggt      2580
tgctgcttct acttatggta ccgatacaac tactggtgag gaagttaaag gagctcttaa      2640
agaaatccac ttcagtactt acaaactggc tgccaagtcc tttattactg atgaaactga      2700
agaagatgca atcttctccc tgctgccgct gttgcgtaag cgtctgattg aagcacacgc      2760
tgtttctatc gaagaagctt tcatgactgg tgatggttct ggtaagccga aaggtctgct      2820
gaccccttgct agtgaagata gtgctaaggt tgttactgag gctaaagctg atggttctgt      2880
tctagtaact gctaaaacta tctccaaact gcgtcgtaaa ctgggtcgtc atggtctgaa      2940
actgagcaaa ctggtactga tcgtatctat ggatgcttac tacgatctgc tggaagatga      3000
agaatggcag gatgttgccc aggttggtaa cgattctgtt aaactgcaag gtcaggttgg      3060
tcgtatttat ggtctgccgg ttgtagtttc cgagtatttc ccagctaaag ctaactcagc      3120
agagttcgca gttattgttt ataaagataa cttcgtaatg ccacgtcagc gcgctgttac      3180
tgttgaacgt gagcgccaag ctggtaaaca gcgtgatgcg tactacgtta ctcagcgtgt      3240
taacctgcaa cgttactttg caaatggcgt tgtatctggt acttacgctg cgtcttaa         3298
```

<210> SEQ ID NO 12  
<211> LENGTH: 8945  
<212> TYPE: DNA  
<213> ORGANISM: Artificial  
<220> FEATURE:  
<223> OTHER INFORMATION: pETcapT5

<400> SEQUENCE: 12

```
atccggatat agttcctcct ttcagcaaaa aacccctcaa gacccgttta gaggccccaa        60
ggggttatgc tagttattgc tcagcggtgg cagcagccaa ctcagcttcc tttcgggctt       120
```

```
tgttagcagc cggatcttaa gacgcagcgt aagtaccaga tacaacgcca tttgcaaagt    180
aacgttgcag gttaacacgc tgagtaacgt agtacgcatc acgctgttta ccagcttggc    240
gctcacgttc aacagtaaca gcgcgctgac gtggcattac gaagttatct ttataaacaa    300
taactgcgaa ctctgctgag ttagctttag ctgggaaata ctcggaaact acaaccggca    360
gaccataaat acgaccaacc tgaccttgca gtttaacaga atcgttacca acctgggcaa    420
catcctgcca ttcttcatct tccagcagat cgtagtaagc atccatagat acgatcagta    480
ccagtttgct cagtttcaga ccatgacgac ccagtttacg acgcagtttg agatagtttt    540
tagcagttac tagaacagaa ccatcagctt tagcctcagt aacaacctta gcactatctt    600
cactagcaag ggtcagcaga cctttcggct taccagaacc atcaccagtc atgaaagctt    660
cttcgataga aacagcgtgt gcttcaatca gacgcttacg caacagcggc agcagggaga    720
agattgcatc ttcttcagtt tcatcagtaa taaaggactt ggcagccagt ttgtaagtac    780
tgaagtggat ttctttaaga gctccttcaa cttcctcacc agtagttgta tcggtaccat    840
aagtagaagc agcaacccaa gtagctttac cagcatccgg ttcaaccagc atagtaagaa    900
tcttactgga catcggcagt tcttcgaaca gtgcgccaac taccagctct ttctgcaggt    960
cgcggataat acgctgagag aaaatagttt catagctttc actagaaact tctacggaag   1020
aagactgatt cactgctttc aggtgtctct gaccatgctc ggtctcgaat acgcctttt   1080 ccattacata agataacaga accagttttt ctacttcgtc ttcaaagttt tcctgagtac   1140
catacagtgc tttagctacg ctatcaccga cgaaggaacg accttcacga gctgtcagca   1200
gagatttgat ttcatcctga agaccaacaa tagtttcctg ctgttttct actgtctgcg   1260 caaacagttc attactcttc ttagatttct catccagcga cttaaccagt tccagagcct   1320
cttccagacg cttacggtct tcgccaactg ctttagaaac caggtcattc atacgagcca   1380
gttctttttc ttcctgctct ttacgcatac gttcagcttc ctgagctttc tgagcagcgg   1440
tcagaccttc cagagattta gccagatcac ccagaccaag ttcttctttc agcttattaa   1500
tatcaatagt cattttttaaa taattctccg ttattcttta acgtagccta aagctatcgc   1560 aagttttct agttcagaaa gattacgttc ttgagctggg acagctttag aacttattgc   1620
agtaaaagat ttacgccatt cagtataatc atgaccattc atgctcttag cgagattgaa   1680
tgttgagtcc tgattacaag gtacagaaac taccgaaact tcgtatagtt ctaaatcttt   1740
aataataaat atatcagtag cttcatccca ctctgcatct aggcagcgga atccgatact   1800
aaaagttttc agtacaccgt ttttaattag tgaaaagata gccgggtcag aactttcata   1860
gatctcacat tcgatttcga gacccatttc agtagggtta agatcaatac acttaccgat   1920
tggacgacga tgatcgtgtc cgaaaagaat aatcgggttt tcatgtagt tagtaagtgc    1980 attagacgtt ttccacgcag aagcaggaat tacatcacca gcgcgatctt tactaattgt   2040
gttagcgaat ccacggattt ttacaacacc ttctttggat tcgctatcaa tagatttaat   2100
ataagcatct aaatgaacgg gtgctgattt taacttgtta tagtcaatag cagcttgtgt   2160
catttattag cctccaggaa cagtaggatt aactgtcaca gcacatgtag tagaatcctt   2220
acttacttgc ttactatctg ttacagttac tttataagag ccggcatcct cagctgctgc   2280
tgtaggctta gtataggtag ctcctgaagc atccggaata ggagaaccat ctttagtcca   2340
tgcataagta tatggaccag taccaccagt tgcagtaaca gaaagtgtta atgctgctcc   2400
ctcttcaact gacatgctag cagttaaatc tttagaaaga gttaatggtg gagccggtgg   2460
```

```
ggccggagga attgctttac cataagcctc tacaaatttc ttccatactt tacgttagt    2520 atgcgcagat gaaagcccta gttctctacg cagaaaagca tagctaggaa catatttatg    2580
cgcagcaacc gtagcaaaga agatatgaga ttctggtagt ttttcaccaa aaatggtcct    2640
tagaccacta taatcaatca ttcttaatct ccctcggtgg aacctttagg tctaccacct    2700
tcttgaccag atacacctgt tgcagaacca gcgacgttag caggaatacg gatcttattc    2760
atctgctcat catctaaagg ctccaggttc agctctgaac gagcttcgtt accggttata    2820
ataccattat taaccaatga ggttaaatgt ttagcctctg cttctttatc tggtgttaat    2880
gctgcgactt ccttagtatt aggagtgatc ttataaccaa aaagaaagt aagagaacta    2940 gtcagtttgt tcagcatagg aatgatagtc atataataga acaattcgat gtttggtcga    3000
atattcgcat tattaccacc atcaagcagt acttgcggaa ctccaaaggc tagacaaata    3060
gatttattaa acccttctat gtcttcctta aagtctagat ctttaaaaga ggatatttgg    3120
gagtacggtt tagctttcat accaccatct agaatcagga cagaggactg acccgtacta    3180
ggattataat cgagttgtaa ttcttcttgt ttacgctcac gcaatttctt gttcaggatt    3240
tcatccgtct caagaataag accaatcacg gttccgttat cgaggaattt ctctttaaag    3300
ttaagcatct tagaacgctt ctcaagagaa tcaataacag tagcaacacg agattggcca    3360
gaaatttgag agtttgtgcc acacacgtaa ctgttatcct ttataaagat aatctcatct    3420
acgcgatagt ttatctgatt attaaatata aatttttga taaacttatt ggcatctgcc    3480
tcgacctgca taagagcggc cgggacatgg taaagcgatg tgccatccca atagatgtat    3540
gcacaacctt caaaaagtag gtcagtgact acaagtctac ggaatgtgct tatatccatg    3600
aatggattag gtcgtacatt taagagagtg tctagagtct ttgttttgac gccattagcg    3660
tacgtaacaa tattatattt atctccgaca gtataagaac actccgccgc actatctata    3720
accatattag cagttctatt gagaatctca attttactgt aggcttgtcc agtggtaaaa    3780
ggcttacggt tagtgcgatg actaactggt tccatgtctc ttataatacg ttacccgga    3840 tttagctttt cagtaatcca gcttttaaaa cccatggtat atctccttct taaagttaaa    3900
caaaattatt tctagagggg aattgttatc cgctcacaat tcccctatag tgagtcgtat    3960
taatttcgcg ggatcgagat ctcgatcctc tacgccggac gcatcgtggc cggcatcacc    4020
ggcgccacag gtgcggttgc tggcgcctat atcgccgaca tcaccgatgg ggaagatcgg    4080
gctcgccact tcgggctcat gagcgcttgt ttcggcgtgg gtatggtggc aggccccgtg    4140 gccggggggac tgtttgggcgc catctccttg catgcaccat tccttgcggc ggcggtgctc    4200
aacggcctca acctactact gggctgcttc ctaatgcagg agtcgcataa gggagagcgt    4260
cgagatcccg gacaccatcg aatggcgcaa aacctttcgc ggtatggcat gatagcgccc    4320
ggaagagagt caattcaggg tggtgaatgt gaaaccagta acgttatacg atgtcgcaga    4380
gtatgccggt gtctcttatc agaccgtttc ccgcgtggtg aaccaggcca gccacgtttc    4440
tgcgaaaacg cgggaaaaag tggaagcggc gatggcggag ctgaattaca ttcccaaccg    4500
cgtggcacaa caactggcgg gcaaacagtc gttgctgatt ggcgttgcca cctccagtct    4560
ggccctgcac gcgccgtcgc aaattgtcgc ggcgattaaa tctcgcgccg atcaactggg    4620
tgccagcgtg gtggtgtcga tggtagaacg aagcggcgtc gaagcctgta aagcggcggt    4680
gcacaatctt ctcgcgcaac gcgtcagtgg gctgatcatt aactatccgc tggatgacca    4740
ggatgccatt gctgtggaag ctgcctgcac taatgttccg gcgttatttc ttgatgtctc    4800
tgaccagaca cccatcaaca gtattatttt ctcccatgaa gacggtacgc gactgggcgt    4860
```

```
ggagcatctg gtcgcattgg gtcaccagca atcgcgctg  ttagcgggcc cattaagttc    4920
tgtctcggcg cgtctgcgtc tggctggctg gcataaatat ctcactcgca atcaaattca    4980
gccgatagcg gaacgggaag gcgactggag tgccatgtcc ggttttcaac aaaccatgca    5040
aatgctgaat gagggcatcg ttcccactgc gatgctggtt gccaacgatc agatggcgct    5100
gggcgcaatg cgcgccatta ccgagtccgg gctgcgcgtt ggtgcggata tctcggtagt    5160
gggatacgac gataccgaag acagctcatg ttatatcccg ccgttaacca ccatcaaaca    5220
ggattttcgc ctgctggggc aaaccagcgt ggaccgcttg ctgcaactct ctcagggcca    5280
ggcggtgaag ggcaatcagc tgttgcccgt ctcactggtg aaaagaaaaa ccaccctggc    5340
gcccaatacg caaaccgcct ctccccgcgc gttggccgat tcattaatgc agctggcacg    5400
acaggtttcc cgactggaaa gcgggcagtg agcgcaacgc aattaatgta agttagctca    5460
ctcattaggc accgggatct cgaccgatgc ccttgagagc cttcaaccca gtcagctcct    5520
tccggtgggc gcggggcatg actatcgtcg ccgcacttat gactgtcttc tttatcatgc    5580
aactcgtagg acaggtgccg gcagcgctct gggtcatttt cggcgaggac cgctttcgct    5640
ggagcgcgac gatgatcggc ctgtcgcttg cggtattcgg aatcttgcac gccctcgctc    5700
aagccttcgt cactggtccc gccaccaaac gtttcggcga agcaggcc attatcgccg      5760 gcatggcggc cccacgggtg cgcatgatcg tgctcctgtc gttgaggacc cggctaggct    5820
ggcggggttg ccttactggt tagcagaatg aatcaccgat acgcgagcga acgtgaagcg    5880
actgctgctg caaaacgtct gcgacctgag caacaacatg aatggtcttc ggtttccgtg    5940
tttcgtaaag tctggaaacg cggaagtcag cgccctgcac cattatgttc cggatctgca    6000
tcgcaggatg ctgctggcta ccctgtggaa cacctacatc tgtattaacg aagcgctggc    6060
attgaccctg agtgattttt ctctggtccc gccgcatcca taccgccagt tgtttaccct    6120
cacaacgttc cagtaaccgg gcatgttcat catcagtaac ccgtatcgtg agcatcctct    6180
ctcgtttcat cggtatcatt acccccatga acagaaatcc cccttacacg gaggcatcag    6240
tgaccaaaca ggaaaaaacc gcccttaaca tggcccgctt tatcagaagc cagacattaa    6300
cgcttctgga gaaactcaac gagctggacg cggatgaaca ggcagacatc tgtgaatcgc    6360
ttcacgacca cgctgatgag ctttaccgca gctgcctcgc gcgtttcggt gatgacggtg    6420
aaaacctctg acacatgcag ctcccggaga cggtcacagc ttgtctgtaa gcggatgccg    6480
ggagcagaca agcccgtcag ggcgcgtcag cgggtgttgg cgggtgtcgg ggcgcagcca    6540
tgacccagtc acgtagcgat agcggagtgt atactggctt aactatgcgg catcagagca    6600
gattgtactg agagtgcacc atatatgcgg tgtgaaatac cgcacagatg cgtaaggaga    6660
aaataccgca tcaggcgctc tttcgcttcc tcgctcactg actcgctgcg ctcggtcgtt    6720
cggctgcggc gagcggtatc agctcactca aaggcggtaa tacggttatc cacagaatca    6780
ggggataacg caggaaagaa catgtgagca aaaggccagc aaaaggccag gaaccgtaaa    6840
aaggccgcgt tgctggcgtt tttccatagg ctccgccccc ctgacgagca tcacaaaaat    6900
cgacgctcaa gtcagaggtg gcgaaacccg acaggactat aaagatacca ggcgtttccc    6960
cctggaagct ccctcgtgcg ctctcctgtt ccgaccctgc cgcttaccgg atacctgtcc    7020
gcctttctcc cttcgggaag cgtggcgctt tctcatagct cacgctgtag gtatctcagt    7080
tcggtgtagg tcgttcgctc caagctgggc tgtgtgcacg aaccccccgt tcagcccgac    7140
cgctgcgcct tatccggtaa ctatcgtctt gagtccaacc cggtaagaca cgacttatcg    7200
```

```
ccactggcag cagccactgg taacaggatt agcagagcga ggtatgtagg cggtgctaca    7260
gagttcttga agtggtggcc taactacggc tacactagaa ggacagtatt tggtatctgc    7320
gctctgctga agccagttac cttcggaaaa agagttggta gctcttgatc cggcaaacaa    7380
accaccgctg gtagcggtgg ttttttttgtt tgcaagcagc agattacgcg cagaaaaaaa    7440
ggatctcaag aagatccttt gatcttttct acggggtctg acgctcagtg gaacgaaaac    7500
tcacgttaag ggattttggt catgaacaat aaaactgtct gcttacataa acagtaatac    7560 aagggggtgtt atgagccata ttcaacggga aacgtcttgc tctaggccgc gattaaattc    7620
caacatggat gctgatttat atgggtataa atgggctcgc gataatgtcg gcaatcagg    7680 tgcgacaatc tatcgattgt atgggaagcc cgatgcgcca gagttgtttc tgaaacatgg    7740
caaaggtagc gttgccaatg atgttacaga tgagatggtc agactaaact ggctgacgga    7800
atttatgcct cttccgacca tcaagcattt tatccgtact cctgatgatg catggttact    7860
caccactgcg atcccgggga aaacagcatt ccaggtatta gaagaatatc ctgattcagg    7920
tgaaaatatt gttgatgcgc tggcagtgtt cctgcgccgg ttgcattcga ttcctgtttg    7980
taattgtcct tttaacagcg atcgcgtatt tcgtctcgct caggcgcaat cacgaatgaa    8040
taacggtttg gttgatgcga gtgattttga tgacgagcgt aatggctggc ctgttgaaca    8100
agtctggaaa gaaatgcata aacttttgcc attctcaccg gattcagtcg tcactcatgg    8160
tgatttctca cttgataacc ttattttga cgaggggaaa ttaataggtt gtattgatgt    8220
tggacgagtc ggaatcgcag accgatacca ggatcttgcc atcctatgga actgcctcgg    8280
tgagttttct ccttcattac agaaacggct ttttcaaaaa tatggtattg ataatcctga    8340
tatgaataaa ttgcagtttc atttgatgct cgatgagttt ttctaagaat taattcatga    8400
gcggatacat atttgaatgt atttagaaaa ataaacaaat aggggttccg cgcacatttc    8460
cccgaaaagt gccacctgaa attgtaaacg ttaatatttt gttaaaattc gcgttaaatt    8520
tttgttaaat cagctcattt tttaaccaat aggccgaaat cggcaaaatc ccttataaat    8580
caaaagaata gaccgagata gggttgagtg ttgttccagt ttggaacaag agtccactat    8640
taaagaacgt ggactccaac gtcaaagggc gaaaaaccgt ctatcagggc gatggcccac    8700
tacgtgaacc atcaccctaa tcaagttttt tggggtcgag gtgccgtaaa gcactaaatc    8760
ggaaccctaa agggagcccc cgatttagag cttgacgggg aaagccggcg aacgtggcga    8820
gaaaggaagg gaagaaagcg aaaggagcgg cgctagggc gctggcaagt gtagcggtca    8880
cgctgcgcgt aaccaccaca cccgccgcgc ttaatgcgcc gctacagggc gcgtcccatt    8940
cgcca                                                                8945
```

<210> SEQ ID NO 13
<211> LENGTH: 8504
<212> TYPE: DNA
<213> ORGANISM: Artificial
<220> FEATURE:
<223> OTHER INFORMATION: pETcapT5Deltadec

<400> SEQUENCE: 13

```
atccggatat agttcctcct ttcagcaaaa aaccccctcaa gacccgttta gaggccccaa      60
ggggttatgc tagttattgc tcagcggtgg cagcagccaa ctcagcttcc tttcgggctt     120
tgttagcagc cggatcttaa gacgcagcgt aagtaccaga tacaacgcca tttgcaaagt     180
aacgttgcag gttaacacgc tgagtaacgt agtacgcatc acgctgttta ccagcttggc     240
gctcacgttc aacagtaaca gcgcgctgac gtggcattac gaagttatct ttataaacaa     300
```

```
taactgcgaa ctctgctgag ttagctttag ctgggaaata ctcggaaact acaaccggca    360
gaccataaat acgaccaacc tgaccttgca gtttaacaga atcgttacca acctgggcaa    420
catcctgcca ttcttcatct tccagcagat cgtagtaagc atccatagat acgatcagta    480
ccagtttgct cagtttcaga ccatgacgac ccagtttacg acgcagtttg agatagttt     540 tagcagttac tagaacagaa ccatcagctt tagcctcagt aacaaccta gcactatctt     600 cactagcaag ggtcagcaga cctttcggct taccagaacc atcaccagtc atgaaagctt    660
cttcgataga aacagcgtgt gcttcaatca gacgcttacg caacagcggc agcagggaga    720
agattgcatc ttcttcagtt tcatcagtaa taaaggactt ggcagccagt ttgtaagtac    780
tgaagtggat ttcttaaga gctcctttaa cttcctcacc agtagttgta tcggtaccat     840
aagtagaagc agcaacccaa gtagcttac cagcatccgg ttcaaccagc atagtaagaa     900
tcttactgga catcggcagt tcttcgaaca gtgcgccaac taccagctct ttctgcaggt    960
cgcggataat acgctgagag aaaatagttt catagctttc actagaaact tctacggaag   1020
aagactgatt cactgctttc aggtgtctct gaccatgctc ggtctcgaat acgccttttt   1080
ccattacata agataacaga accagttttt ctacttcgtc ttcaaagttt tcctgagtac   1140
catacagtgc tttagctacg ctatcaccga cgaaggaacg accttcacga gctgtcagca   1200
gagatttgat ttcatcctga agaccaacaa tagtttcctg ctgttttct actgtctgcg    1260 caaacagttc attactcttc ttagatttct catccagcga cttaaccagt tccagagcct   1320
cttccagacg cttacggtct tcgccaactg ctttagaaac caggtcattc atacgagcca   1380
gttctttttc ttcctgctct ttacgcatac gttcagcttc ctgagctttc tgagcagcgg   1440
tcagaccttc cagagattta gccagatcac ccagaccaag ttcttctttc agcttattaa   1500
tatcaatagt cattttaaa taattctccg ttattcttta acgtagccta aagctatcgc    1560 aagttttct agttcagaaa gattacgttc ttgagctggg acagcttag aacttattgc     1620 agtaaaagat ttacgccatt cagtataatc atgaccattc atgctcttag cgagattgaa   1680
tgttgagtcc tgattacaag gtacagaaac taccgaaact tcgtatagtt ctaaatcttt   1740
aataataaat atatcagtag cttcatccca ctctgcatct aggcagcgga atccgatact   1800
aaaagttttc agtacaccgt tttaattag tgaaaagata gccgggtcag aacttcata     1860 gatctcacat tcgatttcga gacccatttc agtagggtta agatcaatac acttaccgat   1920
tggacgacga tgatcgtgtc cgaaaagaat aatcgggttt ttcatgtagt tagtaagtgc   1980
attagacgtt ttccacgcag aagcaggaat tacatcacca gcgcgatctt tactaattgt   2040
gttagcgaat ccacggattt ttacaacacc ttctttggat tcgctatcaa tagatttaat   2100
ataagcatct aaatgaacgg gtgctgattt taacttgtta tagtcaatag cagcttgtgt   2160
catttattag cctccaggaa cagtaggatt aactgtcaca gcacatgtag tagaatccat   2220
tcttaatctc cctcggtgga acctttaggt ctaccacctt cttgaccaga tacacctgtt   2280
gcagaaccag cgacgttagc aggaatacgg atcttattca tctgctcatc atctaaaggc   2340
tccaggttca gctctgaacg agcttcgtta ccggttataa taccattatt aaccaatgag   2400
gttaaatgtt tagcctctgc ttctttatct ggtgttaatg ctgcgacttc cttagtatta   2460
ggagtgatct tataaccaaa aaagaaagta agagaactag tcagtttgtt cagcatagga   2520
atgatagtca tataatagaa caattcgatg tttggtcgaa tattcgcatt attaccacca   2580
tcaagcagta cttgcggaac tccaaaggct agacaaatag atttattaaa cccttctatg   2640
```

```
tcttccttaa agtctagatc tttaaaagag gatatttggg agtacggttt agctttcata   2700
ccaccatcta gaatcaggac agaggactga cccgtactag gattataatc gagttgtaat   2760
tcttcttgtt tacgctcacg caatttcttg ttcaggattt catccgtctc aagaataaga   2820
ccaatcacgg ttccgttatc gaggaatttc tctttaaagt taagcatctt agaacgcttc   2880
tcaagagaat caataacagt agcaacacga gattggccag aaatttgaga gtttgtgcca   2940
cacacgtaac tgttatcctt tataaagata atctcatcta cgcgatagtt tatctgatta   3000
ttaaatataa attttttgat aaacttattg gcatctgcct cgacctgcat aagagcggcc   3060
gggacatggt aaagcgatgt gccatcccaa tagatgtatg cacaaccttc aaaaagtagg   3120
tcagtgacta caagtctacg gaatgtgctt atatccatga atggattagg tcgtacattt   3180
aagagagtgt ctagagtctt tgttttgacg ccattagcgt acgtaacaat attatattta   3240
tctccgacag tataagaaca ctccgccgca ctatctataa ccatattagc agttctattg   3300
agaatctcaa ttttactgta ggcttgtcca gtggtaaaag gcttacggtt agtgcgatga   3360
ctaactggtt ccatgtctct tataatacgt tgacccggat ttagcttttc agtaatccag   3420
cttttaaaac ccatggtata tctccttctt aaagttaaac aaaattattt ctagagggga   3480
attgttatcc gctcacaatt cccctatagt gagtcgtatt aatttcgcgg gatcgagatc   3540
tcgatcctct acgccggacg catcgtggcc ggcatcaccg gcgccacagg tgcggttgct   3600
ggcgcctata tcgccgacat caccgatggg gaagatcggg ctcgccactt cgggctcatg   3660
agcgcttgtt tcggcgtggg tatggtggca ggccccgtgg ccgggggact gttgggcgcc   3720
atctccttgc atgcaccatt ccttgcgcg gcggtgctca acggcctcaa cctactactg   3780
ggctgcttcc taatgcagga gtcgcataag ggagagcgtc gagatcccgg acaccatcga   3840
atggcgcaaa acctttcgcg gtatggcatg atagcgcccg gaagagagtc aattcagggt   3900
ggtgaatgtg aaaccagtaa cgttatacga tgtcgcagag tatgccggtg tctcttatca   3960
gaccgtttcc cgcgtggtga accaggccag ccacgtttct gcgaaaacgc gggaaaaagt   4020
ggaagcggcg atggcggagc tgaattacat tcccaaccgc gtggcacaac aactggcggg   4080
caaacagtcg ttgctgattg gcgttgccac ctccagtctg gccctgcacg cgccgtcgca   4140
aattgtcgcg gcgattaaat ctcgcgccga tcaactgggt gccagcgtgg tggtgtcgat   4200
ggtagaacga agcggcgtcg aagcctgtaa agcggcggtg cacaatcttc tcgcgcaacg   4260
cgtcagtggg ctgatcatta actatccgct ggatgaccag gatgccattg ctgtggaagc   4320
tgcctgcact aatgttccgg cgttatttct tgatgtctct gaccagacac ccatcaacag   4380
tattattttc tcccatgaag acggtacgcg actgggcgtg gagcatctgg tcgcattggg   4440
tcaccagcaa atcgcgctgt tagcgggccc attaagttct gtctcggcgc gtctgcgtct   4500
ggctggctgg cataaatatc tcactcgcaa tcaaattcag ccgatagcgg aacgggaagg   4560
cgactggagt gccatgtccg gttttcaaca aaccatgcaa atgctgaatg agggcatcgt   4620
tcccactgcg atgctggttg ccaacgatca gatggcgctg ggcgcaatgc gcgccattac   4680
cgagtccggg ctgcgcgttg gtgcggatat ctcggtagtg ggatacgacg ataccgaaga   4740
cagctcatgt tatatcccgc cgttaaccac catcaaacag gattttcgcc tgctgggca   4800 aaccagcgtg gaccgcttgc tgcaactctc tcagggccag gcggtgaagg gcaatcagct   4860 gttgccgtc tcactggtga aaagaaaaac caccctggcg cccaatacgc aaaccgcctc   4920
tccccgcgcg ttggccgatt cattaatgca gctggcacga caggtttccc gactggaaag   4980
cgggcagtga gcgcaacgca attaatgtaa gttagctcac tcattaggca ccgggatctc   5040
```

```
gaccgatgcc cttgagagcc ttcaacccag tcagctcctt ccggtgggcg cggggcatga    5100
ctatcgtcgc cgcacttatg actgtcttct ttatcatgca actcgtagga caggtgccgg    5160
cagcgctctg ggtcattttc ggcgaggacc gctttcgctg gagcgcgacg atgatcggcc    5220
tgtcgcttgc ggtattcgga atcttgcacg ccctcgctca agccttcgtc actggtcccg    5280
ccaccaaacg tttcggcgag aagcaggcca ttatcgccgg catggcggcc ccacgggtgc    5340
gcatgatcgt gctcctgtcg ttgaggaccc ggctaggctg gcggggttgc cttactggtt    5400
agcagaatga atcaccgata cgcgagcgaa cgtgaagcga ctgctgctgc aaaacgtctg    5460
cgacctgagc aacaacatga atggtcttcg gtttccgtgt ttcgtaaagt ctggaaacgc    5520
ggaagtcagc gccctgcacc attatgttcc ggatctgcat cgcaggatgc tgctggctac    5580
cctgtggaac acctacatct gtattaacga agcgctggca ttgaccctga gtgattttc    5640 tctggtcccg ccgcatccat accgccagtt gtttaccctc acaacgttcc agtaaccggg    5700
catgttcatc atcagtaacc cgtatcgtga gcatcctctc tcgtttcatc ggtatcatta    5760
cccccatgaa cagaaatccc ccttacacgg aggcatcagt gaccaaacag gaaaaaaccg    5820
cccttaacat ggcccgcttt atcagaagcc agacattaac gcttctggag aaactcaacg    5880
agctggacgc ggatgaacag gcagacatct gtgaatcgct tcacgaccac gctgatgagc    5940
tttaccgcag ctgcctcgcg cgtttcggtg atgacggtga aaacctctga cacatgcagc    6000
tcccggagac ggtcacagct tgtctgtaag cggatgccgg gagcagacaa gcccgtcagg    6060
gcgcgtcagc gggtgttggc gggtgtcggg gcgcagccat gacccagtca cgtagcgata    6120
gcggagtgta tactggctta actatgcggc atcagagcag attgtactga gagtgcacca    6180
tatatgcggt gtgaaatacc gcacagatgc gtaaggagaa aataccgcat caggcgctct    6240
ttcgcttcct cgctcactga ctcgctgcgc tcggtcgttc ggctgcggcg agcggtatca    6300
gctcactcaa aggcggtaat acggttatcc acagaatcag gggataacgc aggaaagaac    6360
atgtgagcaa aaggccagca aaaggccagg aaccgtaaaa aggccgcgtt gctggcgttt    6420
ttccataggc tccgcccccc tgacgagcat cacaaaaatc gacgctcaag tcagaggtgg    6480
cgaaacccga caggactata aagataccag gcgtttcccc ctggaagctc cctcgtgcgc    6540
tctcctgttc cgaccctgcc gcttaccgga tacctgtccg cctttctccc ttcgggaagc    6600
gtggcgcttt ctcatagctc acgctgtagg tatctcagtt cggtgtaggt cgttcgctcc    6660
aagctgggct gtgtgcacga accccccgtt cagcccgacc gctgcgcctt atccggtaac    6720
tatcgtcttg agtccaaccc ggtaagacac gacttatcgc cactggcagc agccactggt    6780
aacaggatta gcagagcgag gtatgtaggc ggtgctacag agttcttgaa gtggtggcct    6840
aactacggct acactagaag gacagtattt ggtatctgcg ctctgctgaa gccagttacc    6900
ttcggaaaaa gagttggtag ctcttgatcc ggcaaacaaa ccaccgctgg tagcggtggt    6960
ttttttgttt gcaagcagca gattacgcgc agaaaaaaag gatctcaaga agatcctttg    7020
atcttttcta cggggtctga cgctcagtgg aacgaaaact cacgttaagg gattttggtc    7080
atgaacaata aaactgtctg cttacataaa cagtaataca aggggtgtta tgagccatat    7140
tcaacgggaa acgtcttgct ctaggccgcg attaaattcc aacatggatg ctgatttata    7200
tgggtataaa tgggctcgcg ataatgtcgg gcaatcaggt gcgacaatct atcgattgta    7260
tgggaagccc gatgcgccag agttgtttct gaaacatggc aaaggtagcg ttgccaatga    7320
tgttacagat gagatggtca gactaaactg gctgacggaa tttatgcctc ttccgaccat    7380
```

-continued

```
caagcatttt atccgtactc ctgatgatgc atggttactc accactgcga tccccgggaa    7440
aacagcattc caggtattag aagaatatcc tgattcaggt gaaaatattg ttgatgcgct    7500
ggcagtgttc ctgcgccggt tgcattcgat tcctgtttgt aattgtcctt ttaacagcga    7560
tcgcgtattt cgtctcgctc aggcgcaatc acgaatgaat aacggtttgg ttgatgcgag    7620
tgattttgat gacgagcgta atggctggcc tgttgaacaa gtctggaaag aaatgcataa    7680
acttttgcca ttctcaccgg attcagtcgt cactcatggt gatttctcac ttgataacct    7740 tattttgac gaggggaaat taataggttg tattgatgtt ggacgagtcg gaatcgcaga    7800
ccgataccag gatcttgcca tcctatggaa ctgcctcggt gagttttctc cttcattaca    7860
gaaacggctt tttcaaaaat atggtattga taatcctgat atgaataaat tgcagtttca    7920
tttgatgctc gatgagtttt tctaagaatt aattcatgag cggatacata tttgaatgta    7980
tttagaaaaa taaacaaata ggggttccgc gcacatttcc ccgaaaagtg ccacctgaaa    8040
ttgtaaacgt taatattttg ttaaaattcg cgttaaattt ttgttaaatc agctcatttt    8100
ttaaccaata ggccgaaatc ggcaaaatcc cttataaatc aaaagaatag accgagatag    8160
ggttgagtgt tgttccagtt tggaacaaga gtccactatt aaagaacgtg gactccaacg    8220
tcaaagggcg aaaaaccgtc tatcagggcg atggcccact acgtgaacca tcaccctaat    8280 caagttttt ggggtcgagg tgccgtaaag cactaaatcg aaccctaaa gggagccccc    8340 gatttagagc ttgacgggga aagccggcga acgtggcgag aaaggaaggg aagaaagcga    8400
aaggagcggg cgctagggcg ctggcaagtg tagcggtcac gctgcgcgta accaccacac    8460
ccgccgcgct taatgcgccg ctacagggcg cgtcccattc gcca                    8504
```

<210> SEQ ID NO 14
<211> LENGTH: 408
<212> TYPE: PRT
<213> ORGANISM: Artificial
<220> FEATURE:
<223> OTHER INFORMATION: pb10 mCHERRYH6 pmC

<400> SEQUENCE: 14

```
Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
                20                  25                  30

Pro Ser Tyr Ala Phe Leu Arg Arg Glu Leu Gly Leu Ser Ser Ala His
            35                  40                  45

Thr Asn Arg Lys Val Trp Lys Lys Phe Val Glu Ala Tyr Gly Lys Ala
        50                  55                  60

Ile Pro Pro Ala Pro Ala Pro Leu Thr Leu Ser Lys Asp Leu
65                  70                  75                  80

Thr Ala Ser Met Ser Val Glu Glu Gly Ala Ala Leu Thr Leu Ser Val
                85                  90                  95

Thr Ala Thr Gly Gly Thr Gly Pro Tyr Thr Tyr Ala Trp Thr Lys Asp
                100                 105                 110

Gly Ser Pro Ile Pro Asp Ala Ser Gly Ala Thr Tyr Thr Lys Pro Thr
            115                 120                 125

Ala Ala Ala Glu Asp Ala Gly Ser Tyr Lys Val Thr Val Thr Asp Ser
        130                 135                 140

Lys Gln Val Ser Lys Asp Ser Thr Thr Cys Ala Val Thr Val Asn Pro
145                 150                 155                 160
```

Thr Val Pro Gly Gly Met Val Ser Lys Gly Glu Asp Asn Met Ala
            165                 170                 175

Ile Ile Lys Glu Phe Met Arg Phe Lys Val His Met Glu Gly Ser Val
            180                 185                 190

Asn Gly His Glu Phe Glu Ile Glu Gly Glu Gly Arg Pro Tyr
            195                 200                 205

Glu Gly Thr Gln Thr Ala Lys Leu Lys Val Thr Lys Gly Gly Pro Leu
            210                 215                 220

Pro Phe Ala Trp Asp Ile Leu Ser Pro Gln Phe Met Tyr Gly Ser Lys
225                 230                 235                 240

Ala Tyr Val Lys His Pro Ala Asp Ile Pro Asp Tyr Leu Lys Leu Ser
            245                 250                 255

Phe Pro Glu Gly Phe Lys Trp Glu Arg Val Met Asn Phe Glu Asp Gly
            260                 265                 270

Gly Val Val Thr Val Thr Gln Asp Ser Ser Leu Gln Asp Gly Glu Phe
            275                 280                 285

Ile Tyr Lys Val Lys Leu Arg Gly Thr Asn Phe Pro Ser Asp Gly Pro
            290                 295                 300

Val Met Gln Lys Lys Thr Met Gly Trp Glu Ala Ser Ser Glu Arg Met
305                 310                 315                 320

Tyr Pro Glu Asp Gly Ala Leu Lys Gly Glu Ile Lys Gln Arg Leu Lys
            325                 330                 335

Leu Lys Asp Gly Gly His Tyr Asp Ala Glu Val Lys Thr Thr Tyr Lys
            340                 345                 350

Ala Lys Lys Pro Val Gln Leu Pro Gly Ala Tyr Asn Val Asn Ile Lys
            355                 360                 365

Leu Asp Ile Thr Ser His Asn Glu Asp Tyr Thr Ile Val Glu Gln Tyr
            370                 375                 380

Glu Arg Ala Glu Gly Arg His Ser Thr Gly Gly Met Asp Glu Leu Tyr
385                 390                 395                 400

Lys Ser His His His His His His
            405

<210> SEQ ID NO 15
<211> LENGTH: 316
<212> TYPE: PRT
<213> ORGANISM: Artificial
<220> FEATURE:
<223> OTHER INFORMATION: Nterpb10 mCHERRYH6 pNmC

<400> SEQUENCE: 15

Met Gly Ile Asp Tyr Ser Gly Leu Arg Thr Ile Phe Gly Glu Lys Leu
1               5                   10                  15

Pro Glu Ser His Ile Phe Phe Ala Thr Val Ala Ala His Lys Tyr Val
            20                  25                  30

Pro Ser Tyr Ala Phe Leu Arg Arg Glu Leu Gly Leu Ser Ser Ala His
            35                  40                  45

Thr Asn Arg Lys Val Trp Lys Lys Phe Val Glu Ala Tyr Gly Lys Ala
        50                  55                  60

Ile Pro Pro Ala Pro Pro Ala Pro Pro Met Val Ser Lys Gly Glu Glu
65                  70                  75                  80

Asp Asn Met Ala Ile Ile Lys Glu Phe Met Arg Phe Lys Val His Met
                    85                  90                  95

Glu Gly Ser Val Asn Gly His Glu Phe Glu Ile Glu Gly Glu Gly Glu
            100                 105                 110

Gly Arg Pro Tyr Glu Gly Thr Gln Thr Ala Lys Leu Lys Val Thr Lys
            115                 120                 125

Gly Gly Pro Leu Pro Phe Ala Trp Asp Ile Leu Ser Pro Gln Phe Met
130                 135                 140

Tyr Gly Ser Lys Ala Tyr Val Lys His Pro Ala Asp Ile Pro Asp Tyr
145                 150                 155                 160

Leu Lys Leu Ser Phe Pro Glu Gly Phe Lys Trp Glu Arg Val Met Asn
                165                 170                 175

Phe Glu Asp Gly Gly Val Val Thr Val Thr Gln Asp Ser Ser Leu Gln
            180                 185                 190

Asp Gly Glu Phe Ile Tyr Lys Val Lys Leu Arg Gly Thr Asn Phe Pro
            195                 200                 205

Ser Asp Gly Pro Val Met Gln Lys Lys Thr Met Gly Trp Glu Ala Ser
            210                 215                 220

Ser Glu Arg Met Tyr Pro Glu Asp Gly Ala Leu Lys Gly Glu Ile Lys
225                 230                 235                 240

Gln Arg Leu Lys Leu Lys Asp Gly Gly His Tyr Asp Ala Glu Val Lys
                245                 250                 255

Thr Thr Tyr Lys Ala Lys Lys Pro Val Gln Leu Pro Gly Ala Tyr Asn
                260                 265                 270

Val Asn Ile Lys Leu Asp Ile Thr Ser His Asn Glu Asp Tyr Thr Ile
                275                 280                 285

Val Glu Gln Tyr Glu Arg Ala Glu Gly Arg His Ser Thr Gly Gly Met
290                 295                 300

Asp Glu Leu Tyr Lys Ser His His His His His
305                 310                 315

<210> SEQ ID NO 16
<211> LENGTH: 164
<212> TYPE: PRT
<213> ORGANISM: Phage T5

<400> SEQUENCE: 16

Met Ile Asp Tyr Ser Gly Leu Arg Thr Ile Phe Gly Glu Lys Leu Pro
1               5                   10                  15

Glu Ser His Ile Phe Phe Ala Thr Val Ala Ala His Lys Tyr Val Pro
            20                  25                  30

Ser Tyr Ala Phe Leu Arg Arg Glu Leu Gly Leu Ser Ser Ala His Thr
        35                  40                  45

Asn Arg Lys Val Trp Lys Lys Phe Val Glu Ala Tyr Gly Lys Ala Ile
    50                  55                  60

Pro Pro Ala Pro Pro Ala Pro Pro Leu Thr Leu Ser Lys Asp Leu Thr
65                  70                  75                  80

Ala Ser Met Ser Val Glu Glu Gly Ala Ala Leu Thr Leu Ser Val Thr
                85                  90                  95

Ala Thr Gly Gly Thr Gly Pro Tyr Thr Tyr Ala Trp Thr Lys Asp Gly
            100                 105                 110

Ser Pro Ile Pro Asp Ala Ser Gly Ala Thr Tyr Thr Lys Pro Thr Ala
        115                 120                 125

Ala Ala Glu Asp Ala Gly Ser Tyr Lys Val Thr Val Thr Asp Ser Lys
    130                 135                 140

```
Gln Val Ser Lys Asp Ser Thr Thr Cys Ala Val Thr Val Asn Pro Thr
145                 150                 155                 160
Val Pro Gly Gly
```

PRODUCTION AND FUNCTIONALIZATION OF NANOPARTICLES DERIVED FROM PHAGE T5 AND THERAPEUTIC USES

REFERENCE TO SEQUENCE LISTING SUBMITTED ELECTRONICALLY

This application contains a sequence listing, which is submitted electronically via EFS-Web as an ASCII formatted sequence listing with a file name "Sequence_Listing", creation date of Mar. 17, 2022, and having a size of 63,428 bytes. The sequence listing submitted via EFS-Web is part of the specification and is herein incorporated by reference in its entirety.

CROSS-REFERENCE TO RELATED APPLICATIONS

This application is a U.S. National Stage Application pursuant to 35 U.S.C. § 371 of International Patent Application PCT/FR2020/051628, filed on Sep. 18, 2020, and published as WO 2021/053309 on Mar. 25, 2021, which claims priority to French Patent Application 1910305, filed on Sep. 18, 2019, all of which are incorporated herein by reference in their entireties for all purposes.

FIELD OF THE INVENTION

The present invention is in the field of bacterial virology, biochemistry and virotherapy. It concerns phage T5 capsids devoid of genomic DNA from the phage and exposing, on their surface at least one fusion protein of interest, especially of therapeutic interest. The present invention also relates to production methods for such a capsid and vectors enabling their production. The invention also concerns the fusion proteins of interest exposed on the capsid and the nucleic acids coding for them. The invention also concerns nanoparticles comprising these functionalized capsids, pharmaceutical compositions comprising these nanoparticles and/or these functionalized capsids and therapeutic uses thereof, particularly as a medicament and/or vaccine.

STATE OF THE ART

Phages (or bacteriophages) are bacteria viruses that are omnipresent throughout the biosphere. The largest family of bacteria viruses includes caudate bacteriophages, consisting of an icosahedral capsid containing the viral genome which is a double-stranded DNA molecule, and a tail allowing the injection of the genome into the host cell. Icosahedral capsids of these viruses are extremely stable macromolecular assemblies that often expose so called "decoration" proteins on their surface. These proteins can be genetically modified in order to produce viruses bearing chimerical proteins, formed from native protein fused to a functional protein of therapeutic or biotechnological interest (Tao et al. 2013; Razazan et al. 2018). The approach developed to date to obtain viruses or only their capsid decorated with chimeric proteins, consists of modifying the decoration protein in the virus genome or in a plasmid then producing viral particles from infection of their bacterial hosts. However, the viral genome is integrated into the particles and capsids thus produced, thereby limiting their therapeutic and biotechnological applications. Indeed, particles thus produced can still be infectious, with a non-negligible risk of genetic mutations (especially being able to cause reversion to wild type). In addition to health and therapeutic risks, genetic mutations present a problem for homogenous production at the industrial scale.

In this context, it appears necessary to be able to eliminate the presence of the viral nucleic acid. However, the possibility of producing capsids devoid of DNA, purifying them and decorating them in a customized manner with a functionalized protein remains unexplored. Yet such capsids would have at least the advantages of being safe and without therapeutic and health risk, while enabling large-scale production (especially industrial scale). Indeed, the absence of viral genome makes it possible to eliminate any risk of mutation or reversion to wild type and ensures a high level of reproduction and entirely controlled and monitored in vivo proliferation, the potential biotechnological and therapeutic applications being provided by the custom functionalization of these particles and capsids. There is therefore a strong need to develop phage particles and capsids that are both functionalized and free of genomic nucleic acid.

Bacteriophage T5, which infects the *Escherichia coli* bacteria, has a 90-nm diameter capsid that self-assembles by going through different structural states whose maturation follows a well-defined sequence of steps (FIG. 1). An icosahedral procapsid is initially assembled from the major capsid protein pb8, the portal protein pb7 and the processing protease pb11. The procapsid is processed by the protease pb11, which produces an empty capsid, ready to receive the viral genome. The encapsidation of DNA is ensured by a molecular motor and this step is accompanied by a structural reorganization of the subunits of the capsid protein, causing the capsid to expand. The monomeric decoration protein pb10 can then decorate the outer surface of the expanded mature form thus obtained and 120 copies can thereby be exposed.

It has been shown that it is possible to produce and purify undecorated empty capsids, which do not contain viral genome (Preux et al. 2013). Capsid expansion can be induced in vitro. The undecorated capsids thus obtained then have the same geometry as the capsids of the infectious particle (FIG. 1B and article by Preux et al. 2013).

It has been shown that the decoration protein pb10 binds the capsid of phage T5 with a high affinity (measured by a dissociation constant $K_D=10^{-12}$ M). The structure of the decoration protein pb10 shows a protein formed of two independent domains, an N-terminal domain for binding the capsid and an external C-terminal domain exposed to the solvent (FIG. 1C, Vernhes et al. 2017). However, the affinity of the chimeric decoration proteins formed from the fusion of the decoration protein with a functional protein of therapeutic or biotechnological interest to the capsid has not been studied. Thus, the possibility of producing T5 capsids devoid of viral genomic DNA, exposing a functionalized protein has not yet been explored.

There is therefore a strong need to develop functionalized phage T5 particles and capsids that do not have a risk of infection or reversion, as well as for methods for large-scale production of such particles and capsids, suited to therapeutic and biotechnological uses.

The present invention makes it possible to respond to these needs. The Inventors have designed novel chimeric proteins consisting of the whole protein pb10 fused with a protein of interest or only the N-terminal domain of pb10 fused with a protein of interest that replaces the C-terminal domain. They have especially demonstrated for the first time that these modified proteins, called fusion proteins, can be correctly exposed on the surface of T5 capsids entirely devoid of genomic DNA, with great efficiency. The data particularly show that, completely unexpectedly, the affinity of these modified proteins for the phage T5 capsid is identical to that of the native protein pb10. The empty T5 capsid (devoid of genome) therefore constitutes a nanoparticle of biological origin that is safe and able to expose on its surface 120 copies of a protein whose function can vary with the nature of the molecule of interest which is fused to the decoration protein.

The Inventors have also shown, in a completely surprising manner, that it is possible to produce these functionalized empty capsids without going through the production of a mutant phage. This is all the more advantageous and surprising as the production protocol for capsids devoid of DNA to date requires a step of infecting a bacterial culture with a mutant phage. However, this step requires the production of a large stock of phage upstream of capsid production. Further, during infection, a high frequency of reversion to wild type is observed, which reduces the yield of empty capsids. In order to overcome these constraints and from the perspective of increasing the scale of capsid production, the Inventors have developed a system for capsid production and decoration that is totally independent of bacteriophage T5. This system is based on the construction of recombinant plasmids bearing genes coding uniquely for bacteriophage T5 capsid proteins. Thanks to this system, it is possible to produce either empty decorated and functional capsids directly or expanded and undecorated capsids which can then be decorated in a second step by simple contact with the fusion protein of interest. The data show, completely unexpectedly, that the expression of these plasmids in bacteria leads to the assembly of capsids whose morphology is similar to that of capsids produced by the conventional method using a complete phage (mutant or otherwise), and whose decoration properties are comparable to those of capsids produced from the complete phage. Indeed, the data show that the self-assembling properties of capsids from the ectopic expression of capsid genes, outside the viral cycle of phage T5, are conserved. The inventors have thus developed a simplified method for large-scale production of recombinant capsids devoid of genomic DNA, which can be decorated in two different ways: i) by in vitro addition of the purified decoration protein; ii) by co-production in situ of the decoration protein.

The inventors have also validated, for the first time, the potential for biotechnological applications (especially therapeutic ones) of empty phage T5 capsids thus functionalized. Thus, the Inventors' data show that, in a completely surprising way, the administration of these capsids functionalized by an antigen in a mouse model induces effective immunization with significant induction of a humoral response (antibody) and a cellular response. This immunization results in effective vaccination of these mice. These unexpected results show that the fusion protein, exposed by these capsids, conserves all of its properties and functions. With regard to the data obtained by the Inventors and presented in substance in the example section that follows, it appears that the present invention has as many biotechnological and therapeutic applications as there are different fusion proteins that can be constructed.

DISCLOSURE OF THE INVENTION

In the context of the present invention, the Inventors have, in a completely surprising manner, developed empty phage T5 capsids, devoid of phage genomic DNA, exposing fusion proteins of interest on their surface. These functionalized capsids can be produced on a large scale, while avoiding the viral cycle of phage T5, with high reproducibility. Moreover, these functionalized capsids are able to exert the functions and activities of the fusion protein of interest used in vivo.

The present invention therefore concerns a phage T5 capsid devoid of the genomic DNA of said phage and exposing, on its surface, at least one fusion protein, comprising at least one peptide or protein fragment having at least 80% identity with a fragment of a decoration protein pb10, as well as these production methods. The invention especially concerns a method for producing such a capsid, consisting of obtaining a vector coding for phage T5 capsid proteins, as well as said vector.

The present invention also concerns the fusion proteins of interest exposed on the capsid and the nucleic acids coding for them. The invention also concerns nanoparticles comprising these functionalized capsids, pharmaceutical compositions comprising these nanoparticles and/or these functionalized capsids and therapeutic uses thereof, particularly as a medication and/or vaccine.

DETAILED DESCRIPTION OF THE INVENTION

Definitions

Figure 1:
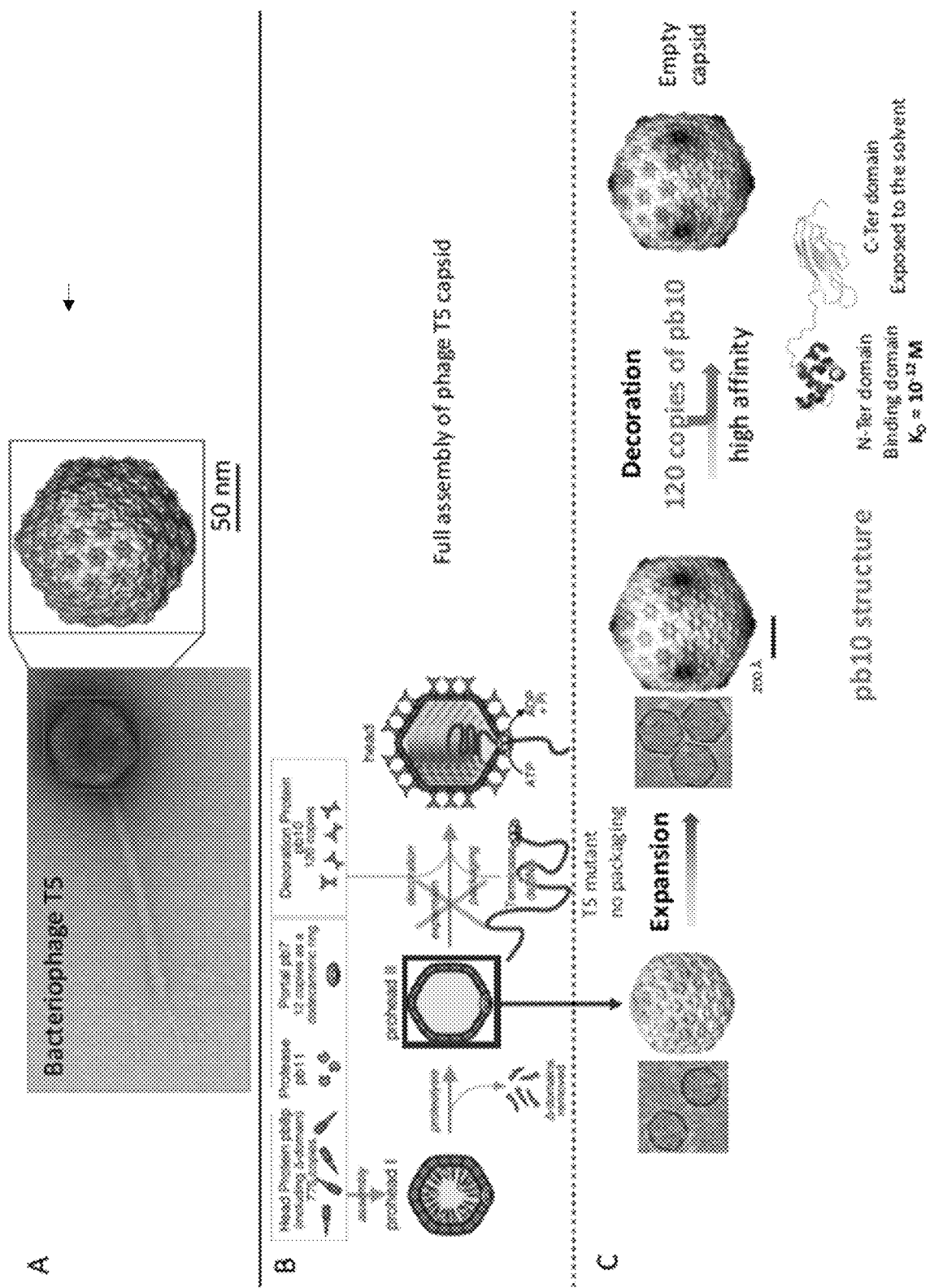
FIG. 1 shows the maturation cycle of phage T5. A) Electron microscope image with negative staining of bacteriophage T5 and reconstruction of the bacteriophage T5 capsid from cryo-electronic microscopy data. The decoration protein pb10 is stained red (120 copies bound on the surface of the capsid). B) Diagram of the assembly mechanism of the bacteriophage T5 capsid. The precursor for the major capsid protein, pb8p, consists of a scaffold domain called A domain (residues 1 to 159, represented by a gray triangle) and a mature structural domain, pb8m (residues 160 to 458, represented by a purple rectangle). pb8p self-assembles into an icosahedral procapsid called prohead I which includes the dodecameric complex of the portal protein (pb7). The protease (pb11) also located inside prohead I performs the cleavage of the A domain of the pb8p subunits as well as the 10 N-terminal amino acids of the portal and it self-proteolyses at both ends to form prohead II. The encapsidation of the genome by the terminase through the portal complex induces the expansion of the capsid and the binding of the decoration protein (pb10) on the capsid surface. The capsid is finally closed by a sealing protein p144 which forms with the portal a connector allowing the attachment of the tail of the phage which is assembled separately. C) The infection of bacteria by a phage T5 mutated in the terminase gene and unable to encapsidate DNA leads to accumulation of prohead I forms, which can be purified and expanded in vitro, then decorated by the decoration protein pb10.

"Phage" or "Bacteriophage" or "bacteria virus" means a virus that infects bacteria. Phages are bacteria viruses that are omnipresent throughout the biosphere. At the start of the 2000s, more than 5000 different bacteriophages were observed and described. The earliest phages described, those whose structure has been studied the most, are generally made up of a protein shell or capsid (enveloping and protecting the central nucleic acid molecule) and an apparatus specific to the complex structure (the tail) by which the phage binds to the bacterial host to inject its nucleic acid (genetic material, or genome) into it. However, not all bacteriophages conform to this conventional model and they can currently be grouped into four major morphological groups: double-stranded DNA phages with tails (representing more than 95% of the phages described); phages without tails, with cubic symmetry and single-stranded DNA; RNA phages; filamentous phages with single-stranded DNA. Isometric bacteriophages (with DNA) containing 12 to 14% of lipids in the form of a double layer located between the outer and inner shells of the viral capsid (phage PM2) have also been described. Phage dimensions vary from 24 to 200 nm. When the genetic material is a double-stranded DNA molecule (which is the case of 95% of the known phages), the length thereof can vary from 5 to 650 kilobases (kbp).

Thus, different criteria can be applied to classify the phages into different morphotypes and distribute them within families. These criteria especially consider the shape and dimensions of the head, the structure of the tail, the presence or absence of a contractile caudal sheath, the structure (rudimentary or complex) of the baseplate, the overall dimensions of the virion, the nature of the nucleic acid (double-stranded DNA, single-stranded DNA, RNA) etc. For example, phages having a tail are classified into the Caudovirales family (also called caudate phage or caudate virus). The morphology of the tail makes it possible to subdivide this large family into 3 groups:

Siphoviridae, characterized by a long, non-contractile tail, forming the largest family (60% of caudate viruses; e.g.: phage T5);

Myoviridae have long, contractile tails, composed of an outer tube that contracts around the central rigid tube when the virus is on the surface of its bacterial host. The rigid tube then punctures the bacteria wall and creates a passage for the phage DNA (e.g.: phage T4)

Podoviridae have small, non-contractile tails. They integrate proteins in their capsid that serve to pack DNA into the capsid during virion formation and which are ejected into the host wall prior to DNA ejection (e.g.: phages T7 and P22).

Phages require a bacterial host to reproduce, into which they inject their genetic material. Once inside the bacterial host, the viral genome is generally replicated and translated by the host enzymes and ribosomes (in some cases, some viral proteins can also be involved), to form numerous copies of the phage which are released with the lysis of the bacterial host, this is called the lytic or production cycle. For some bacteriophages, the genetic material is replicated and integrated into the bacterial chromosome (or exists in the plasmid form) but is not expressed to form virions. The virus is thus designated by the term prophage, which is transmitted to the descendants of the infected bacterium (lysogenic line) and this is called lysogeny or lysogenic cycle. In response to an induction (e.g.: stress to the bacteria), the lysogenic infection switches to a lytic cycle.

Thus, phages can also be classified according to their replication cycle:
- phages called "virulent phages": these are strictly lytic;
- phages called "temperate phages" which can generate lytic infections or lysogenic infections;
- chronic infection phages, which do not induce lysis of the infected cell, but rather bud at the bacterial membrane without breaking it (chronic infection). This is the case of filamentous phages such as M13 or f1 of *Escherichia coli*.

Lytic phages can also be characterized by the presence of "lysis plaques." The infection of a bacterial cell by a single phage can induce its lysis at the end of 20 to 30 minutes with release of several tens or hundreds of phage particles. In the laboratory, each particle thus released will infect a new bacterium and restart the lytic cycle. As a result of these microscopic cascading lyses, "lysis plaques" form in the bacterial mat on the surface of the agars, making it possible to read the test results with the naked eye. The size and appearance of these lysis plaques is a phenotype contributing to characterizing the phages.

"Phage T5" means a virus belonging to the genus *Tequintavirus* (synonyms: T5-like phages, T5-like viruses, T5likevirus), included in the Demerecviridae family, itself belonging to the Caudovirales order (also called "caudate" viruses).

T5 belongs to the Siphoviridae suborder among Caudovirales. It therefore has a long, non-contractile tail. This is a strictly lytic phage that especially infects *Escherichia coli*. Phage T5 consists of an icosahedral capsid of 90-nm diameter containing its genome (double-stranded DNA containing 121,000 base pairs (121 kbp), as well as a 250 nm tail that allows it to recognize the target bacterium and inject its genome into it. The end of the tail is terminated by a cone shape at the tip of which is found a binding protein specific to the T5 receptor. This receptor is a protein of the external bacterial membrane (FhuA in the case of T5, other membrane receptor for other *Tequintavirus*). The tail is also equipped with three long fibers attached to the base of the cone that interact with the sugar part of the lipopolysaccharides on the bacterial surface.

The genome of bacteriophage T5 can be divided into three parts, distributed as follows:
- approximately 8% of the total genome, at the end injected first. This part of the genome, called "direct terminal repeat" is repeated in the same orientation at the other end of the DNA in position 92-100%. It codes for the proteins involved in stopping bacterial replication/transcription/translation as well as the destruction of host DNA, as well as a deoxyribonucleotidase;
- 8 to 67% of the genome, coding for early genes (expressed at the end of the injection of viral DNA). These genes code for proteins involved in DNA replication, nucleotide metabolism and cell lysis factors;
- from 67 to 92% of the genome, mainly comprising late genes (expression from 12-13 minutes post-infection).

These are mainly so-called "structural" genes, whose encoded proteins serve for the assembly of new virions.

The bacteriophage T5 capsid self-assembles by going through different structural states whose maturation follows a well-defined sequence of steps (FIG. 1). An icosahedral procapsid is initially assembled, made up of 775 copies of the major capsid protein pb8, organized into 11 pentamers forming 11 of the 12 vertices of the capsid and 120 hexamers forming the faces. Protein pb8 (51 kDA) is synthesized in the form of a precursor including a Δ domain, corresponding to 159 N-terminal amino acids of the protein, which serves as the scaffolding domain during capsid assembly. The twelfth vertex of the capsid is formed by a dodecamer of the portal protein pb7 (47 kDa), which constitutes an inlet pore for DNA. This procapsid also contains the protease pb11 which ensures cleavage of 775 copies of the A domain of pb8, cuts the 10 N-terminal residues of the portal protein and self-proteolyzes to produce an empty capsid, ready to receive the viral genome. The encapsidation of DNA is ensured by a molecular motor and this step is accompanied by a structural reorganization of the 775 subunits of the capsid protein, causing the capsid to expand. The mature expanded form has, in the center of the hexamers, binding sites for the monomeric protein pb10 (17.3 kDa) of which 120 copies will decorate the external surface of the icosahedron.

"Capsid" or "phage capsid" means the structure that surrounds the genome (nucleic acid, DNA or RNA) of a phage, without the tail. It consists of very many protein units that group to form identical structural assemblies called capsomers. The nucleocapsid is the assembly formed of the phage capsid (present in non-enveloped or enveloped phages, the envelope not being the capsid, but rather a lipoprotein envelope surrounding the capsid) and the viral genome (RNA or DNA). According to the geometric ratios that the capsomers exhibit among themselves and with the genome that they cover and protect, three classes of nucleocapsids can be defined:
- Helically-symmetrical nucleocapsids;
- Icosahedral nucleocapsids, which exhibit all or part of the elements of symmetry of icosahedrons and whose structure is therefore nearly geodesic;
- Mixed-symmetry nucleocapsids, which can have a helically-symmetrical structure combined with an icosahedral structure.

"Empty capsid" means a capsid not comprising phage genome (devoid of phage nucleic acid). An empty capsid is therefore a capsid that has not encapsidated (incorporated) the phage genome. In the case of phage T5, for example, an empty capsid is a capsid devoid of phage T5 genomic DNA. Preferably, an empty capsid of a phage is a capsid devoid of any nucleic acid of said phage. More preferably, an empty capsid is a capsid devoid of any nucleic acid (for example, devoid of nucleic originating from the phage, the host cell and the producing cell, preferably devoid of contaminant nucleic acid). "Devoid of nucleic acid" or "not comprising nucleic acid" means a substance comprising less than 5% of nucleic acid, preferably less than 4%, preferably less than 3%, preferably less 2%, preferably less than 1%, preferably less than 0.5%, preferably less than 0.1%, preferably less than 0.01%, preferably less than 0.001%, preferably less than 0.0001%, preferably less than 0.00001%, preferably less than 0.000001%, of nucleic acid (by molar mass).

"Capsid protein" or capsid structural protein" means a protein involved in the structure of" the phage capsid. In other words, capsid structural protein means a component that is part of the capsid. In the case of phage T5, these proteins especially comprise the major capsid protein pb8, the portal protein pb7, the protease pb11 and the decoration protein pb10.

"Phage T5 capsid decoration protein" or "decoration protein pb10" or "protein pb10" or "pb10" means a monomeric protein of phage T5, binding to the outer surface of the phage T5 capsid, preferably on the hexamers forming the faces of the phage T5 capsid, preferably on binding sites present on the hexamers forming the faces of the phage T5 capsid, more preferably on binding sites present at the center of the hexamers forming the faces of the phage T5 capsid. The decoration protein pb10, made up of 164 amino acids (Reference examples for pb10: GenBank: AAU05286.1 or NCBI: YP_006979.1, such as presented in SEQ ID: 16), comprises two independent domains, an N-terminal domain for binding to the capsid and an exposed external C-terminal domain, i.e., shown at the external part of the capsid. These two domains are separated by a short "linker" or hinge of the polyproline type. The decoration protein pb10 has, for example, the amino acid sequence SEQ ID NO: 1, which respectively includes one and two additional amino acids in N-terminal and C-terminal positions, which can be introduced by cloning requirements. Alternatively, the decoration protein pb10 can have the exact sequence of the native protein if the cloning techniques used for its expression do not introduce any change in its amino acid sequence (this is, for example, in the case of amino acid sequence SEQ ID NO: 16). The terms "phage T5 capsid decoration protein", "decoration protein pb10", "protein pb10" and "pb10" are used interchangeably here.

"N-terminal domain of a protein pb10" means the domain located in the N-terminal position of the protein pb10, i.e., the domain of the protein pb10 comprising (or essentially consisting of, or consisting of) the first 80 amino acids of the protein pb10 sequence (i.e., the amino acids from position 1 to position 80, inclusive). The N-terminal domain of the protein pb10 especially comprises the capsid binding domain. The N-terminal domain of the protein pb10 has, for example, the amino acid sequences SEQ ID No: 3 corresponding to the first 80 consecutive amino acids of SEQ ID NO: 1. The N-terminal domain of the protein pb10 can alternatively have, for example, the amino acid sequences corresponding to the first 77 consecutive amino acids of SEQ ID NO: 16, or even the amino acid sequence corresponding to the 76 consecutive amino acids comprised between position 2 and 77 (inclusive) of SEQ ID NO: 16.

"C-terminal domain of a protein pb10" means the domain located in the C-terminal position of the protein pb10, i.e., the domain comprising (or essentially consisting of, or consisting of) the last 92 amino acids of the protein pb10 sequence such as defined in SEQ ID NO: 1 (i.e., the amino acids from position 74 to position 165, inclusive). The C-terminal domain of the protein pb10 especially comprises the exposed external domain, i.e., shown at the external part of the capsid.

"Major capsid protein pb8" or "pb8" means a phage T5 protein that is organized into 11 pentamers to form 11 of the 12 vertices of the T5 capsid and 120 hexamers forming the faces. The protein pb8 (51 kDa) is synthesized in the form of a precursor of 51 kDa including a Δ domain that corresponds to 159 N-terminal amino acids of the protein. The A domain serves for scaffolding during assembly of the procapsid and then this domain is cleaved by the protease pb11 to form the capsid. The major capsid protein pb8 has, for example, the amino acid sequence SEQ ID NO: 8.

"Portal protein pb7" or "pb7" means a phage T5 protein that is organized into a dodecamer to form 1 of the 12 vertices of the phage T5 capsid. This dodecamer is an entry pore for phage DNA. The protein pb7 is approximately 47 kDa. The portal protein pb7 has, for example, the amino acid sequence SEQ ID NO: 7.

"Protease pb11" or "pb11" means a phage T5 protein which ensures cleavage of 775 copies of the A domain of pb8, cuts the 10 N-terminal residues of the portal protein and self-proteolyzes to produce an empty capsid, ready to receive the viral genome. The protease pb11 has, for example, the amino acid sequence SEQ ID NO: 9.

"Decorated capsid" means a capsid comprising at least one decoration protein and/or at least one fusion protein exposed on its surface. Typically, the decoration protein is exposed on at least one of the faces making up the capsid.

Figure 3:
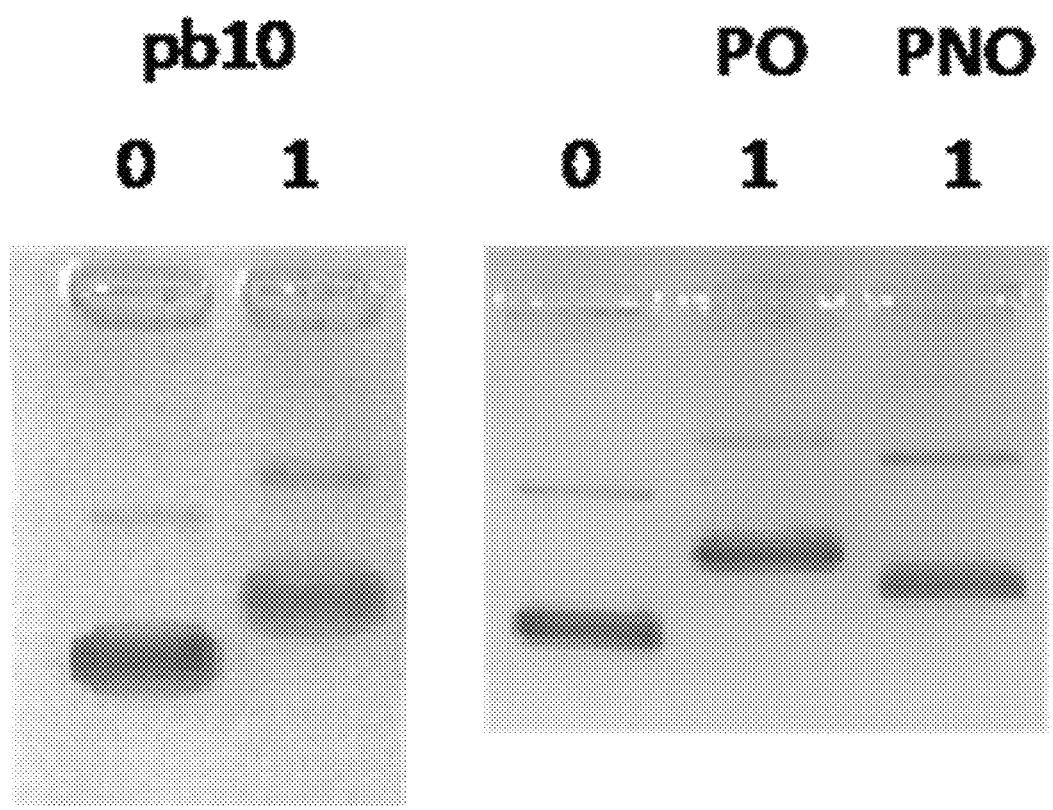
FIG. 3 shows the tests of the decoration of pure empty capsids with proteins pb10, PO and PNO. The respective concentrations of the different decoration proteins and capsids have been adjusted to have [protein]/[binding sites on the capsid] concentration ratios=1+/−0.1.

"Mature expanded form of a capsid" or "expanded form" means a bacteriophage T5 capsid of diameter measured by cryo-electron microscopy of 90 nm+/−2 nm as described in the reference Preux et al. 2013 (DOI: 10.1016/j.jmb.2013.03.002), able to bind 120 copies of the decoration protein pb10, a property that is assessed by native agarose gel retardation experiments showing a decrease in capsid electrophoretic mobility for a ratio [pb10 copy number]/[pb10 binding site number]=1+/−0.1 as described in the reference Vernhes et al. 2017 (DOI: 10.1038/srep41662) and in FIG. 3.

"Nucleic acid molecule" or "nucleic acid" means a polymer of any length of deoxyribonucleic acid (DNA), or polydeoxyribonucleotides, especially including complementary DNAs or cDNAs, genomic DNAs, plasmids, vectors, viral genomes, isolated DNA, probes, primers and any mixture of these; or a polymer of any length of ribonucleic acid (RNA), or polyribonucleotides, especially including messenger RNA or mRNA, antisense RNA; or mixed polyribo-polydeoxyribonucleotides. These encompass single or double strand, linear or circular, natural or synthetic polynucleotides. Moreover, a polynucleotide can comprise non-natural nucleotides and can be interrupted by non-nucleotide components.

In the context of the present invention, the terms "nucleic acid," "nucleic acid molecule", "polynucleotide" and "nucleotide sequence" are used interchangeably.

"Genome" means the collection of genetic material of a species encoded in its deoxyribonucleic acid (DNA) or its ribonucleic acid (RNA). DNA or RNA in particular contain all the genes coding for proteins or corresponding to structural RNAs. It is broken down into coding sequences (transcribed into messenger RNA and translated into proteins) and non-coding sequences (not transcribed, or transcribed into RNA but not translated). "Genomic DNA" therefore means the genome that is present in the form of DNA.

"Phage genomic DNA" means the collection of genetic material of a phage that is present in the form of DNA.

"Capsid devoid of phage genomic DNA" means a capsid comprising less than 5% phage genomic DNA (whole genomic DNA or fragments) by molar mass, preferably less than 4%, preferably less than 3%, preferably less than 2%, preferably less than 1%, preferably less than 0.5%, preferably less than 0.4%, preferably less than 0.3%, preferably less than 0.2%, preferably less than 0.1%, preferably less than 0.01%, preferably less than 0.001%, preferably less than 0.0001%, preferably less than 0.00001%, preferably less than 0.000001%, of phage genomic DNA, by molar mass. Advantageously, the capsid devoid of phage genomic DNA does not comprise any trace of phage genomic DNA. In other words, the capsid is pure of phage genomic DNA. More advantageously, the capsid devoid of phage genomic DNA does not comprise any trace of any other phage nucleic acid. In other words, the capsid is pure of phage nucleic acid. According to an advantageous embodiment, the capsid devoid of phage genomic DNA does not comprise bacterial genomic DNA and/or does not comprise bacterial plasmid DNA, or does not comprise any DNA, or does not comprise any nucleic acid. Advantageously the capsid devoid of phage genomic DNA comprises less than 5% of DNA from bacteria (whole genomic DNA or fragments, plasmids), preferably less than 4%, preferably less than 3%, preferably less than 2%, preferably less than 1%, preferably less than 0.5%, preferably less than 0.4%, preferably less than 0.3%, preferably less than 0.2%, preferably less than 0.1%, preferably less than 0.01%, preferably less than 0.001%, preferably less than 0.0001%, preferably less than 0.00001%, preferably less than 0.000001%, by molar mass.

"Isolated molecule" means a molecule, especially a protein, a polypeptide, a peptide, a nucleic acid molecule, a plasmid vector, a viral vector or a host cell, which is extracted from its natural environment (i.e., separated from at least one other component with which it is naturally associated).

"Polypeptide", "protein" and "peptide" mean polymers of amino acid residues that comprise at least nine amino acids bound by peptide bonds. The polymer may be linear, branched or cyclic. The polymer may comprise natural amino acids and/or amino acids analogs and it may be interrupted by non-amino acid residues. As a general indication and without, however, being bound thereby in the present application, if the amino acid polymer contains more than 50 amino acid residues, it is preferably called a polypeptide or a protein, whereas if the polymer consists of 50 amino acids or less, it is preferably called a "peptide". The direction of reading and writing an amino acid sequence of a polypeptide, protein and peptide as used here is the conventional reading and writing direction. The conventional reading and writing for amino acid sequences of a polypeptide, protein and peptide puts the amine terminus on the left, the sequence then being written and read from the amine terminus (N-terminus) to the carboxyl terminus (C-terminus), from left to right.

"Vector" means a vehicle, preferably a nucleic acid molecule or a viral particle, which contains the elements necessary to allow the administration, propagation and/or expression of one or more nucleic acid molecules in a host cell or organism.

From the functional viewpoint, this term encompasses vectors for maintenance (cloning vectors), vectors for expression in various host cells or organisms (expression vectors), extrachromosomal vectors (for example, multicopy plasmids) or integration vectors (for example, designed to be integrated into a host cell genome and produce additional copies of the nucleic acid molecule it contains when the host cell replicates). This term also encompasses shuttle vectors (for example, functioning in both prokaryotic and/or eukaryotic hosts) and transfer vectors (for example for the transfer of nucleic acid molecule(s) into the genome of a host cell).

From the structural viewpoint, the vectors can be natural, synthetic or artificial genetic sources, or a combination of natural and artificial genetic elements.

Thus, in the context of the invention, the term "vector" should be understood broadly by including plasmid and viral vectors.

A "plasmid" such as used here designates a replicable DNA construction. Usually, plasmid vectors contain selection marker genes that allow host cells bearing the plasmid to be identified and/or positively or negatively selected in the presence of the compound corresponding to the selection marker. A variety of positive or negative selection marker genes are known in the art. By way of illustration, an antibiotic resistance gene can be used as a positive selection marker making it possible to select a host cell in the presence of the corresponding antibiotic.

The term "viral vector" as used here refers to a nucleic acid vector that comprises at least one element of a virus genome and can be packaged in a viral particle or a viral particle. Viral vectors can be replication-competent or selective (for example, designed to replicate better or selectively in specific host cells), or can be genetically deactivated such that they are replication-deficient or defective.

"Host cell" means a cell containing at least one capsid according to the invention, or at least one capsid capable of being obtained by the production method according to the invention, or at least one vector according to the invention, or at least one nucleic acid molecule according to the invention, or any mixture of these. Advantageously, the host cell is capable of expressing the genes encoded by the vector according to the invention and/or of producing the vector of the invention. More advantageously, the host cell is capable of being infected by a phage (preferably a phage T5) and/or producing a phage T5 and/or producing a phage T5 capsid (empty or otherwise, decorated or otherwise). More advantageously, the host cell is capable of producing an empty phage T5 capsid decorated with the fusion protein according to the invention. More advantageously, the host cell is capable of producing an empty phage T5 capsid, in an expanded mature form, preferably decorated with the fusion protein according to the invention.

The host cell can be made up of a single type of cells or a group of different types of cells. The host cell can also be a hybrid cell, i.e., resulting from the fusion of at least two cells of different types. The host cell can belong to cultured cell lines, primary cells, stem cells or proliferative cells. The term "host cells" comprises prokaryotic cells, lower eukaryotic cells such as yeast cells, and other eukaryotic cells such as fungus cells, insect cells, plant cells, algae cells, microalgae cells, parasite cells, animal cells and mammalian cells (for example, human or non-human, preferably non-human). The host cell can be a differentiated cell, a pluripotent cell, a totipotent cell, a stem cell, an induced pluripotent stem cell (iPSC), an induced totipotent stem cell, or even an embryonic cell or embryonic stem cell. In the case of an embryonic cell or embryonic stem cell, the cell is preferably a non-human.

The term "host cell" more broadly comprises cells which contain or have contained the nucleic acid molecule according to the invention, as well as descendants of such cells.

The host cell can be isolated, for example, or organized in tissue, organ or even a within complete organism. In the case where the host cell is a within complete organism, said organism is not human. The host cells is advantageously a bacterium, preferably a bacterium of the Enterobacteriaceae family, more preferably a bacterium of the *Escherichia* genus, more preferably an *Escherichia coli* bacterium.

"Identity" or "sequence identity" means an exact sequence correspondence between two polypeptides or two amino acid molecules. The percentages of identity to which reference is made in the context of the disclosure of the present invention are determined after optimal alignment of the sequences to compare, which can therefore comprise one or more additions, deletions, truncations and/or substitutions. This percentage of identity can be calculated by any analysis method well known to the skilled person. The percentage of identity can be determined after global alignment of the sequences to be compared taken in their entirety, over their entire length. In addition to manually, it is possible to determine the global sequence alignment using the Needleman-Wunsch algorithm (1970).

For nucleotide sequences, the sequence comparison can be done using any software well known to the skilled person, such as, for example, Needle software. Useful parameters can especially be as follows: "Gap Open" equal to 10.0, "Gap Extend" equal to 0.5 and EDNAFULL matrix (EMBOSS version of NCBI NUC4.4).

For amino acid sequences, the sequence comparison can be done using any software well known to the skilled person, such as, for example, Needle software. Useful parameters can especially be as follows: "Gap Open" equal to 10.0, "Gap Extend" equal to 0.5 and BLOSUM62 matrix).

Preferably, the percentage of identity defined in the context of the present invention is determined by means of a global alignment of sequences to compare over their entire length. By way of illustration, "at least 80% sequence identity", as used herein, represents 80%, 81%, 82%, 83%, 84%, 85%, 86%, 87%, 88%, 89%, 90%, 91%, 92%, 93%, 94%, 95%, 96%, 97%, 98%, 99% or 100% sequence identity.

"Fusion protein" means an artificial protein obtained by combining a protein (hereinafter referred to as "protein F"), or one or more part(s) of a protein (hereinafter referred to as "part(s) of protein F"), with one or more different protein(s) (or one or more part(s) of different protein(s) (i.e., said one or more protein(s) and one or more part(s) of protein(s) are different from protein F and/or any part thereof) or with one or more non-protein molecule(s) (or part of a non-protein molecule) or a mixed molecule (i.e., a molecule comprising a protein (or part of a protein) and a non-protein molecule (or part of a non-protein molecule); or part of a mixed molecule). Said one or more protein(s) (or one or more different part(s) of a protein) and/or said one or more non-protein molecule(s) (or part of non-protein molecule) and/or said mixed molecule are, in particular, exogeneous (i.e., coming from a different/distinct organism than that from which the protein F of the fusion protein is issued). When the fusion protein comprises a protein, and/or one or more parts of a protein, and/or a mixed molecule, said protein and/or said one or more part(s) of protein(s) and/or said mixed molecule preferably comprise at least 10 consecutive amino acids, more preferably at least 12 consecutive amino acids, more preferably at least 15 consecutive amino acids, more preferably at least 20 consecutive amino acids, more preferably at least 30 consecutive amino acids. When the fusion protein comprises a protein and/or one or more parts of a protein and/or a mixed molecule, said protein and/or said one or more part(s) of protein(s) and/or said mixed molecule preferably have a three-dimensional structure, under non-denaturing conditions (for example, conditions that are usually not denaturing for proteins, especially the absence of denaturing and/or chaotropic agents)

"Non-protein molecule" advantageously means a carbohydrate, a sugar, a glycoside, a lipid, a nucleic acid, a neurotransmitter or a combination of any of these.

"Mixed molecule" means any protein (or part of a protein) having undergone a post-translational modification (for example, acetylation, acylation, biotinylation, glycosylation, hydroxylation, lipoylation, phosphorylation, amidation, ubiquitination, SUMOylation, deamination, etc.), or any protein (or part of a protein) which has been combined with a non-protein molecule (or part of a non-protein molecule), such as a protein (or part of a protein) combined with a carbohydrate, a sugar, a glycoside, a lipid, a nucleic acid, a neurotransmitter, or any part thereof or any combination of these. A mixed molecule comprises a glycoprotein, for example. Advantageously, examples of proteins (or parts of protein), or of non-protein molecules (or parts of non-protein molecule), or of mixed molecules (or parts of mixed molecules) combined with the protein (or with one or more parts of a protein) of the fusion protein (i.e., with the protein F of the fusion protein) comprise antigens, toxins, receptors, addressing or targeting or transport signals, enzymes, hormones, antibodies, any fragment thereof (preferably a functional fragment), and any combination of these.

"Peptide or protein fragment" or "peptide or protein part" means a portion of a peptide or protein, i.e., a portion of the sequence of consecutive amino acids making up said peptide or said protein (called the peptide or protein from which the fragment is derived). "Molecule fragment" or "molecule part" means a portion of a non-protein molecule or a mixed molecule. "Functional fragment" means any peptide or protein fragment, or any molecule fragment, having at least one of the original functions of the peptide, protein or molecule from which the fragment is derived. Preferably, the functional fragment performs said function with an efficacy equal to at least 30% of said peptide or said protein or said molecule, preferably at least 40%, preferably at least 45%, preferably at least 50%, preferably at least 55%, preferably at least 60%, preferably at least 65%, preferably at least 70%, preferably at least 75%, preferably at least 80%, preferably at least 85%, preferably at least 90%, preferably at least 91%, preferably at least 92%, preferably at least 93%, preferably at least 94%, preferably at least 95%, preferably at least 96%, preferably at least 97%, preferably at least 98%, preferably at least 99%, preferably at least 100% of the efficacy of said peptide or said protein or said molecule. When the fragment is a peptide, protein or mixed molecule fragment, the fragment preferably comprises at least 10 consecutive amino acids of the peptide, protein or mixed molecule from which it is derived; more preferably at least 12 consecutive amino acids, more preferably at least 15 consecutive amino acids, more preferably at least 20 consecutive amino acids, more preferably at least 30 consecutive amino acids of the peptide or protein or mixed molecule from which it is derived. When the fragment is a peptide, protein or mixed molecule fragment, the fragment preferably has a three-dimensional structure, under non-denaturing conditions (for example, under conditions that are usually not denaturing for proteins, especially absence of denaturing and/or chaotropic agents.

"Three-dimensional structure" or "tertiary structure" means the intrinsic folding of a molecule in space. A molecule having a three-dimensional structure is a molecule having a stable spatial configuration (commonly called folding) which is specific to it and which is intimately linked to its function: when this structure is dissociated by the use of denaturing or chaotropic agents, the molecule is called denatured and loses its function. In particular, a three-dimensional structure is a structure that is not very flexible. In contrast, a non-three-dimensional structure can adopt a dynamic set of configurations that change constantly over time. In the case of a protein, peptide, mixed molecule or fragment thereof, the three-dimensional structure is the folding of the polypeptide chain in space. In this case, the three-dimensional structure is not a linear chain of amino acids that can adopt a dynamic set of configurations that change constantly over time (it is not a linear succession of amino acids without any spatial configuration). The three-dimensional structure of proteins, peptides, mixed molecules comprising a protein or peptide, or fragments thereof, is maintained by various interactions which can be:

covalent interactions (disulfide bridges between cysteines)

electrostatic interactions (ionic bonds, hydrogen bonds)

van der Waals interactions interactions with the solvent and the environment (ions, lipids, etc.)

"Nanoparticle" means an object whose three dimensions are at nanometric scale, i.e., a particle whose nominal diameter is less than approximately 100 nm (for example such as defined by standard ISO TS/27687). "Phage nanoparticle" means a nanoparticle comprising at least one phage or at least one phage fragment; or consisting essentially of at least one phage or at least one phage fragment; or consisting of at least one phage or at least one phage fragment (the term fragment being used here in connection with a phage in the same sense as the term fragment used in connection with peptides, proteins and molecules, such as defined above). Advantageously, the nanoparticle comprises at least one capsid or one capsid fragment; or essentially consists of at least one capsid or at least one capsid fragment or consists of at least one capsid or at least one capsid. Advantageously, said capsid is as defined above. Said capsid is preferably decorated, in the mature expanded form, empty, or any combination of these.

"Operon" means a functional DNA fragment containing genes that operate under the signal of the same promoter. These genes are preferably transcribed into messenger RNA together and preferably concurrently with the performance of the same physiological function. Advantageously, either all the genes of an operon are transcribed together or none of them are transcribed since they are all under the control of the same promoter.

"Promoter" means a section of DNA that triggers the transcription of a section of DNA recognized by an RNA polymerase.

"Antigen" means a natural or synthetic molecule which, recognized by antibodies or cells of the immune system of an organism, is able to trigger an immune response therein. Thus, any foreign substance or any microbe introduced into the body can behave as an antigen, i.e., induce therein the production of special proteins, called antibodies, which have the property of neutralizing the harmful effects of the foreign substance. Antigens are generally peptides, proteins, sugars (such as polysaccharides) and lipid derivatives thereof. Antigens can also be nucleic acids or haptens (i.e., fragments of antigens). Antigens, as markers of agents foreign to the body, are the basis of the adaptive immune response. This is the recognition of the antigen by immunocompetent cells, directly or via antigen-presenting cells (APC), which activate specific immunity. In the case of protein antigens, the part of the antigen recognized by an antibody or lymphocyte receptor is called an "epitope" or antigenic determinant". The same antigen can have several epitopes (identical or different) and thus induce a varied immune response. There are sequential epitopes, corresponding to an amino acid sequence, and conformational epitopes, linked to the structure of the protein and therefore sensitive to denaturation. The recognition of the antigen by lymphocytes depends on the nature of the epitope. B cells bind directly to conformational epitopes via the immunoglobulins of their membrane. T cells recognize sequential epitopes presented by antigen-presenting cells. The antigen can be exogenous, i.e., foreign to the individual (in this case, it can be allogenic, derived from an individual of the same species or xenogenic, derived from other species), or it can be endogenic, i.e., an antigen belonging to the host (autoantigens). The antigen is preferably a microorganism, plant, algae, microalgae, bacterium, virus, parasite, yeast, fungus, insect, animal or tumour antigen; preferably an antigen of a eukaryotic or prokaryotic pathogen or of a cancer; preferably a protein, lipid or sugar antigen of bacteria, virus, parasite, yeast, fungus or tumour. The different categories of antigens are well known to the skilled person, who can especially refer to the references in the field (such as G. J. V. Nossal, G L Ada, Antigens, Lymphoid Cells and the Immune Response, Academic Press, 1971; Marc H. V. Van Regenmortel, Structure of Antigens, Volume 3 CRC Press, 20 Dec. 1995; Edouard Drouhet, Garry T. Cole, Louis De Repentigny, Jean Latge, Fungal Antigens: Isolation, Purification, and Detection, Springer Science & Business Media, 11 Nov. 2013; Graziano D. F., Finn O. J. (2005) Tumor Antigens and Tumor Antigen Discovery. In: Khleif S. N. (eds) Tumor Immunology and Cancer Vaccines. Cancer Treatment and Research, vol 123. Springer, Boston, MA; Wang M, Claesson M H, Methods Mol Biol. 2014; 1184:309-17. Classification of human leukocyte antigen (HLA) supertypes; as well as specialized databases such as described in Galperin, Fernandez-Suárez, Rigden, The 24th annual Nucleic Acids Research database issue: a look back and upcoming changes, NAR, Volume 45, Issue D1, January 2017, Pages D1-D11; in particular the PMAPP database, a human autoantigen database (available at aagatlas.ncpsb.org)).

"Toxin" means a substance that is toxic for one or more living organisms. A toxin is typically synthesized by a living organism (bacterium, poisonous mushroom, venomous insect or snake), to which it confers its pathogenicity. Toxins produced by bacteria are called bacteriotoxins, those by fungi are called mycotoxins, those produced by plants are called phytotoxins, those produced by algae are called phycotoxins, those by animals are called animal toxins. The toxin can be a chemical molecule, peptide, protein, glycoprotein, sugar, glycoside, lipid, nucleic acid, or any combination of these. Several families of bacteria secrete biotoxins (endotoxins) in the tissue that they colonize. Other bacteria (Gram negative) retain most of the toxic compounds within themselves, which are only released during cellular lysis, by the action of chemical, physical or mechanical means (endotoxins). Plant toxins produce toxins via their secondary metabolites: these are molecules that, unlike primary toxins (proteins, lipids, carbohydrates, amino acids, etc.) are produced outside of the metabolic pathways necessary to ensure survival (therefore primary metabolites). Plant toxins can be classified into three groups: phenols, nitrogens and terpenes. The toxin can be a neurotoxin (a toxin acting on the nervous system), a myotoxin (acting on the contraction of muscles, especially cardiotoxins on the heart and others such as strychnine on the respiratory muscles), a hemotoxin (acting on blood), a cytotoxin (acting on the cells), a dermatoxin (acting on the skin and mucous membranes), a hepatotoxin (acting on the liver), a nephrotoxin (acting on the kidney), an enterotoxin (acting on the digestive tract) etc. The toxin may be a toxoid; that is, a toxin that has been processed in such a way as to retain its antigenic potency and lose its toxic potency. The toxin is preferably a microorganism, plant, algae, microalgae, bacterium, virus, parasite, yeast, fungus, insect, animal, or tumour toxin; preferably a toxin of a eukaryotic or prokaryotic pathogen or of a cancer. The different categories of toxins are well known to the skilled person, who can especially refer to the references in the field (such as Michael W. Parker, Protein Toxin Structure, Springer Science & Business Media, 29 Jun. 2013; Michael R. Dobbs, Clinical Neurotoxicology E-Book: Syndromes, Substances, Environments, Elsevier Health Sciences, 22 Jul. 2009; Walker A A, Robinson S D, Yeates D K, Jin J, Baumann K, Dobson J, Fry B G, King G F. Entomovenomics: The evolution, biology and biochemistry of insect venoms. Toxicon. 2018 November; 154:15-27; Vilariho N, Louzao M C, Abal P, Cagide E, Carrera C, Vieytes M R, Botana L M. Human Poisoning from Marine Toxins: Unknowns for Optimal Consumer Protection. Toxins (Basel). 2018 Aug. 9; 10(8); as well as specialized databases such as described in Galperin, Fernández-Suárez, Rigden, The 24th annual Nucleic Acids Research database issue: a look back and upcoming changes, NAR, Volume 45, Issue D1, January 2017, Pages D1-D11; in particular the Comparative Toxicogenomics Database, such as described in Davis, Grondin Murphy, Johnson, Lay, Lennon-Hopkins, Saraceni-Richards, Sciaky, King, Rosenstein, Wiegers, Mattingly, The Comparative Toxicogenomics Database: update 2013, NAR, Volume 41, Issue D1, 1 Jan. 2013, Pages D1104-D1114 (available at ctdbase.org)).

"Receptor" means a molecule of the cell membrane or cytoplasm or cell nucleus that specifically binds to a specific factor (a ligand, such as a neurotransmitter, hormone or other substance), inducing a cellular response to this ligand. Changes in the behavior of the receptor induced by the ligand lead to physiological changes that constitute the biological effects of the ligand. The receptors can comprise at least: a peptide, protein, glycoprotein, sugar, glycoside, lipid, nucleic acid, or any combination of these. The receptors are generally proteins or mixed proteins (modified proteins and/or proteins associated with another molecule). The receptor can be a receptor on the external part of the plasma membrane, a transmembrane receptor embedded in the lipid bilayer of cell membranes (in general, a transmembrane protein, acting for example as a receptor for hormones and neurotransmitters). These receptors are either coupled to a G protein or carry enzymatic or ion channel activity that allow activation of signal transduction metabolic pathways in response to ligand binding), or an intracellular receptor (these receptors can sometimes enter the nucleus of cell to modulate the expression of specific genes in response to activation by the ligand). The receptor is preferably a microorganism, plant, algae, microalgae, bacterium, virus, parasite, yeast, fungus, insect, animal or tumour receptor; preferably a receptor of a eukaryotic or prokaryotic pathogen, or of a cancer; preferably a protein or glycoprotein receptor of bacteria, virus, parasite, yeast, fungus or tumour. The various categories of receptors are well known to the skilled person, who can especially refer to the references in the field (such as Thomas D. Pollard, William C. Earnshaw, Jennifer Lippincott-Schwartz, Graham Johnson Cell Biology E-Book, Elsevier Health Sciences, 1 Nov. 2016; Mohammed Zourob, Recognition Receptors in Biosensors, DOI 10.1007/978-1-4419-0919-0, Springer-Verlag New York 2010; Abbas, Lichtman, Pillai, Cellular and Molecular Immunology E-Book, Elsevier Health Sciences, 22 Aug. 2014; as well as to specialized databases such as described in Galperin, Fernández-Suárez, Rigden, The 24th annual Nucleic Acids Research database issue: a look back and upcoming changes, NAR, Volume 45, Issue D1, January 2017, Pages D1-D11; in particular the GPCRdb database, such as described in Isberg V., Mordalski S., Munk C., Rataj K., Harpsoe K., Hauser A. S., Vroling B., Bojarski A. J., Vriend G., Gloriam D. E. GPCRdb: an information system for G protein-coupled receptors. Nucleic Acids Res. 2016; 44:D356-D364 (available at gpcrdb.org)).

"Addressing or targeting or transport signal" or "signaling molecule" or "signal" or "cell signal" means the addressing sequences of peptide and protein, molecules enabling transport and/or cellular internalization, as well as receptor ligands (the receptors being such as defined above). The addressing sequence is a short sequence of amino acid, generally located at the N-terminal end of the protein, serving to designate the proteins that must be addressed, and indicating their destination. Thus, the addressing or targeting or transport signal may be a signal for addressing or targeting or transport to/toward the nucleus; a signal for addressing or targeting or transport to/toward the cytoplasm; a signal for addressing or targeting or transport to/toward the cytosol; a signal for addressing or targeting or transport to/toward the cell membrane; a signal for addressing or targeting or transport to/toward the mitochondria; a signal for addressing or targeting or transport to/toward the peroxisomes; a signal for addressing or targeting or transport to/toward the lysosomes; a signal for addressing or targeting or transport to/toward the endoplasmic reticulum; a signal for addressing or targeting or transport from secretory pathways; and a ligand of a receptor, preferably a membrane or transmembrane receptor, preferably a membrane or transmembrane receptor of a membrane chosen from a cell membrane, an extracellular membrane, a cytoplasmic membrane or a nuclear membrane. The addressing or targeting or transport signal may comprise at least: a peptide, protein, glycoprotein, sugar, glycoside, lipid, nucleic acid, or any combination of these. Preferably, the addressing or targeting or transport signal comprises at least one peptide, protein, glycoprotein, or nucleic acid. The signal is preferably a prokaryote, eukaryote or viral signal, preferably an animal, plant, algae, microalgae, microorganism, bacterium, parasite, yeast, fungus, insect, virus or cancer signal; more preferably a mammalian signal, such as a human signal. The various categories of signals are well known to the skilled person, who can especially refer to the references in the field (such as Thomas D. Pollard, William C. Earnshaw, Jennifer Lippincott-Schwartz, Graham Johnson Cell Biology E-Book, Elsevier Health Sciences, 1 Nov. 2016; Mohammed Zourob, Recognition Receptors in Biosensors, DOI 10.1007/978-1-4419-0919-0, Springer-Verlag New York 2010; Abbas, Lichtman, Pillai, Cellular and Molecular Immunology E-Book, Elsevier Health Sciences, 22 Aug. 2014).

"Enzyme" means a protein endowed with catalytic properties. Practically all biomolecules capable of catalyzing chemical reactions in cells are enzymes; some catalytic biomolecules are made up of RNA, however, and are therefore ribozymes rather than enzymes. An enzyme works by reducing the activation energy of a chemical reaction which increases the reaction speed. The enzyme is not changed during the reaction. The initial molecules are substrates of the enzyme, and the molecules formed from these substrates are the reaction products. Enzymes are especially characterized by their very high specificity. Moreover, an enzyme has the characteristic of being reusable.

Enzymes are generally globular proteins that act alone or in complexes of several enzymes or subunits. Like all proteins, enzymes are made up of one or more polypeptide chains folded to form a three-dimensional structure corresponding to their native state.

Enzymes are much larger molecules than their substrates. Their size can range from fifty or a hundred residues to more than 2,000 residues. Only a small part of the enzyme, most often between two and four residues but sometimes more, is directly involved in catalysis. This is called the catalytic site (or catalytic domain). This site can be located near one or more binding sites, where the substrate(s) are bound and oriented in order to catalyze the chemical reaction. The catalytic site and the binding sites form the active site of the enzyme.

Enzymes fulfill a large number of functions within living beings. For example, they can be involved in mechanisms for signal transduction and the regulation of cellular processes, in the generation of movements, in transmembrane active transport, in digestion, in metabolism, in the immune system, in mechanisms for digestion or cleavage of nucleic acids, in nucleic acid production (referred to herein as "nucleic acid acting enzymes") and in prodrug conversion mechanisms (prodrug to drug conversion).

The enzyme is preferably a prokaryote, eukaryote or viral enzyme, preferably an animal, plant, algae, microalgae, insect, microorganism, bacterium, parasite, yeast, fungus, or virus, enzyme; more preferably a mammalian enzyme, such as a human enzyme. The different categories of enzymes are well known to the skilled person, who can especially refer to the references in the field (such as Schomburg D., Schomburg I., Springer Handbook of Enzymes. 2nd Ed. Heidelberg: Springer; 2001-2009; Liébecq C., IUPAC-IUBMB Joint Commission on Biochemical Nomenclature (JCBN) and Nomenclature Committee of IUBMB (NC-IUBMB) Biochem. Mol. Biol. Int. 1997; 43:1151-1156; IUBMB (1992), Enzyme Nomenclature 1992, Academic Press, San Diego; as well as specialized databases such as described in Schomburg D, Schomburg I. Methods Mol Biol. 2010; 609:113-28. Enzyme databases; in particular, the BRENDA database (available at brenda-enzymes.org), such as described, for example, in Chang A, Schomburg I, Placzek S, Jeske L, Ulbrich M, Xiao M, Sensen C W, Schomburg D, Nucleic Acids Res. 2015 January; 43. 2014 Nov. 5 BRENDA in 2015: exciting developments in its 25th year of existence).

"Enzymatic activity" or "catalytic activity" or even "activity" of an enzyme means the efficiency of an enzyme to convert a substrate into a product in a given environment. The efficiency of the enzyme takes into account here the speed of converting the substrate into product by the enzyme and the degree of converting the substrate into product by the enzyme. "Degree of converting the substrate into product by the enzyme" here means the ratio between the quantity of final product obtained relative to the initial quantity of substrate for a defined quantity of enzyme. For example, an enzymatic activity within the meaning of the invention can be expressed in quantity of phloroglucinol of the product in a given volume (in g/L).

"Hormone" means a biologically-active chemical substance, generally synthesized by a gland cell (usually following stimulation) and secreted in the internal environment where it circulates (by the bloodstream, lymph or sap). It transmits a message chemically (generally acting on specific receptors of a target cell) and therefore plays the role of a messenger in the organism. It is able to act at very small doses.

The hormone is advantageously a plant or animal hormone. Plant hormones are also called phytohormones or growth factors. They often function to ensure plant growth or morphogenesis. Animal hormones are produced in most cases by the endocrine system (an endocrine gland or endocrine tissue).

Advantageously, the hormone is a vertebrate hormone, preferably chosen from among the following chemical classes:

Hormones derived from amines, which are made up of a single amino acid (tyrosine or tryptophan) but in a derivative form.

Peptide hormones, which are amino acid chains, therefore proteins, called peptides for the shortest ones.

Steroid hormones, which are steroids derived from cholesterol.

Hormones based on lipids and phospholipids.

The hormone is preferably chosen from among peptide or protein hormones, amine-derived hormones, steroid hormones and lipid hormones. The hormone is preferably an animal or plant hormone, preferably a mammal hormone, preferably a human hormone. The different categories of hormones are well known to the skilled person, who can especially refer to the references in the field (such as Davies P. J. (2010) The Plant Hormones: Their Nature, Occurrence, and Functions. In: Davies P. J. (Eds) Plant Hormones. Springer, Dordrecht; A W Norman, G Litwack, Hormones, Academic Press, 1997; A Kastin, Handbook of biologically active peptides, Academic Press, 2013).

"Antibody" means a complex protein or glycoprotein used by the immune system to detect and neutralize pathogens in a specific manner. In mammals, antibodies are predominantly secreted by cells derived from B cells: plasmocytes. Antibodies (also called immunoglobulins) make up the main globulins of the blood. Antibodies also comprise autoantibodies (produced, for example, in the case of autoimmune disease).

Antibodies are proteins or glycoproteins of the superfamily of immunoglobulins formed of 4 polypeptide chains (150,000 amu or dalton): two heavy chains (H of 50,000 amu each) and two light chains (L of 25,000 amu each) which are connected together by a variable number of disulfide bridges ensuring molecular cohesion. These chains form a Y-shaped structure (each light chain constitutes half of each arm of the Y) and consist of immunoglobulin domains which can comprise approximately 110 amino acids. Each light chain consists of one constant domain and one variable domain. The heavy chains are made up of one variable fragment and three or four constant fragments, depending on the isotype. For a given antibody, the two heavy chains are identical, likewise for the two light chains. The constant domains are characterized by an amino acid sequence that is very similar from one antibody to another, characteristic of the species and isotype. Each light chain has a copy denoted CL. The heavy chains comprise, depending on the isotype, three or four constant domains CH1, CH2, CH3 and, as applicable, CH4. The constant domains are generally not involved in antigen recognition, but rather intervene in activation of the complement system, as well as in the elimination of immune complexes (antibody bound to its antigen) by immune cells having constant fragment receptors (FcR). Antibodies have four variable domains located at the ends of the two arms. The association between a variable domain borne by a heavy chain (VH) and an adjacent variable domain borne by a light chain (VL) is the recognition site (or paratope) for the antigen. Thus, an immunoglobulin molecule has two sites for binding to the antigen, one at the end of each arm. These two sites are identical (but intended for different epitopes), hence the possibility of binding two molecules of antigen per antibody.

Specific enzymatic cleavage makes it possible to isolate different fragments:

Fc fragment (crystallizable). This supports the biological properties of immunoglobulin, in particular its ability to be recognized by immunity effectors or to activate complement. It consists of heavy chain constant fragments (CH2) beyond the hinge region. It does not recognize antigen;

Fv fragment. This is the smallest fragment retaining the antibody properties of the immunoglobulin. It consists uniquely of variable regions VL and VH and therefore binds the antigen with the same affinity as the complete antibody and is monovalent;

Fab fragment. This has the same affinity for the antigen as the complete antibody. The Fab fragment is formed of the entire light chain (VL+CL) and a part of the heavy chain (VH+CH1). It is monovalent;

F(ab')2 fragment. This corresponds to the association of two Fab fragments connected by a small part of the constant parts of the heavy chains, the hinge region. It has the same affinity as the antibody for the antigen and is divalent.

Monoclonal antibodies are antibodies only recognizing a single type of epitope on a given antibody. They are all identical by definition and produced by a single plasmocyte clone. Polyclonal antibodies are a mixture of antibodies recognizing different epitopes on a given antigen, each idiotype being secreted by a different clone of plasmocytes. During the immune response, an organism synthesizes antibodies directed against several epitopes of an antigen: the response is called polyclonal. The antibody can be a functional fragment of an antibody. In this case, said fragment can be chosen from an Fc fragment of an antibody, an Fv fragment of an antibody, an Fab fragment of an antibody, and an F(ab') fragment of an antibody. The antibody is preferably an animal antibody, preferably a mammalian antibody, preferably a human or humanized antibody. Advantageously, the antibody is a monoclonal antibody. The various categories of antibodies are well known to the skilled person, who can especially refer to the references in the field (such as Thomas D. Pollard, William C. Earnshaw, Jennifer Lippincott-Schwartz, Graham Johnson Cell Biology E-Book, Elsevier Health Sciences, 1 Nov. 2016; Mohammed Zourob, Recognition Receptors in Biosensors, DOI 10.1007/978-1-4419-0919-0, Springer-Verlag New York 2010; Abbas, Lichtman, Pillai, Cellular and Molecular Immunology E-Book, Elsevier Health Sciences, 22 Aug. 2014); Bayer V., An Overview of Monoclonal Antibodies. Semin Oncol Nurs. 2019 Sep. 2:150927; Wang W, Wang E Q, Balthasar J P. Monoclonal antibody pharmacokinetics and pharmacodynamics. Clin Pharmacol Ther. 2008 November; 84(5):548-58).

"Microorganism" means a microscopic living organism. Microorganisms especially comprise bacteria, microscopic fungi, archaea, protists, microscopic green algae, plankton animals, planarians, and amoebae. It is possible to distinguish prokaryotic microorganisms, on the one hand, which do not possess nuclei, such as bacteria and archaea, and eukaryotic organisms, on the other hand, having a nucleus. Microscopic eukaryotes comprise fungi such as yeasts and two types of protists: algae and protozoa. Microorganisms are generally unicellular but some species can be multicellular. Unicellular protists can be visible to the naked eye and several multicellular species are microscopic. The mean size of bacterial cells is 0.5 to 1 µm but there are some bacteria larger than 50 µm. Eukaryotic cells have a diameter ranging from 5 to 100 µm.

"Prokaryote" (or Prokaryota) means a living being whose cellular structure does not comprise a nucleus and almost never membrane organelles (the only exception being the thylakoids in cyanobacteria). They are especially simple unicellular organisms such as bacteria (comprising archaea and eubacteria). In the classification of living beings into seven kingdoms, prokaryotes form a paraphyletic taxon, thus grouping together living beings that share a similar and simple cellular structure.

According to the accepted classification, this taxon is opposed to "eukaryotes", characterized by the presence of a nucleus and multiple other organelles. "Eukaryote" (or Eukaryota) therefore means an organism belonging to the domain of eukaryotes, a domain grouping all unicellular or multicellular organisms that are characterized by the presence of a nucleus and generally organelles specialized in respiration, in particular mitochondria in aerobes and hydrogenosomes in certain anaerobes.

"Bacterium" means a microscopic prokaryote organism present in every environment, belonging to the kingdom of bacteria. The term bacteria here designates both eubacteria and archaebacteria (or archaea).

"Algae" means an organism capable of oxygenic photosynthesis and whose lifecycle generally occurs in an aquatic environment. Algae especially comprise cyanobacteria and eukaryotic algae.

"Cyanobacterium" means a prokaryotic organism belonging to the group of Cyanobacteria, also called blue-green algae. "Eukaryotic algae" means a eukaryotic organism belonging to the group of eukaryotic algae, comprising the phyla of Glaucophyta or Glaucocystophyta, Rhodophyta, Chlorobionta or Viridiplantae, Cryptophyta, Euglenozoa, Cercozoa, Haptophyta or Prymnesiophyta, Dinophyta, and Ochrophyta or Heterokontophyta. The eukaryotic algae according to the invention comprise in particular various groups with unicellular species (Euglenophytes, Cryptophytes, Haptophytes, Glaucophytes, etc.), other groups with unicellular or multicellular species (such as "red algae" or Rhodophyta, Stramenopiles (grouping in particular diatoms and "brown algae" or Phaeophyceae), and plants fairly close to terrestrial plants (such as "green algae", which include Ulvophyceae, among others).

"Microalgae" means microscopic algae, sometimes called microphyte. They are unicellular or undifferentiated multicellular generally photosynthetic eukaryotic microorganisms. Microalgae can also comprise prokaryotes, including all cyanobacteria (blue-green algae). Living in highly aqueous environments, they can have flagellar movement. They colonize all biotopes exposed to light. However, the large majority of microalgae are able to feed by osmotrophy at night, and are therefore mixotrophs. Microalgae play an important role in the carbon cycle and more generally in the biochemical cycles of lakes and oceans. Microalgae can be grown monoclonally in photobioreactors or industrial fermenters.

"Animal" means an organism belonging to the animal kingdom. According to the conventional classification, an animal is a heterotrophic being, i.e., it feeds on organic substances. It also means the animal taxon named Animalia in modern scientific classifications (original creation of Linnaeus in 1758, with regard to the International Code of Zoological Nomenclature (ICZN)) or Metazoa (junior synonym created by Haeckel in 1874). An animal is a complex, multicellular being (metazoan). Regardless of the term used or the classification retained (evolutionary or cladistic), here animal means multicellular, eukaryotic organisms that are generally mobile and heterotrophic.

Animals especially comprise the vertebrate group. "Vertebrates" means an organism belonging to the group of vertebrate animals (also called Vertebrata), which is a subphylum of the animal kingdom. Vertebrates have a bony or cartilaginous skeleton, which in particular includes a vertebral column. These bilateral animals belong to the Chordate phylum and include all of the fishes as well as the tetrapods. Also included are hagfish (jawless fish) although they do not have a true vertebral column. "Mammal" means an animal belonging to the taxon or clade (a cladistic group of biological lines) or class of mammals (class also called Mammalia) comprising vertebrate animals. Their range is planetary. They have conquered a large part of the ecological niches of macrofauna and have remained one of the dominant taxa since the Eocene. The main characteristic of this clade is the suckling of the young from a specialized cutaneous-glandular secretion called milk. Neonates routinely need parental care due to their immature digestive system at birth (milk is their vital and obligate food source). Other characteristics make it possible to distinguish mammals from other taxa, including fossils. A "human" belongs to the mammal clade.

"Plant" means an organism belonging to the plant kingdom. The plant kingdom includes lineages which vegetate: i.e., which breathe, feed and grow like plants, according to classical scientific classifications. The plant kingdom is a polyphyletic assembly of photosynthetic organisms and therefore the cells have a wall made of cellulose. The term plant designates both terrestrial plants (or green plants) and green algae, making up the taxon of Chlorobionta, as well as red algae, brown algae and fungi. The plant group is therefore formed of two lineages, one of algae; and the second of green plants (especially terrestrial plants), which include bryophytes (mosses and liverworts), ferns (pteridophytes), gymnosperms and angiosperms. Advantageously, the plant is a green plant.

"Insect" (or Insecta) means a class of invertebrate animals of the arthropod phylum and hexapod subphylum. They are characterized by a body segmented into three tagmata (head with external mouthparts, a pair of antennae and at least one pair of compound eyes; thorax with three pairs of articulated legs and two pairs of wings modified to a greater or lesser extent; abdomen devoid of appendages) protected by a cuticle forming an exoskeleton composed of chitin and provided with respiratory tracheae.

"Parasite" means a being living at least partially by parasitism. Parasitism is a long-term biological relationship between two heterospecific living beings where one of the protagonists, the parasite, takes advantage of a host organism for its food, shelter or reproduction. This relationship will have a negative effect for the host. Organisms that are not parasites can be qualified as "free living". Parasites are found throughout the living world. Some groups are composed almost exclusively of parasites (for example, monogenean flatworms), although most include both parasitic and free-living species (e.g. nematodes). Vertebrates comprise some parasitic species (such as hematophagous bats, lampreys, vampire fish (or candirus), etc.). Many parasites can change the behavior of their host, to the advantage of the parasite.

Advantageously the parasite is a parasite of an animal, preferably a human. The parasite of an animal is generally a metazoan or protozoan. The parasite of an animal here includes neither viruses (viral infection) nor bacteria (bacterial infection) nor fungi (mycosis). The presence of the parasite in the organism is called parasitosis. During parasitosis, there is an action of eosinophil polymorphonuclear leukocytes. Parasitosis is characterized by hypereosinophilia that corresponds to an increase of the defense cells in the blood. Crystalloids (major proteins) are responsible for this anti-parasitic action. Examples of animal parasites include:
   Protozoa (comprising the classes: Intestinal Rhizopoda (Amoeba); Flagellates; Sporozoa: and Ciliates;
   Metazoa (including Helminths (worms); Platyhelminths (flatworms, non-chitinous); Trematodes (unsegmented); Schistosomes; Cestodes (segmented); Taenia; Nemathelminths (roundworms, chitinous, non-segmented, sex separated), the Filariae, etc.);
   Arthropods (including Arachnid and Insect parasites or parasite vectors).

"Fungus" or "fungi" means a eukaryotic organism belonging to the Fungi kingdom, also called Mycota. This kingdom constitutes a large and diversified group, from microscopic unicellular organisms (yeasts) or multicellular organisms (moulds) up to "higher fungi" endowed most often with a stem and a cap. Fungi are especially characterized by the simultaneous existence of a peripheral cell wall and turgid vacuoles in the cytoplasm, their undifferentiated vegetative body and their peptide-polyglycoside wall, as well as the absence of chloroplasts, chlorophyll and starch. They are carbon heterotrophic organisms.

"Yeast" means a unicellular fungus that can induce fermentation of animal or plant organic matter. Yeast generally have an oxidative respiration metabolism and can also use an alcoholic fermentation metabolism. These eukaryotic microorganisms, variable in shape according to the species (spherical, ovoid or elliptical, bottle-shaped, triangular or apiculate (having a point at each end like a lemon) but generally oval, from about 6 to 10 microns and up to 50 microns, multiply by budding or by splitting (scissiparity). They are often able to accomplish sporulation either for purposes of dormancy in an unfavorable environment, or for spreading purposes. Yeasts are generally characterized by a cell wall (made up of an outer layer of mannoproteins, associated with glucans and an inner layer of glucans associated with a small quantity of chitin) surrounding the plasma membrane and protecting the yeast from physicochemical damage from the external environment; a cytoplasmic membrane composed mainly of double-layered phospholipids; a nucleus containing the genetic information of the yeast chromosomal genome; mitochondria which play an important role in yeast aerobic respiration and ATP production. Some yeasts can be pathogenic in animals and are responsible for candidosis mycoses (genus *Candida*). Examples of yeast include those of the genus *Saccharomyces* (such as *Saccharomyces cerevisiae*) or *Schizosaccharomyces*.

"Virus" means an infectious agent requiring a host (in general a cell) whose metabolism and constituents it uses to replicate itself. Viruses change form during their cycle, going through two stages:
   an extracellular form (independent material unit called virion when there is a capsid or, for some forms, viroid). In the extracellular form, viruses are particulate infectious objects made up of at least a nucleic acid often enclosed in a protein capsid;
   an intracellular form (virus integrated in the dormant form or actively hijacking the cellular machinery for the benefit of its replication). In its intracellular form (inside the host cell), viruses are genetic elements that can replicate by parasitizing all or part of the host cell metabolism, whether is integrated into a chromosome of the host genome (then called a provirus) or parallel to it (case of virion factories, for example).

The virus is preferably a eukaryotic virus (i.e., a virus infecting eukaryotes and more particularly eukaryotic cells), more preferably an animal virus (i.e., a virus infecting animals and more particularly animal cells), more preferably a mammalian virus (i.e., a virus infecting mammals and more particularly mammalian cells), more preferably a human virus (i.e., a virus infecting humans and more particularly human cells). The virus can also be a plant virus (i.e., a virus infecting plants and, more particularly, plant cells), preferably a green plant virus (i.e., a virus infecting green plants and, more particularly, green plant cells).

The virus is preferably a pathogenic virus.

"Disease" or "condition" or "disorder" or "pathology" means an impairment of the functions or health of a living organism. We speak both of disease in general, referring to all health impairments, and of "a disease", which then designates a particular entity characterized by its own causes, symptoms, progression and therapeutic possibilities.

"Infection" or "infectious disease" means a disease induced by the transmission of an infectious microorganism or agent: virus, bacterium, parasite, fungus, protozoan.

"Autoimmune disease" means a disease resulting from an abnormality of the immune system leading it to attack the normal components of the body (the "self").

"Metabolic disease" means a medical condition which affects cellular metabolism, in particular energy production. In general, a metabolic disease impedes smooth transformation by the organism of sugars, fats and proteins.

"Dermatological disease" means a disease of the skin, mucosa and integuments (nails, head hair, body hair).

"Cardiovascular disease" or "cardio-neurovascular disease" means a disease that concerns the heart and bloodstream.

"Respiratory disease" means a disease affecting the respiratory system. The respiratory system is a collection of organs permitting respiration (i.e., gas exchange between the organism and the environment). In mammals such as humans, the respiratory system includes the nose, mouth, pharynx, larynx, trachea, diaphragm and lungs. The lungs comprise bronchi, bronchioles, alveoli and acini.

"Lung disease" or "pulmonary disease" means a respiratory disease that affects the lungs. Respiratory and/or pulmonary diseases can be of infectious, viral, genetic or environmental origin or result from a combination of these factors.

"Neurodegenerative disease" means a chronic, disabling disease which can progress slowly and discretely. It generally induces deterioration of the function of nerve cells, in particular neurons, which can lead to cell death (or neurodegeneration). Disorders induced by neurodegenerative diseases are varied and can be cognitive-behavioral, sensory or motor disorders.

"Genetic disease" means a disease due to one or more abnormalities on one or more chromosomes that lead to a functional defect of some cells of the organism. Genetic diseases are called dominant or recessive, depending on whether the allele responsible is dominant or not (in an individual, each gene is represented by two alleles). They can be classified according to the position of the gene responsible for the abnormality. If it is located on the pair of sex chromosomes, the disease is called "sex-linked", if it is located on a pair of homologous chromosomes, the disease is called "autosomal".

"Hormonal disease" or "Endocrine disease" means a disease caused by a dysfunction of hormones secreted by endocrine glands.

"Psychiatric illness" or "mental illness" or "psychiatric disorder" or "mental disorder" means a set of conditions and disorders of very different origins resulting in difficulties in the life of an individual and/or those around them, suffering and emotional and behavioral disorders. Mental conditions affect every population, with no distinction for sex or age. These disorders can be occasional, chronic or ongoing.

"Cancer" or "cancerous disease" means a disease induced by the transformation of cells that become abnormal and proliferate excessively (this is called uncontrolled proliferation). These dysregulated cells can eventually form a mass that is called a tumour (in general a malignant tumour). Cancer cells generally tend to invade neighboring tissue and to break away from the tumour. They can also migrate by the blood vessels and lymph vessels to form another tumour: this is called metastasis. Cancers bring together a set of pathologies of very diverse forms and consequences, while routinely sharing a very typical set of characteristics regardless of the cancer concerned. The following histological elements can especially be found in the majority of cancers:
  an independence of cancer cells relative to the signals that normally stimulate cell multiplication;
  an insensitivity of cancer cells to anti-proliferative signals and mechanisms;
  an unlimited proliferative capacity (infinite growth, often resulting in neoplasms);
  the disappearance of the phenomenon of apoptosis in these cancer cells, also called a form of aggressive "immortality" at the expense of the patient;
  cell regression or dedifferentiation towards a form increasingly reminiscent of embryonic stem cells (the cancer cell can thus go from a state of specialized/differentiated cell to a state of unspecialized, immature, multipotent or pluripotent cell);
  an abnormal ability to undergo angiogenesis;
  often the acquisition of the ability to invade in advanced stages;
  lesions in surrounding tissues (necroses), whether or not there is tissue invasion;
  with very rare exceptions, they are derived from the cells of the individual affected by this cancer (they are self cells).

"Tumour" means an increase in the volume of a tissue, without specifying the cause. This is a neoformation of bodily tissues (neoplasia) which occurs following dysregulation of cell growth, benign or malignant (when it is a malignant tumour, it is called cancer). A neoplasia can concern any type of tissue. Depending on the location of the tumour and the function of the affected tissue, it may lead to organ dysfunction and harm the whole organism, even cause its death. Tumours can occur in all multicellular organisms, including plants. A distinction is made between benign and malignant tumours:
  Benign tumours, such as warts or moles, are generally not serious tumours, i.e., they do not give rise to secondary tumours (metastases). However, a benign tumour can lead to serious complications (compression, inflammation etc.) by its mechanical action.
  Malignant tumours are often designated by the term cancer. In addition to attacking the surrounding tissue, they produce secondary tumours (metastases) which propagate through the blood or lymph.

"Tumour" here preferably means a malignant tumour.

"Disease linked to an infection and/or linked to exposure to a toxin" means a disease, preferably non-infectious, which is provoked, caused, amplified and/or maintained by at least one infection and/or by one-time, occasional, regular, prolonged or repeated exposure to at least one toxin.

"Prevention" or "prevention of a disease" or "prevention of the onset of a disease" means the reduction of the risk of onset, development or amplification of a disease, the causes of a disease, symptoms of a disease, effects (or consequences, preferably adverse, detrimental effects/consequences) of a disease, or any combination of these; and/or the act of delaying the onset, development or amplification of a disease, causes of a disease, symptoms of a disease, effects (or consequences, preferably adverse, detrimental effects/consequences) of a disease, or any combination of these.

"Treatment" or "treatment of a disease" means the reduction, inhibition, and or resolution of a disease, causes of a disease, symptoms of a disease, effects (or consequences, preferably adverse, detrimental effects/consequences) of a disease, or any combination of these.

"Vaccine" or "vaccine composition" means a pathogenic or tumoral substance which, inoculated into an individual preferably in a harmless form, confers immunity to a disease (or protection from a disease). In general, a vaccine stimulates the organism's immune response. A vaccine can be preventative, preventing the onset of a disease. A vaccine can also be therapeutic, helping the patient to fight a disease in progress.

"Medicament" means any substance or composition presented as having curative or preventative properties for human or animal diseases. A medicament therefore includes any substance or composition that can be used in humans or animals or that can be administered to them, for purposes of establishing a medical diagnosis or restoring, correcting or modifying their physiological functions by exerting a pharmacological, immunological or metabolic action.

In the detailed description which follows, the embodiments can be taken alone or combined appropriately by the skilled person.

Capsid

The Inventors have, in a completely surprising manner, developed empty phage T5 capsids, devoid of phage genomic DNA, capable of exposing fusion proteins of interest on their surface. These functionalized capsids are especially able to exert the functions and activities of the fusion protein of interest used in vivo.

The present invention therefore concerns a phage T5 devoid of the genomic DNA of said phage and exposing, on its surface, at least one fusion protein, said fusion protein comprising at least one peptide or protein fragment having at least 80% identity with a fragment of a decoration protein pb10, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a fragment of a decoration protein pb10; said fragment of a decoration protein pb10 comprising (or essentially consisting of, or consisting of) preferably at least 76 consecutive amino acids of a protein pb10, preferably at least 77 consecutive amino acids of a protein pb10, more preferably at least 80 consecutive amino acids of a protein pb10; more preferably at least 76 consecutive amino acids from the N-terminal domain of a protein pb10, more preferably at least 77 consecutive amino acids from the N-terminal domain of a protein pb10, more preferably at least 80 consecutive amino acids from the N-terminal domain of a protein pb10.

Advantageously, the fusion protein also comprises at least one molecule, preferably an exogenous molecule.

The present invention particularly concerns a phage T5 capsid devoid of genomic DNA from said phage and exposing, on its surface at least one fusion protein; said fusion protein comprising:

at least one peptide or protein fragment having at least 80% identity with a fragment of a decoration protein pb10, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a fragment of a decoration protein pb10; said fragment of a decoration protein pb10 comprising (or essentially consisting of, or consisting of) preferably at least 76 consecutive amino acids of a protein pb10, preferably at least 77 consecutive amino acids of a protein pb10, more preferably at least 80 consecutive amino acids of a protein pb10; said fragment of a decoration protein pb10 comprising in a particularly preferred manner at least 76 consecutive amino acids from the N-terminal domain of a protein pb10, more preferably at least 77 consecutive amino acids from the N-terminal domain of a protein pb10, more preferably at least 80 consecutive amino acids from the N-terminal domain of a protein pb10; said fragment of decoration protein pb10 comprising, in particular, at least the consecutive amino acids included between positions 1 and 80, or between the consecutive amino acids included between positions 1 and 77, or between the consecutive amino acids included between positions 2 and 77, of a protein pb10; and at least one functional fragment of an antigen, or at least one functional fragment of a toxin, or at least one receptor fragment, or at least one functional fragment of an addressing or targeting or transport signal, or at least one functional fragment of an enzyme, or at least one functional fragment of a hormone, or at least one functional fragment of an antibody, or at least one antigen, or at least one toxin, or at least one receptor, or at least one addressing or targeting or transport signal, or at least one enzyme, or at least one hormone, or at least one antibody, or any combination of these, preferably at least one functional fragment of an antigen, more preferably at least one antigen.

The capsid according to the invention is therefore a functionalized empty capsid.

According to one advantageous embodiment, the capsid is characterized in that the fragment of decoration protein pb10 is chosen from:

i) a peptide or protein fragment having at least 80% identity with a portion of the N-terminal domain of a protein pb10, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity; said portion comprising (or essentially consisting of or consisting of) preferably at least 76 consecutive amino acids from the N-terminal domain of a protein pb10, more preferably at least 77 consecutive amino acids from the N-terminal domain of a protein pb10, more preferably at least 80 consecutive amino acids from the N-terminal domain of a protein pb10;

ii) a peptide or protein fragment having at least 80% identity with the N-terminal domain of a protein pb10, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity; said N-terminal domain of a protein pb10 comprising (or essentially consisting of, or consisting of) preferably the consecutive amino acids included between positions 1 and 80, or between the consecutive amino acids included between positions 1 and 77, or between the consecutive amino acids included between positions 2 and 77, of a protein pb10;

iii) a fragment or peptide of a protein comprising an amino acid sequence having at least 80% identity with the sequence SEQ ID NO: 1, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with the sequence SEQ ID NO: 1; said fragment or peptide preferably comprising at least the first 80 consecutive amino acids of said protein;

iv) a fragment or peptide of a protein consisting of (or essentially consisting of) an amino acid sequence having at least 80% identity with the sequence SEQ ID NO: 1, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with the sequence SEQ ID NO: 1; said fragment or peptide preferably comprising at least the first 80 consecutive amino acids of said protein;

v) a peptide comprising an amino acid sequence having at least 80% identity with the sequence SEQ ID NO: 3, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with the sequence SEQ ID NO: 3;

iv) a peptide consisting (or essentially consisting) of an amino acid sequence having at least 80% identity with the sequence SEQ ID NO: 3, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with the sequence SEQ ID NO: 3; and vii) a fragment or peptide of a protein comprising (or essentially consisting) of an amino acid sequence having at least 80% identity with the sequence SEQ ID NO: 16, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with the sequence SEQ ID NO: 16; said fragment or peptide preferably comprising at least the first 77 consecutive amino acids of said protein; more preferably at least the consecutive amino acids included between positions 2 and 76.

Thus, the fragment of the decoration protein pb10 can be chosen from a fragment which comprises (or essentially consists of or consists of) the N-terminal domain of a protein pb10, and a whole protein pb10 (which can be native or modified, in particular modified by cloning requirements).

According to a particular embodiment, the decoration protein pb10 is chosen from a protein comprising (or essentially consisting of or consisting of an amino acid sequence having at least 80% identity with the sequence SEQ ID NO: 1, or with SEQ ID NO: 16, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with sequence SEQ ID NO: 1 or with the sequence SEQ ID NO 16; In this embodiment, the fragment of the decoration protein pb10 is preferably a whole protein pb10.

According to a preferred embodiment, the fragment of the decoration protein pb10 is chosen from the peptide or protein fragments and the peptides as defined in points iii), iv), v), vi) and vii) of the paragraph above, and more preferably, the fragment of the decoration protein pb10 is chosen from the peptide or protein fragments and the peptides as defined in points iii) and v) of the paragraph above.

According to a preferred embodiment, the capsid is characterized in that the decoration protein pb10 is chosen from the peptide or protein fragments and the peptides as defined in points i), ii), v), and vi) of the paragraph above, and more preferably, the fragment of the decoration protein pb10 is chosen from the peptide or protein fragments and the peptides as defined in points v) and vi) of the paragraph above. Indeed, the inventors have shown that functionalization (exposure of the fusion protein on the capsid surface) is particularly effective when the fragment of the protein pb10 comprises the N-terminal domain of the protein pb10 or consist of this N-terminal domain.

According to a preferred embodiment, the functional fragment of an antigen, the functional fragment of a toxin, the receptor fragment, the functional fragment of an addressing or targeting or transport signal, the functional fragment of an enzyme, the functional fragment of a hormone, the functional fragment of an antibody, the antigen, the toxin, the receptor, the addressing or targeting or transport signal, the enzyme, the hormone, the antibody, or any combination of these, is a peptide, polypeptide or protein comprising at least 10 consecutive amino acids, more preferably at least 12 consecutive amino acids, more preferably at least 15 consecutive amino acids, more preferably at least 20 consecutive amino acids, more preferably at least 30 consecutive amino acids.

Preferably, the functional fragment of an antigen, the functional fragment of a toxin, the receptor fragment, the functional fragment of an addressing or targeting or transport signal, the functional fragment of an enzyme, the functional fragment of a hormone, the functional fragment of an antibody, the antigen, the toxin, the receptor, the addressing or targeting or transport signal, the enzyme, the hormone, the antibody, or any combination of these, has a three-dimensional structure.

According to a particular embodiment, the functional fragment of an antigen, the functional fragment of a toxin, the receptor fragment, the functional fragment of an addressing or targeting or transport signal, the functional fragment of an enzyme, the functional fragment of a hormone, the functional fragment of an antibody, the antigen, the toxin, the receptor, the addressing or targeting or transport signal, the enzyme, the hormone, the antibody, or any combination of these, is not a tag usually used for the affinity purification of a molecule, more preferably it is not a histidine tag (consisting of a chain of 6 to 10 histidine amino acids).

Advantageously, the antigen is chosen from antigens comprising (or essentially consisting of, or consisting of) at least one peptide, protein, glycoprotein, sugar, glycoside, lipid, nucleic acid, or any combination of these. The antigen is preferably a microorganism, plant, algae, microalgae, bacterium, virus, parasite, yeast, fungus, insect, animal or tumour antigen; preferably an antigen of a eukaryotic or prokaryotic pathogen or of a cancer; preferably a protein, lipid or sugar antigen of bacteria, virus, parasite, yeast, fungus or tumour.

Advantageously, the toxin is chosen from toxins comprising (or essentially consisting of, or consisting of) at least: a chemical molecule, peptide, protein, glycoprotein, sugar, glycoside, lipid, nucleic acid, or any combination of these. The toxin is preferably a microorganism, plant, algae, microalgae, bacterium, virus, parasite, yeast, fungus, insect, animal or tumour toxin; preferably a toxin of a eukaryotic or prokaryotic pathogen or of a cancer.

Advantageously, the receptor is chosen from receptors comprising (or essentially consisting of, or consisting of) at least: a peptide, protein, glycoprotein, sugar, glycoside, lipid, nucleic acid, or any combination of these. The receptor is preferably a microorganism, plant, algae, microalgae, bacterium, virus, parasite, yeast, fungus, insect, animal or tumour receptor; preferably a receptor of a eukaryotic or prokaryotic pathogen or of a cancer; preferably a protein or glycoprotein receptor of bacteria, virus, parasite, yeast, fungus or tumour.

Advantageously, the addressing or targeting or transport signal is chosen from the addressing or targeting or transport signals comprising (or essentially consisting of or consisting of) at least: a peptide, protein, glycoprotein, sugar, glycoside, lipid, nucleic acid, or any combination of these. Preferably, the addressing or targeting or transport signal comprises (or essentially consists of or consists of) at least one peptide, protein, glycoprotein, or nucleic acid. The signal is preferably a prokaryote, eukaryote or viral signal, preferably an animal, plant, algae, microalgae, microorganism, bacterium, parasite, yeast, fungus, insect, virus or cancer signal; more preferably a mammalian signal, such as a human signal.

Advantageously, the addressing or targeting or transport signal may be a signal for addressing or targeting or transport to/toward the nucleus; a signal for addressing or targeting or transport to/toward the cytoplasm; a signal for addressing or targeting or transport to/toward the cytosol; a signal for addressing or targeting or transport to/toward the cell membrane; a signal for addressing or targeting or transport to/toward the mitochondria; a signal for addressing or targeting or transport to/toward the peroxisomes; a signal for addressing or targeting or transport to/toward the lysosomes; a signal for addressing or targeting or transport to/from the endoplasmic reticulum; a signal for addressing or targeting or transport from secretory pathways; and a ligand of a receptor, preferably a membrane or transmembrane receptor, preferably a membrane or transmembrane receptor of a membrane chosen from a cell membrane, an extracellular membrane, a cytoplasmic membrane or a nuclear membrane.

Advantageously, the functional fragment of an enzyme comprises at least, or essentially consists of at least, or consists of at least, an enzyme catalytic domain, preferably an enzyme active site. The enzyme is preferably a prokaryote, eukaryote or viral enzyme, preferably an animal, plant, algae, microalgae, insect, microorganism, bacterium, parasite, yeast, fungus, or virus, enzyme; more preferably a mammalian enzyme, such as a human enzyme.

Advantageously, the enzyme is chosen from prodrug conversion enzymes, enzymes acting on nucleic acids, metabolism enzymes, immune system enzymes and digestive enzymes.

Advantageously, the hormone is preferably chosen from among peptide or protein hormones, amine-derived hormones, steroid hormones and lipid hormones. The hormone is preferably an animal or plant hormone, preferably a mammal hormone, preferably a human hormone.

Advantageously, the functional fragment of an antibody can be chosen from an Fc fragment of an antibody, an Fv fragment of an antibody, an Fab fragment of an antibody, and an F(ab') fragment of an antibody. The antibody is preferably an animal antibody, preferably a mammalian antibody, preferably a human or humanized antibody.

The peptide or protein fragment having at least 80% identity with a fragment of the decoration protein pb10, and/or the fusion protein can be obtained by the conventional methods for producing/obtaining peptide or protein fragments and/or fusion proteins. These methods comprise, for example, the methods of expression by means of an expression system (for example, by a vector) inserted in an expression cell, for example by cloning followed by purification. The skilled person will know how to define the appropriate steps to implement these methods. The fusion protein is advantageously produced by any appropriate expression system, whose properties the skilled person will know how to define. The fusion protein can especially be produced from a plant or a plant cell, an animal (non-human) or an animal cell (excluding human embryonic stem cells), an insect or an insect cell, an algae or microalgae or an algae or microalgae cell, a fungus or a fungus cell, a yeast, a parasite or a parasite cell, a microorganism or a microorganism cell, or a bacterium. The fusion protein is preferably produced by a eukaryotic organism or a eukaryotic cell.

When the functional fragment of an antigen, toxin, receptor, addressing or targeting or transport signal, enzyme, hormone, antibody, antigen, toxin, receptor, targeting or transport signal, enzyme, hormone, antibody, or any combination of these, comprises, essentially consists of, or consists of a non-protein substance or molecule (not comprising a protein or peptide fragment or portion), said non-protein substance or molecule can be fused to the peptide or protein fragment having at least 80% identity with a fragment of a pb10 decoration protein using methods known to the skilled person, who will know how to choose the most appropriate method. These methods comprise, for example, the fusion methods by reaction with an amine (covalent bond fusion; such as especially described in the article by Robertson et al. 2011 (DOI: dx.doi.org/10.1021/bc100365j) and the fusion methods by reaction with a streptavidin (fusion by noncovalent bonds; such as especially described in the article by Edgar et al. 2009 (DOI: 10.1073/pnas.0601211103).

According to one embodiment, the capsid also comprises:
(i) at least one copy of a protein having at least 80% identity with a capsid protein pb8, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a capsid protein pb8 (for example, having the sequence SEQ ID NO: 8); or
(ii) at least one copy of a protein having at least 80% identity with a portal protein pb7, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a portal protein pb7 (for example, having the sequence SEQ ID NO: 7); or
(iii) at least one copy of a protein having at least 80% identity with a protease pb11, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a protease pb11 (for example, having the sequence SEQ ID NO: 9); or
(iv) any combination of (i) to (iii).

Advantageously, the capsid protein pb8 comprises, or essentially consists of, or consists of an amino acid sequence having the sequence SEQ ID NO: 8.

Advantageously, the portal protein pb7 comprises, or essentially consists of, or consists of an amino acid sequence having the sequence SEQ ID NO: 7.

Advantageously, the protease pb11 comprises, or essentially consists of, or consists of an amino acid sequence having the sequence SEQ ID NO: 9.

Advantageously, the decoration protein pb10, the capsid protein pb8, the portal protein pb7 and/or the protease pb11 are phage T5 proteins.

The activity and/or expression of pb7, pb8, pb10, pb11 and any combination of these can be inducible (for example, by placing the gene coding for the corresponding proteins under the control of an inducible promoter). According to a particularly advantageous embodiment, the activity and/or expression of the protease is inducible (for example, by placing the gene coding for the protease under the control of an inducible promoter).

Advantageously, the capsid is in the expanded mature form.

The capsid is preferably isolated and/or purified. The capsid is preferably recombinant.

Capsid Production Method

The Inventors have also developed particularly efficient production methods for the capsid according to the invention.

Thus, the invention also relates to a method for producing a capsid, comprising the following steps:
a) production of a phage T5 capsid devoid of genomic DNA and devoid of protein pb10;
b) putting the capsid of step a) in contact with a fusion protein such as defined above, in order to obtain a decorated capsid; and
c) optionally, purification of the capsid decorated in step b) using a neutral detergent, preferably chosen from n-Octyl-B-D-glucopyranoside (B-OG) and Dodecyldimethylaminoxid (LDAO).

The absence of the decoration protein pb10 (or a fragment thereof) in step a) ensures the complete absence of decoration during production of capsids and before the addition of fusion proteins. This offers the advantage of allowing fusion with any type of substance or molecule (even non-protein), in a customized manner.

Advantageously, the fusion protein is produced by the methods described above.

The inventors have also shown that, completely unexpectedly, the use of n-Octyl-B-D-glucopyranoside (B-OG) and/or Dodecyldimethylaminoxid (LDAO) detergents during the capsid purification steps makes it possible to obtain pure capsids. In particular, the use of these detergents makes it possible to eliminate the majority of contaminant endotoxins (especially derived from expression or production bacteria) and comply with (not exceed) the level of endotoxins tolerated for administrations in an animal subject, especially human.

According to one embodiment, the capsid of step a) is obtained by a method comprising the following steps:
1. Infection of a bacterium, preferably a bacterium of the Enterobacteriaceae family, more preferably a bacterium of the *Escherichia* genus, more preferably an *Escherichia coli* bacterium, with a mutant phage T5, deficient for the gene coding for the T5 DNA encapsidation motor, terminase, and deficient for the gene coding for the decoration protein pb10 (preferably devoid of the gene coding for the decoration protein pb10);
2. Lysis of the bacteria of step 1, Precipitation or ultracentrifugation of the bacterial lysate resulting therefrom, and resuspension of the pellet in a saline buffer.
3. Speed sedimentation on a glycerol gradient, incubation of the fractions containing the capsids in the presence of B-OG (preferably 1%), then purification by several stages of ion-exchange chromatography in the presence of LDAO (preferably 0.1%) preferably during the first step.

According to one embodiment, the decorated capsid of step b) is obtained by a method comprising the following steps:
1. putting the capsid of step a) in contact with a fusion protein such as defined above, for a determined time (preferably at least 10 min, preferably between 10 and 60 min), at a temperature ranging from 2 to 20° C. (preferably a temperature comprised between 3 and 5° C.)
2. the respective capsid concentrations (calculated according to the protocol described in Vernhes et al. 2017) and the decoration protein preferably respect the molar ratio 120×[capsid]/[pb10]=1+/−0.1.

According to a particularly advantageous embodiment, the capsid of step a) is obtained by a method comprising the following steps:
a-1) obtaining a vector comprising:
(i) at least one gene coding for a protein having at least 80% identity with a capsid protein pb8, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a capsid protein pb8;
(ii) at least one gene coding for a protein having at least 80% identity with a portal protein pb7, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a portal protein pb7;
(iii) at least one gene coding for a protein having at least 80% identity with a protease pb11, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a protease pb11; and
wherein the genes (i) to (iii) are placed under the control of an inducible promoter; preferably wherein the genes (i) to (iii) are organized within a single operon; preferably wherein the genes (i) to (iii) are ordered according to the phage T5 genome; and
a-2) expression of the vector of step a-1) by a bacterium, preferably a bacterium of the Enterobacteriaceae family, more preferably a bacterium of the *Escherichia* genus, more preferably an *Escherichia coli* bacterium; in order to obtain a phage T5 capsid devoid of genomic DNA and devoid of protein pb10; and
a-3) optionally, purification of the capsid of step a-2) using a neutral detergent, preferably chosen from n-Octyl-B-D-glucopyranoside (B-OG) and Dodecyldimethylaminoxid (LDAO).

Indeed, the Inventors have shown, in a completely surprising manner, that it is possible to produce these functionalized empty capsids without going through the production of a mutant phage. This makes it possible to eliminate the step of infecting a bacterial culture with a mutant phage, and therefore avoid the production of a substantial stock of phage, upstream of capsid production. This method also offers the advantage of preventing the phage from reverting to wild type, thus increasing safety and the yield of empty capsids. This production and decoration method developed by the inventors is therefore totally independent of the bacteriophage T5. This system is based on the construction of vectors (in particular, recombinant plasmids) bearing genes coding for bacteriophage T5 capsid proteins. Thanks to this system, it is possible to produce either empty decorated and functional capsid directly (in this case, the vector includes a sequence coding for the decoration protein and/or a fragment thereof), or undecorated capsids which can then be decorated in a second step by simple contact with the fusion protein of interest. The data show, completely unexpectedly, that the expression of these plasmids in bacteria leads to the assembly of capsids whose morphology is similar to that of capsids produced by the conventional method using a complete phage (mutant or otherwise), and whose decoration properties are comparable to those of capsids produced from the complete phage. Indeed, the data show that the self-assembling properties of capsids from the ectopic expression of capsid genes, outside the viral cycle of phage T5, are conserved. Thus, the Inventors have developed a simplified method for large-scale production of recombinant capsids devoid of genomic DNA, which can be decorated in two different ways: i) by in vitro addition of the purified decoration protein; ii) by co-production in situ of the decoration protein.

The absence of the gene coding for the decoration protein pb10 (or a fragment thereof) in the vector used ensures the complete absence of decoration during purification of capsids and before the addition of purified chimeric proteins. This offers the advantage of allowing fusion with any type of substance or molecule (even non-protein), in a customized manner.

In this case, the operon used (inserted) into the vector of step a-1) comprises (or essentially consists of, or consists of) preferably a nucleic acid sequence having at least 80% identity with the sequence SEQ ID NO: 11, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with the sequence SEQ ID NO: 11.

Advantageously, the capsid protein pb8 comprises, or essentially consists of, or consists of an amino acid sequence having the sequence SEQ ID NO: 8.

Advantageously, the portal protein pb7 comprises, or essentially consists of, or consists of an amino acid sequence having the sequence SEQ ID NO: 7.

Advantageously, the protease pb11 comprises, or essentially consists of, or consists of an amino acid sequence having the sequence SEQ ID NO: 9.

Advantageously, the decoration protein pb10, the capsid protein pb8, the portal protein pb7 and/or the protease pb11 are phage T5 proteins.

The activity and/or expression of pb7, pb8, pb10, pb11 and any combination of these can be inducible (for example, by placing the gene coding for the corresponding proteins under the control of an inducible promoter). According to a particularly advantageous embodiment, the activity and/or expression of the protease is inducible (for example, by placing the gene coding for the protease under the control of an inducible promoter).

The inventors have also shown that it is possible to directly produce the decorated empty capsid, by using a vector coding for the capsid proteins and protein pb10. The yields and efficiency are particularly high using this method.

The invention therefore concerns a method for producing a capsid, comprising the following steps:
a) obtaining a vector comprising:
(i) at least one gene coding for a protein having at least 80% identity with a capsid protein pb8, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a capsid protein pb8;
(ii) at least one gene coding for a protein having at least 80% identity with a portal protein pb7, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a portal protein pb7;
(iii) at least one gene coding for a protein having at least 80% identity with a protease pb11, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a protease pb11; and
(iv) at least one gene coding for a fusion protein such as defined above;
wherein the genes (i) to (iv) are placed under the control of an inducible promoter;
preferably wherein the genes (i) to (iv) are organized within a single operon;
preferably wherein the genes (i) to (iii) are ordered according to the phage T5 genome and the gene (iv) coding for the fusion protein occupies the locus of the gene coding for the protein pb10 in said genome;
b) expression of the vector of step a) by a bacterium, preferably a bacterium of the Enterobacteriaceae family, more preferably a bacterium of the *Escherichia* genus, more preferably an *Escherichia coli* bacterium; in order to obtain a phage T5 capsid devoid of genomic DNA and exposing on its surface, at least one copy of the fusion protein; and
c) optionally, purification of the capsid decorated in step b) using a neutral detergent, preferably chosen from n-Octyl-B-D-glucopyranoside (B-OG) and Dodecyldimethylaminoxid (LDAO).

According to one embodiment, the operon used (inserted) into the vector of step a) comprises (or essentially consists of, or consists of) a nucleic acid sequence having at least 80% identity with the sequence SEQ ID NO: 10, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with the sequence SEQ ID NO: 10.

Advantageously, the capsid protein pb8 comprises, or essentially consists of, or consists of an amino acid sequence having the sequence SEQ ID NO: 8.

Advantageously, the portal protein pb7 comprises, or essentially consists of, or consists of an amino acid sequence having the sequence SEQ ID NO: 7.

Advantageously, the protease pb11 comprises, or essentially consists of, or consists of an amino acid sequence having the sequence SEQ ID NO: 9.

Advantageously, the decoration protein pb10, the capsid protein pb8, the portal protein pb7 and/or the protease pb11 are phage T5 proteins.

The present invention also concerns the capsid obtainable by a production method described above, as well as a capsid obtained by a production method described above, as well as a capsid directly obtained by a production method described above.

Fusion Protein-Nucleic Acid-Vector-Host Cell-Nanoparticle

The inventors have shown that it is possible to produce these functionalized empty capsids in a manner completely independent from the bacteriophage T5, thus avoiding reversion of the phage to wild type and increasing safety and the yield of empty capsules. This production and decoration method is based on the construction of novel vectors (in particular, recombinant plasmids) bearing genes coding for bacteriophage T5 capsid proteins.

The invention therefore relates to a vector comprising:
(i) at least one gene coding for a protein having at least 80% identity with a capsid protein pb8, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a capsid protein pb8;
(ii) at least one gene coding for a protein having at least 80% identity with a portal protein pb7, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a portal protein pb7;
(iii) at least one gene coding for a protein having at least 80% identity with a protease pb11, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a protease pb11; and wherein the genes (i) to (iii) are placed under the control of an inducible promoter; preferably wherein the genes (i) to (iii) are organized within a single operon;

preferably wherein the genes (i) to (iii) are ordered according to the phage T5 genome.

The invention also relates to a vector comprising:
(i) at least one gene coding for a protein having at least 80% identity with a capsid protein pb8, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a capsid protein pb8;
(ii) at least one gene coding for a protein having at least 80% identity with a portal protein pb7, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a portal protein pb7;
(iii) at least one gene coding for a protein having at least 80% identity with a protease pb11, preferably at least 81% identity, preferably at least 82% identity, preferably at least 83% identity, preferably at least 84% identity, preferably at least 85% identity, preferably at least 86% identity, preferably at least 87% identity, preferably at least 88% identity, preferably at least 89% identity, preferably at least 90% identity, preferably at least 91% identity, preferably at least 92% identity, preferably at least 93% identity, preferably at least 94% identity, preferably at least 95% identity, preferably at least 96% identity, preferably at least 97% identity, preferably at least 98% identity, preferably at least 99% identity, preferably 100% identity with a protease pb11; and (iv) at least one gene coding for a fusion protein such as defined above;

wherein the genes (i) to (iv) are placed under the control of an inducible promoter; preferably wherein the genes (i) to (iv) are organized within a single operon;

preferably wherein the genes (i) to (iii) are ordered according to the phage T5 genome and the gene (iv) coding for the fusion protein occupies the locus of the gene coding for the protein pb10 in said genome;

Advantageously, the capsid protein pb8 comprises, or essentially consists of, or consists of an amino acid sequence having the sequence SEQ ID NO: 8.

Advantageously, the portal protein pb7 comprises, or essentially consists of, or consists of an amino acid sequence having the sequence SEQ ID NO: 7.

Advantageously, the protease pb11 comprises, or essentially consists of, or consists of an amino acid sequence having the sequence SEQ ID NO: 9.

Advantageously, the capsid protein pb8, the portal protein pb7 and/or the protease pb11 are phage T5 proteins and the fusion protein comprises at least a fragment of the protein pb10 of phage T5 (preferably the N-terminal domain of the phage T5 decoration protein pb10 such as defined above).

The promoter is preferably a T7 promoter; preferably the vector is an expression vector, preferably a bacterial expression vector, preferably a bacterial expression plasmid, preferably a T7 RNA polymerase expression plasmid.

The invention also concerns a host cell comprising at least one capsid such as defined above, or at least one capsid that can be obtained (or obtained, or directly obtained) by any one of the production methods defined above, or at least a vector such as defined above, or a mixture of any one of these. The host cell can be a eukaryotic cell or a prokaryotic cell. The host cells is preferably a bacterium, preferably a bacterium of the Enterobacteriaceae family, more preferably a bacterium of the *Escherichia* genus, more preferably an *Escherichia coli* bacterium. The host cell is preferably isolated. The host cell is preferably recombinant.

The invention also concerns a fusion protein such as defined above. The fusion protein is preferably isolated and/or purified. The fusion protein is preferably recombinant.

The invention also concerns a nucleic acid coding for the fusion protein such as defined above. The nucleic acid is preferably isolated and/or purified. The nucleic acid is preferably recombinant.

The invention also concerns a nanoparticle comprising at least one capsid such as defined above, or at least one capsid capable of being obtained by a production method described above, or at least one capsid obtained by a production method described above, or at least one capsid directly obtained by a production method described above, or at least one vector such as defined above, or at least one host cell such as defined above, or any mixture of these.

The invention also concerns a capsid such as defined above, or a capsid capable of being obtained by a production method described above, or a capsid obtained by a production method described above, or a capsid directly obtained by a production method described above, characterized as being a nanoparticle and/or a vector such as defined above, characterized as being a nanoparticle.

The invention concerns the use of at least one capsid as defined above, or at least one capsid capable of being obtained by a production method described above, or at least one capsid obtained by a production method described above, or at least one capsid directly obtained by a production method described above, or at least one vector such as defined above, or any mixture of these, as nanoparticle. Advantageously, the use is a non-medical biotechnological use. According to a preferred embodiment, the use is an in vitro use.

Composition—Pharmaceutical Composition

The invention also concerns a composition comprising at least one capsid such as defined above, or at least one capsid capable of being obtained by a production method described above, or at least one capsid obtained by a production method described above, or at least one capsid directly obtained by a production method described above, or at least one vector such as defined above, or at least one host cell such as defined above, or at least one nanoparticle such as described above, or any mixture of these.

The composition can also comprise at least one cosmetically-acceptable excipient (in this case, the composition is a cosmetic composition) and/or at least one appropriate vehicle which can be any excipient and/or any vehicle from among those known to the skilled person to obtain a composition such as defined above.

The Inventors have shown, in a completely surprising manner, that the fusion protein, exposed by the capsids according to the invention, conserves all its properties and functions, especially once administered in vivo. In particular, the administration of these capsids functionalized by an antigen in a mouse model induces effective immunization with significant induction of a humoral response (antibody) and a cellular response. This immunization results in effective vaccination of these mice. The invention therefore concerns a pharmaceutical and/or vaccine composition comprising at least one capsid such as defined above, or at least one capsid capable of being obtained by a production method described above, or at least one capsid obtained by a production method described above, or at least one capsid directly obtained by a production method described above, or at least one vector such as defined above, or at least one host cell such as defined above, or at least one nanoparticle such as described above, or any mixture of these.

According to one embodiment, the pharmaceutical and/or vaccine composition can also comprise at least one pharmaceutically-acceptable excipient and/or at least one pharmaceutically-acceptable adjuvant and/or at least one pharmaceutically-acceptable vehicle, which can be any appropriate excipient and/or any appropriate adjuvant and/or any appropriate vehicle from among those known to the skilled person to obtain a pharmaceutical and/or vaccine composition such as defined above. According to one advantageous embodiment, the composition (pharmaceutical or otherwise, vaccine or otherwise) is in a form suitable for topical or oral administration, or by injection.

The operating conditions for preparing these compositions are part of the general knowledge of the skilled person.

Advantageously, the composition is devoid of additional adjuvant. Indeed, the inventors have shown that the capsid according to the invention provided an adjuvant effect, with an adjuvant effect at least as effective as a model adjuvant (Freund's complete adjuvant).

Therapeutic Use—Treatment Method

The Inventors have shown, in a completely surprising manner, that the fusion protein, exposed by the capsids according to the invention, conserves all its properties and functions, especially once administered in vivo. In particular, the administration of these capsids functionalized by an antigen in a mouse model induces effective immunization with significant induction of a humoral response (antibody) and a cellular response. This immunization results in effective vaccination of these mice. The invention therefore concerns a capsid such as defined above, or a capsid capable of being obtained by a production method described above, or a capsid obtained by a production method described above, or a capsid directly obtained by a production method described above, or a vector such as defined above, or a host cell such as defined above, or a nanoparticle such as described above, or a pharmaceutical and/or vaccine composition such as defined above, or a mixture of any of these, for its use as a medicament and/or vaccine.

The invention also concerns a pharmaceutical and/or vaccine composition comprising at least one capsid such as defined above, or at least one capsid capable of being obtained by a production method described above, or at least one capsid obtained by a production method described above, or at least one capsid directly obtained by a production method described above, or at least one vector such as defined above, or at least one host cell such as defined above, or at least one nanoparticle such as described above, or any mixture of these for its use as a medicament and/or as a vaccine.

The invention also concerns the use of a capsid such as defined above, or a capsid capable of being obtained by a production method described above, or a capsid obtained by a production method described above, or a capsid directly obtained by a production method described above, or a vector such as defined above, or a host cell such as defined above, or a nanoparticle such as described above, or a pharmaceutical and/or vaccine composition such as defined above, or a any mixture of these, for the manufacture of a medicament and/or vaccine.

The invention also concerns a prevention or therapeutic treatment method, comprising the administration of a capsid such as defined above, or a capsid capable of being obtained by a production method described above, or a capsid obtained by a production method described above, or a capsid directly obtained by a production method described above, or a vector such as defined above, or a host cell such as defined above, or a nanoparticle such as described above, or a pharmaceutical and/or vaccine composition such as defined above, or any mixture of these.

The invention also concerns a capsid such as defined above, or a capsid capable of being obtained by a production method described above, or a capsid obtained by a production method described above, or a capsid directly obtained by a production method described above, or a vector such as defined above, or a host cell such as defined above, or a nanoparticle such as described above, or a pharmaceutical and/or vaccine composition such as defined above, or any mixture of these, for use in the prevention and/or treatment of infection, such as viral or bacterial infection; an autoimmune disease; a metabolic disease; a dermatological disease, a cardiovascular disease; a respiratory disease; a neurodegenerative disease; a genetic disease; an endocrine disease; a psychiatric illness; a cancer; a disease linked to an infection and/or a toxin, such as a disease linked to a viral or bacterial infection and/or linked to exposure to a toxin.

The invention also concerns a pharmaceutical and/or vaccine composition comprising at least one capsid such as defined above, or at least one capsid capable of being obtained by a production method described above, or at least one capsid obtained by a production method described above, or at least one capsid directly obtained by a production method described above, or at least one vector such as defined above, or at least one host cell such as defined above, or at least one nanoparticle such as defined above, or any mixture of these, for use in the prevention and/or treatment of infection, such as viral or bacterial infection; an autoimmune disease; a metabolic disease; a dermatological disease, a cardiovascular disease; a respiratory disease; a neurodegenerative disease; a genetic disease; an endocrine disease; a psychiatric illness; a cancer; a disease linked to an infection and/or a toxin, such as a disease linked to a viral or bacterial infection and/or linked to exposure to a toxin.

The following examples are intended to illustrate the present invention.

EXAMPLES

Example 1: Construction of Pb10 Proteins of Phage T5 Fused with Ovalbumin and Demonstration of their Decoration Properties for the Empty Phage T5 Capsid 1.1. Production of "Chimeric" Proteins: Whole Protein Pb10 Fused with a Protein of Interest or N-Terminal Domain of Pb10 Fused with a Protein of Interest: Ovalbumin Antigen The example shown here is one of the pb10 proteins fused with ovalbumin (Ova; MM=42.8 kDa) used as model antigen in vaccination tests. It describes the production of chimeric proteins consisting of the whole protein pb10 (SEQ ID NO: 1) fused with a protein of interest or only the N-terminal domain of pb10 (pb10N-Ter, corresponding to SEQ ID NO: 3) fused with a protein of interest that replaces the C-terminal domain.

Figure 2:
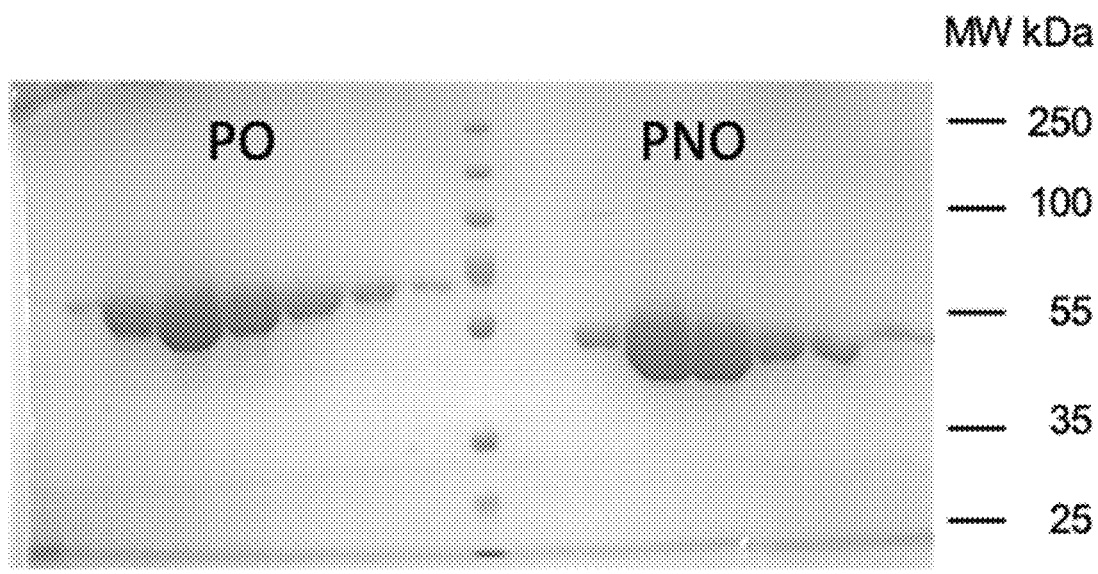
FIG. 2 shows the analysis of the purity of chimeric proteins PO and PNO by SDS-PAGE—Fractions eluted after size exclusion chromatography on Superdex75 HR10/300 column (GE Healthcare).

Chimeric proteins are produced as follows:
Expression of the pb10-OVAH6 (PO) and pb10N-Ter-OVAH6 (PNO) genes, cloned in pET28b, was performed in the *Escherichia coli* strain BL21(DE3).
Culture of the transformed bacteria in Luria Broth (LB) medium, supplemented with kanamycin (50 µg/mL) to an OD600 of 0.8.
Induction of the expression of the PO and PNO genes by addition of isopropyl-B-D-thiogalactopyranoside (0.4 mM IPTG) and continuing culture for 2 hours.
Breaking of the bacterial pellets, ultracentrifugation at 100,000 g, and collection of the supernatant.
Purification of the PO and PNO proteins from the cytoplasmic fraction (supernatant) in three steps:
1) nickel column purification in the presence of 0.1% LDAO (Dodecyldimethylaminoxid).
2) purification on anion exchange column.
3) purification by size-exclusion chromatography The purity of the chimeric proteins PO and PNO is analyzed by SDS-PAGE (fractions eluted after size-exclusion chromatography on Superdex75 HR10/300 column (GE Healthcare)). The results obtained are shown in in FIG. 2.

Note: at the end of these three steps, the endotoxin level complies with vaccination requirements (<100 EU/mL).

1.2. Demonstration of the "Decoration" Properties of Chimeric Proteins 1.2.1. Materials and Methods The chimeric proteins produced according to Example 1.1 above are used to decorate empty bacteriophage T5 capsids. The decoration tests were done by incubating the purified PO and PNO proteins with the capsids produced for 10 minutes at 4° C. according to the method in the article by Preux et al. 2013 and Vernhes et al. 2017, modified and optimized as follows:

i) A new phage T5 mutant was constructed for the production of empty capsids, T5stAmN5-Δdec, which results from the deletion of the gene coding for the decoration protein pb10 in the phage T5stAmN5 described in the publications of Preux et al. 2013 and Zivanovic 2014. This mutant makes it possible to ensure the complete absence of decoration during capsid production and before the addition of purified chimeric proteins (data not shown).

ii) Two detergents are used successively during the capsid purification steps. n-Octyl-B-D-glucopyranoside (B-OG) and Dodecyldimethylaminoxid (LDAO). Briefly, the capsids collected in the bacterial lysate resulting from the infection of a bacterial culture of $E.$ $coli$ strain F by the mutant phage T5amN5-Δdec, are precipitated in the presence of 0.5 M NaCl and 8% PEG 6000, centrifuged, resuspended in a 50 mM Tris buffer solution, pH 7.6 containing 200 to 400 mM NaCl. After a first step of purification by speed sedimentation on a glycerol gradient, the fractions containing the capsids are incubated for 6 to 12 hours in the presence of 1% B-OG, before being injected on an anion exchange column. Two successive purification steps are performed on this column. During the first step, the equilibration buffer and the elution buffer contain 0.2 to 0.05% LDAO. The fractions containing the capsids are subjected to a new purification by anion exchange in the absence of detergents. This protocol makes it possible to eliminate a very large part of the contaminant endotoxins and respect (not exceed) the endotoxin levels tolerated for injections of capsids in mice.

Figure 4:
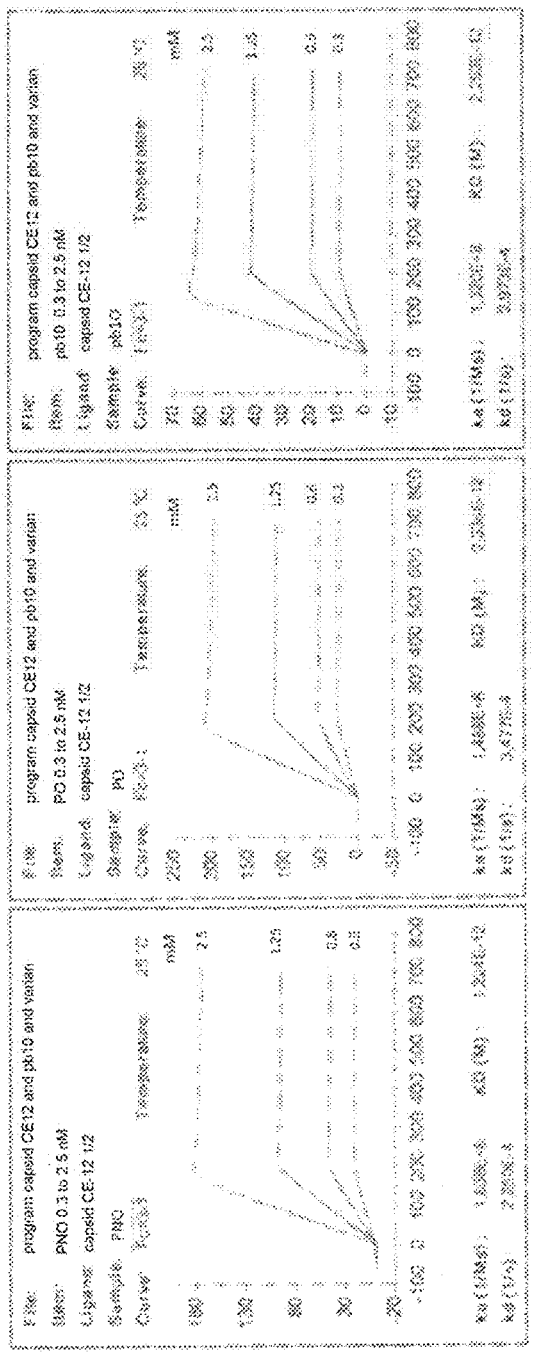
FIG. 4 shows: A. The association and dissociation profiles of the proteins pb10, PO and PNO (resonance units (RU) as a function of time) measured for increasing protein concentrations (0.312; 0.625; 1.25; 2.5). B. The affinity constants $K_D$ are calculated from the kinetic constants ka and kd for each of the proteins pb10, PO and PNO.
Figure 4:
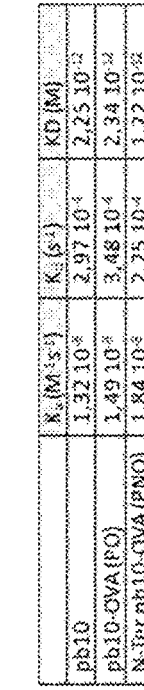

Two methods make it possible to show the binding properties of the proteins PO and PNO on pure capsids: 1) A biochemical approach by native agarose gel electrophoresis, a method which makes it possible to visualize the complete decoration of the capsids by a delay effect on the gel (FIG. 3). 2) Surface plasmon resonance (SPR), a method that makes it possible to determine the kinetic constants of association and dissociation of chimeric proteins on the empty capsids and calculate an affinity constant (FIG. 4). These two techniques have been described in the article by Vernhes et al. Scientific Reports 2017).

1.2.2. Analysis of the Decoration by Native Agarose Gel Electrophoresis

FIG. 3 shows the results of tests of the decoration of pure empty capsids with the pb10, PO and PNO proteins. The respective concentrations of the different decoration proteins and capsids have been adjusted to obtain [protein]/[binding sites on the capsid] concentration ratios=1+/−0.1. The migration of decorated capsids [1] is delayed compared to undecorated capsids [0]. FIG. 3 shows that the capsids are entirely decorated with the same concentrations of the pb10, PO and PNO proteins. This first test indicates that the affinity of the PO and PNO proteins for the capsids is comparable to that of the native protein pb10.

1.2.3. Measurement of the Decoration Protein Affinity by SPR

FIG. 4 shows that the chimeric PO and PNO proteins have the same affinity as the decoration protein pb10 for empty phage T5 capsids. The fusion of the complete ovalbumin antigen to the C-terminal end of the whole protein pb10 or even the C-terminal end of the single domain pb10N-Ter does not affect the high affinity of the decoration protein for the capsids 1.2.4. Conclusion The T5 capsid therefore constitutes a nanoparticle of biological origin that is able to expose on its surface 120 copies of a protein whose function can vary according to the nature of the peptide or protein which is fused to the decoration protein.

Figure 5:
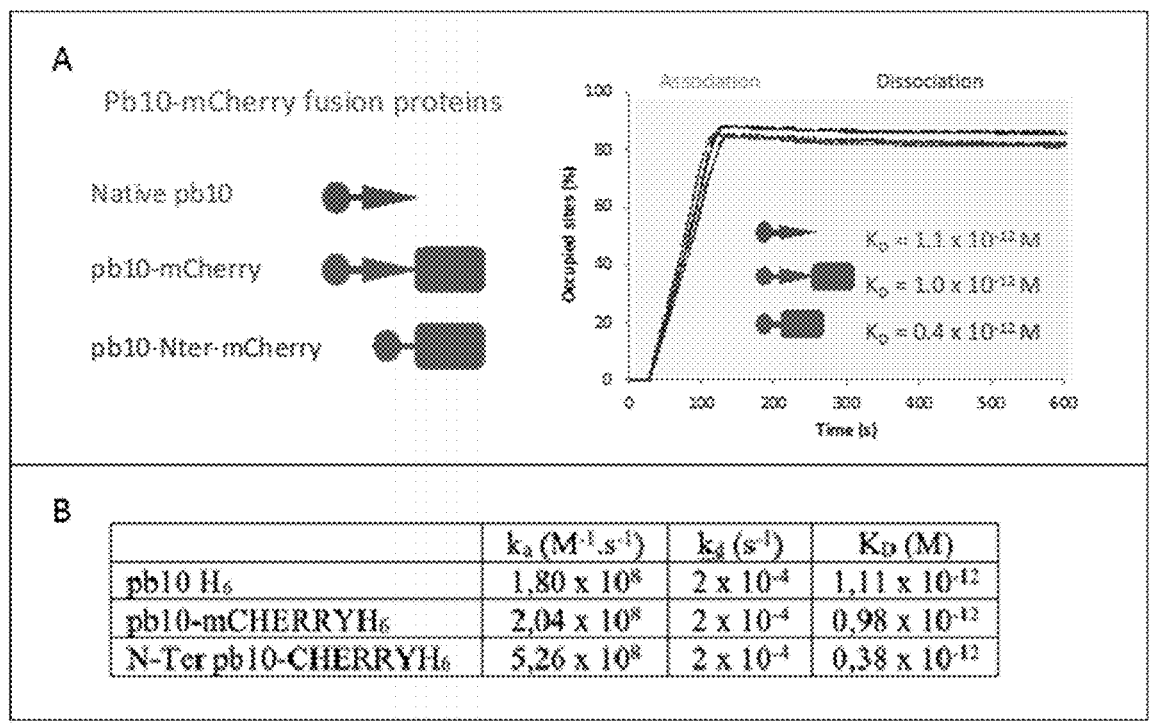
FIG. 5 shows the surface plasmon resonance (SPR) binding profiles of the pb10 H6, pb10-mCHERRYH6 and N-Ter pb10-mCHERRYH6 proteins on empty phage T5 capsids and the calculation of affinity constants for kinetic constants measured by SPR.

1.3. Production of "Chimeric" Proteins: Whole Protein Pb10 Fused with a Protein of Interest or N-Terminal Domain of Pb10 Fused with a Protein of Interest: mCHERRY Fluorescent Protein A second example of modification of the decoration protein was studied. The chimeric proteins fused with mCHERRY fluorescent protein (28.9 kDa) pb10-mCHERRYH6 (SEQ ID NO: 14) and pb10N-Ter-mCHERRYH6 (SEQ ID NO: 15) were constructed and their decoration properties were tested. The results shown by FIG. 5 confirm that it is possible to fuse a second, large protein to the C-terminal end of pb10 or its Nter domain without affecting the capsid binding properties. This decoration protein can be used to decorate whole phage capsids. This especially makes fluorescence imaging applications possible.

1.4. Development of a Capsid Production System Independent of Phage T5

The production method for empty capsules, which was used at the start of this study, relies on the infection of a bacterial culture by a mutant phage T5, which requires the production of a large stock of this phage, upstream of capsid production. Further, during infection, a high frequency of reversion to wild type is observed, which reduces the yield of empty capsids. In order to overcome these constraints and from the perspective of increasing the scale of capsid production, the Inventors have developed a system for capsid production and decoration that is totally independent of bacteriophage T5.

Figure 6:
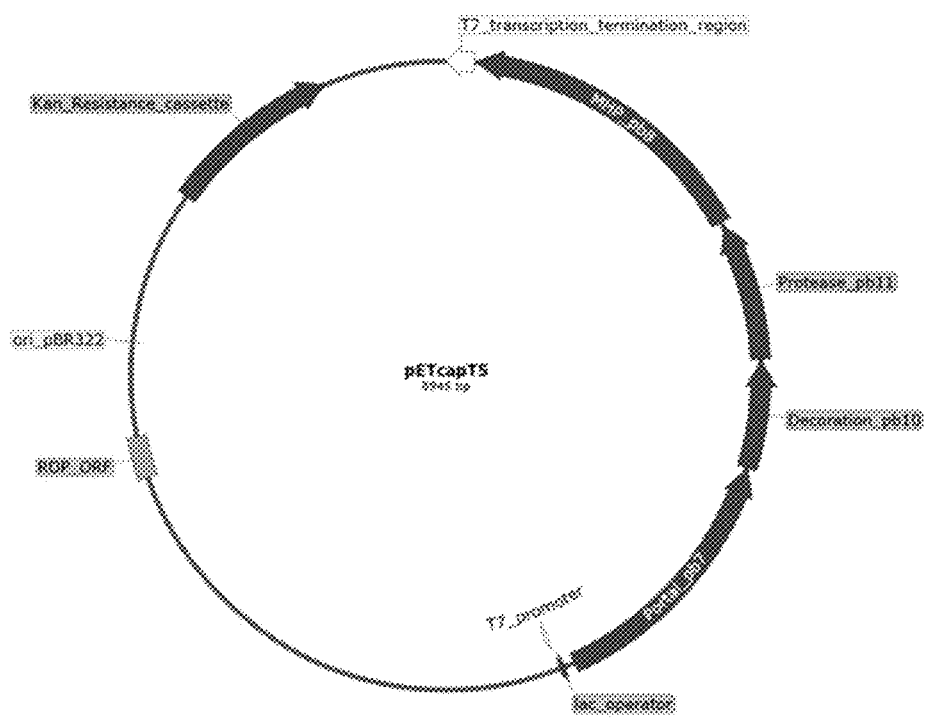
FIG. 6 shows a schematic representation of the vector pETcapT5 (of SEQ ID 12).
Figure 7:
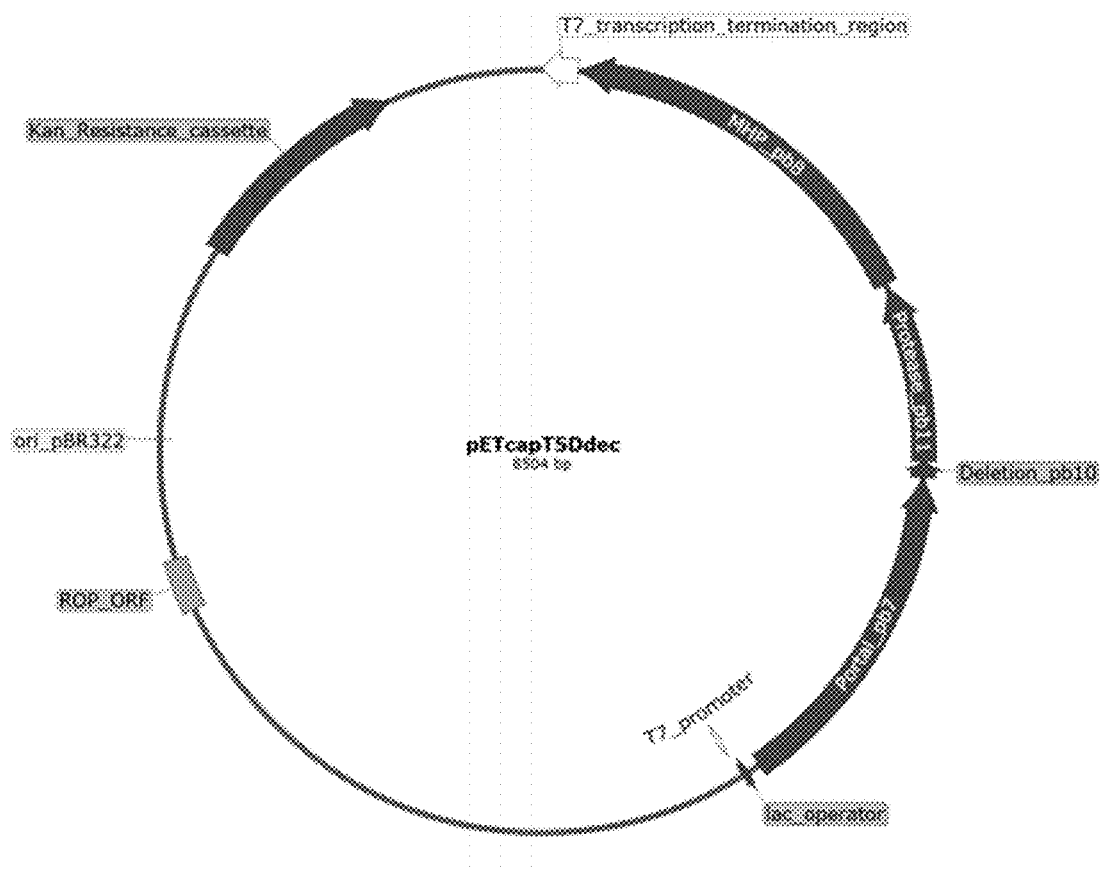
FIG. 7 shows a schematic representation of the vector pETcapT5Δdec (of SEQ ID 13).

The 4 capsid genes coding for the portal protein pb7, the decoration protein pb10, the maturation protease pb11 and the major capsid protein pb8 were cloned in a vector pET28b, such as they are organized in the T5 genome (pETcapT5; FIG. 6). Their expression, under the control of a T7 promoter is repressed in the presence of glucose and inducible by IPTG, which makes it possible to control basal expression of the protease which is toxic for the $E.$ $coli$ expression strain. A second version of this plasmid (pETcapT5Δdec; FIG. 7) wherein the gene for protein pb10 has been deleted was also constructed. The operon sequences such as inserted into these plasmids, as well as those of the plasmids obtained are as follows:

Operon (insert) capT5: SEQ ID NO: 10; Operon (insert) capT5Δdec: SEQ ID NO: 11; pETcapT5: SEQ ID NO: 12; pETcapT5Δdec: SEQ ID NO: 13.

The capsids produced from the plasmids were purified according to the protocols already described for the capsids produced from mutant phages, with a few variations. In particular, the capsids harvested after the first step of purification on glycerol gradient were centrifuged for 20 to 30 minutes at 60,000 g. This ultracentrifugation step makes it possible to concentrate the capsids and eliminate a substantial portion of the soluble proteins and DNA contaminants, before the anion-exchange chromatography steps.

Figure 8:
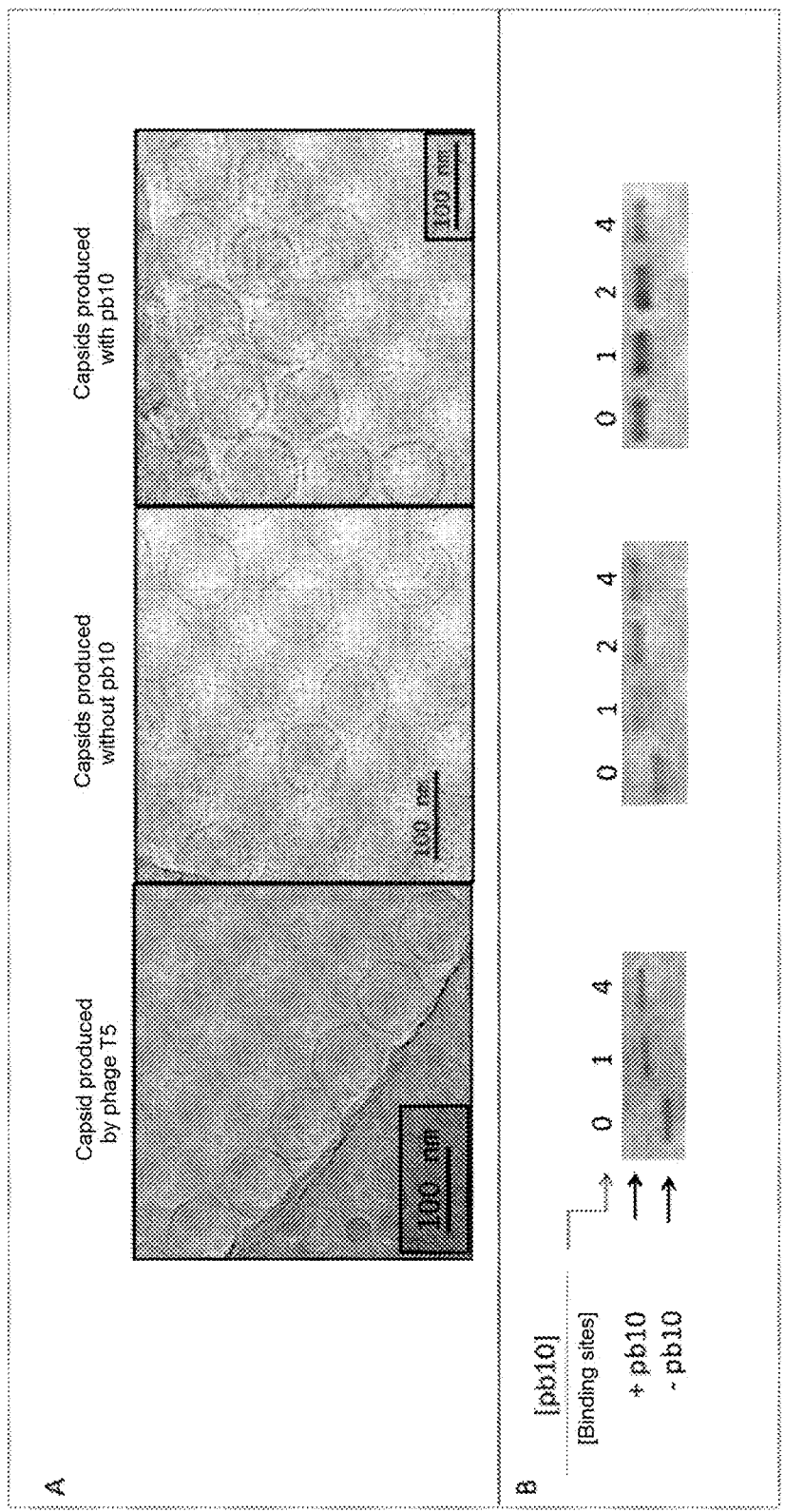
FIG. 8 shows: A) Analysis by cryo-electron microscopy of capsids produced from recombinant and purified plasmids. From left to right: control capsids produced from phage T5 mutated in the terminase gene, capsids produced from the plasmids pETcapT5Δpb10 and pETcapT5. B) Analysis on native agarose gel of the decoration of the capsids with the protein pb10 (protocol described in Vernhes et al.). The capsids have been incubated with the protein pb10 at different ratios [number of pb10 copies]/[number of pb10 binding sites] (1/1, 2/1 or 4/1). The saturation of capsids in pb10 is obtained for ratios 1/1 and 2/1, respectively, for "native" capsids produced from the mutant phage and for capsids produced from the plasmid pETcapT5Δdec. The capsids produced from the plasmid pETcapT5 migrate to the position of the capsids saturated in pb10, indicating that they are completely decorated when they are assembled in the bacteria.
Figure 9:
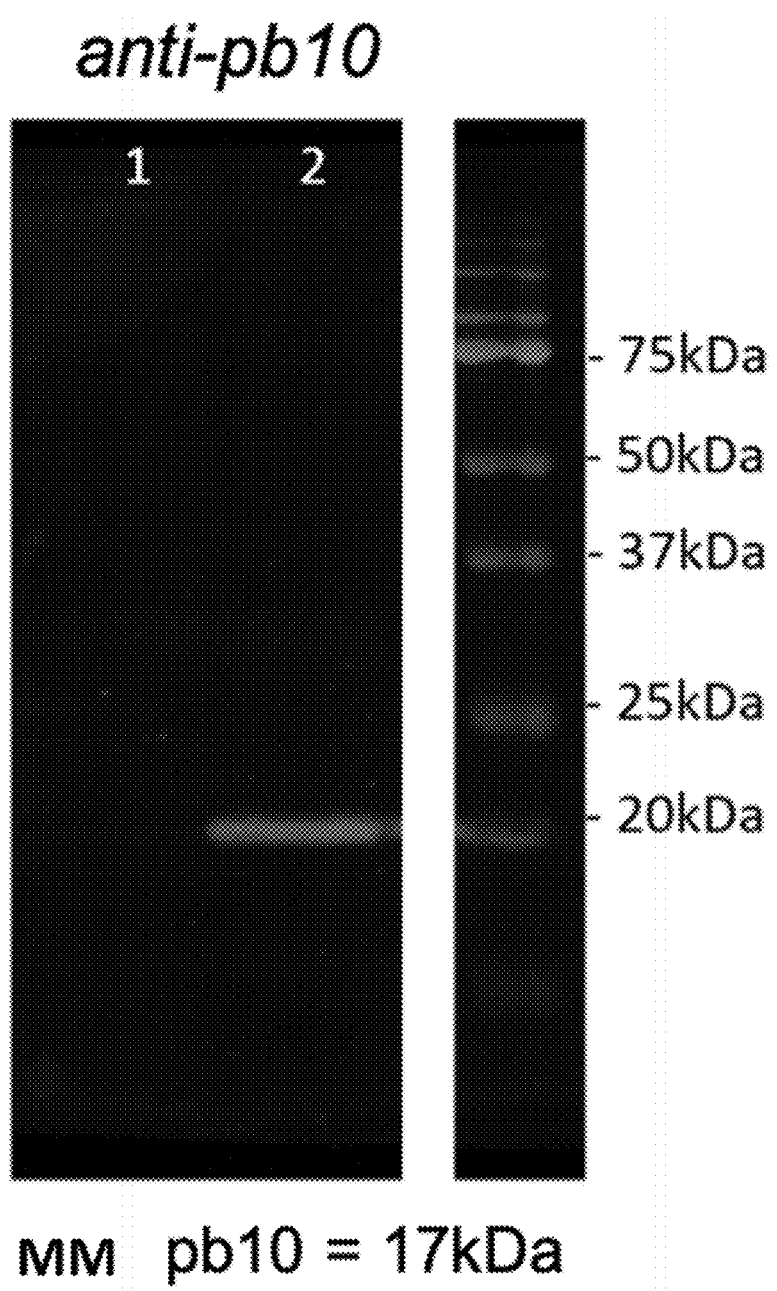
FIG. 9 shows the western blot results showing the presence of pb10 on the capsids, revealed with polyclonal antibodies directed against pb10. 1: purified capsids obtained from the plasmid pETcapT5Δdec; 2: capsids obtained from the plasmid pETcapT5.

The results show that the expression, in this $E.$ $coli$ bacterium, of capsid genes from these plasmids leads to self-assembly of capsids whose morphology is similar to that of capsids produced by the phage then expanded in vitro (FIG. 8A). The ability of these recombinant capsids to bind the decoration protein was assessed by a biochemical approach using native agarose gels, which gives an estimation of the affinity of pb10 for its binding sites (FIG. 8B). Binding tests on the two capsid populations were conducted with purified protein pb10. The capsids that were assembled in the absence of pb10 show decoration properties comparable to those of capsids produced from the phage. The capsids produced in the presence of decoration protein pb10 have an electrophoretic mobility comparable to those of fully decorated capsids, and their migration on the gel is not changed by the addition of pb10. This result shows that they were decorated in situ during their assembly, that they are unable to bind the decoration protein if it is added after their purification and that all the binding sites are saturated during assembly (optimum efficiency). The presence of pb10 on these capsids was verified by western blot using polyclonal antibodies directed against pb10 (FIG. 9).

1.5. Observations

These data show the self-assembling properties of empty capsids from the ectopic expression of capsid genes, outside the viral cycle of phage T5. These data especially differ from the results published previously (Huet et al. 2016) at least by the fact that:

i) the toxicity of the protease can be controlled, before induction with IPTG, by repression of the basal expression of capsid genes in the presence of 0.2% to 0.5% glucose, which significantly increases the capsid yield.

ii) the capsids produced with the plasmid pETcapT5Δpb10 are obtained in their expanded conformation and those produced from plasmid pETcapT5 are obtained in their expanded and completely decorated conformation.

These recombinant T5 capsids can therefore be decorated in two different ways: i) by in vitro addition of the purified decoration protein; ii) by co-production in vivo of the decoration protein with the proteins forming the capsid. These two methods enable the simplified production of functionalizable nanoparticles and make it possible to produce them on a larger scale, relative to the production that uses phage T5.

Example 2: Vaccination Experiments in Mice (In Vivo)

The results obtained in in vivo experiments were generated by using preparations of phage capsids and recombinant proteins produced by the Pascale Boulanger (PB) group. The endotoxin contamination of the preparations was tested by the Karim Benihoud (KB) group.

2.1. Experiment 1

Objective: to compare the immune responses induced by recombinant proteins pb10-OvaH6 (PO) and Pb10Nterm-OvaH6 (PNO) according to whether or not they are associated with purified phage T5 capsids (C).

TABLE 1

Experiment 1 experimental plan

| Groups | Proteins | Capsids | Complete Freund's Adjuvant (CFA) |
|---|---|---|---|
| PO | PO | − | − |
| PO + C | PO | + | − |
| PNO | PNO | − | − |

TABLE 1-continued

Experiment 1 experimental plan

| Groups | Proteins | Capsids | Complete Freund's Adjuvant (CFA) |
|---|---|---|---|
| PNO + C | PNO | + | − |
| PO + CFA | PO | − | + |

Key: pb10-OvaH6 = PO; pb10Nterm-OvaH6 = PNO; purified phage T5 capsid = C

2.2. Experiment 2

Objective: to compare the immune responses induced by recombinant proteins pb10-Ova (PO) and pb10Nterm-Ova (PNO) according to whether or not they are associated with purified phage T5 capsids.

TABLE 2

Experiment 2 experimental plan

| Groups | Proteins | Capsids | Complete Freund's Adjuvant (CFA) |
|---|---|---|---|
| PO | PO | − | − |
| PO + C | PO | + | − |
| PNO | PNO | − | − |
| PNO + C | PNO | + | − |
| PO + CFA | PO | − | + |

In this experiment, the endotoxin contamination of purified capsid preparations and recombinant proteins was tested.

2.3. Experiment 3

Objective: to compare the immune responses induced by recombinant proteins Pb10Nterm-OvaH6 (PNO) according to whether or not it is associated with purified phage T5 capsids.

TABLE 3

Experiment 3 experimental plan

| Groups | Protected | Capsids | Complete Freund's Adjuvant (CFA) |
|---|---|---|---|
| PNO | PNO | − | − |
| PNO + C | PNO | + | − |
| PO + CFA | PNO | − | + |

In this experiment, the endotoxin contamination of purified capsid preparations and recombinant proteins was tested.

2.4. Materials and Methods

2.4.1. Determination of the Endotoxin Content

The levels of endotoxins in the protein and capsid preparations used for the in vivo experiments were quantified using the LAL Chromogenic Endotoxin Quantitation Kit (Pierce LAL) according to the manufacturer's instructions (Thermo Fisher Scientific).

2.4.2. Immunization of Mice

Six-week old female C57BL/6 mice were provided by Janvier (Le Genest Saint Isle, France). All the mice were conditioned for at least a week in our animal facilities before the start of the experiments. All the animal experiments were approved (authorization number 19055-2019021108472030) by Ethics Committee No. 26 (officially recognized by the French Ministry of Research) in accordance with European Directive 2010/63 EU and its transposition into French law.

Recombinant pb10 fusion proteins (3.6 µM) with or without capsid (32 nM) were injected subcutaneously in a 50-µl volume of PBS buffer. In some experiments, a control group received an injection of pb10-Ova (3.6 µM) mixed with complete Freund's adjuvant (CFA, Sigma). Similar conditions were used during readministration (second injection) except for the control group for which the complete Freund's adjuvant was replaced by incomplete Freund's adjuvant (IFA, Sigma). Blood samples were drawn in the submandibular vein at different times after administration of the vaccine preparations. The sera were prepared and analyzed to determine the presence of specific antibodies by ELISA as described below. Spleens were harvested 10 days after the second injection to measure the cellular immune responses.

2.4.3. Measurement of Antibody Responses

Ovalbumin (1 µg, Sigma) was immobilized on 96-well plates (Nunc). After washing in TBST buffer and saturation with TBS-Tween with 5% milk, serial dilutions of the sera in 5% milk TBST were added. The antibodies bound were detected with goat antibodies specific for mouse IgG or isotypes (IgG1, IgG2b, IgG2c, IgG3 or IgM) conjugated to peroxidase (Southern Biotechnology Associates, Birmingham, AL). The peroxidase activity was revealed by incubation with the substrate 0-phenylenediamine dihydrochloride (Sigma-Aldrich) for 30 min. The reaction was stopped by addition of 3N HCl and spectrophotometric readings were taken at 490 nm. The titers were defined as being the inverse of the dilution, the highest giving an OD490 twice as high as the background values. A similar protocol was used to measure capsid or pb10 specific antibodies.

2.4.4. Measurement of Cellular Immune Responses.

The spleens were ground in RPMI medium supplemented with 10% foetal calf serum and $10^{-5}$ M α-mercaptoethanol, then filtered through a 100 µm sieve. After elimination of red blood cells by ACK Lysing Buffer (Invitrogen, Cergy Pontoise, France), the cells were resuspended and the concentration was adjusted to $2.5 \times 10^6$ cell/mL. The splenocytes were then restimulated under different conditions (medium alone, peptide $Ova_{257-264}$ (5 µg/ml), in a volume of 200 µl for one day (ELISPOT) or for three days (ELISA). For the ELISPOTs, the plates were revealed according to the supplier's instructions (Diaclone). The number of spots of cells producing IFNγ was counted by ImmunoSpot® S6 FluoroSpot (CTL, Cleveland, Ohio). For the ELISA, test, the IFNγ concentration in the supernatants was determined by using an IFNγ assay kit (eBioscience). A re-stimulation with ionomycin (1 µM) and Phorbol myristate acetate (0.1 µM) was used to control the quality of the splenocyte preparations.

2.5. Results

The results are presented in Table 4 below showing the endotoxin concentration measurement data; in FIG. 10 (kinetics of anti-Ova antibody response induced by the pb10 fusion proteins); in FIG. 11 (characterization of the nature of the antibodies induced by the pb10 fusion proteins); in FIG. 12 (analysis of cellular responses induced by the pb10 fusion proteins with Ova); and in FIG. 13 (analysis of cellular responses induced by the protein PNO).

TABLE 4

Endotoxin concentration for Experiments 1 to 3

| Concentration of endotoxins | Capsids | PO | PNO |
| --- | --- | --- | --- |
| EXPERIMENT 1 | >200 EU/ml | 42 EU/ml | 108 EU/ml |
| EXPERIMENT 2 | 64.4 EU/ml | 14 EU/ml | 13.7 EU/ml |
| EXPERIMENT 3 | 23.6 EU/ml (2.8 EU/10 µg) | — | 18.5 EU/ml (9.3 EU/100 µg) |

Results from Experiment 2

Figure 10:
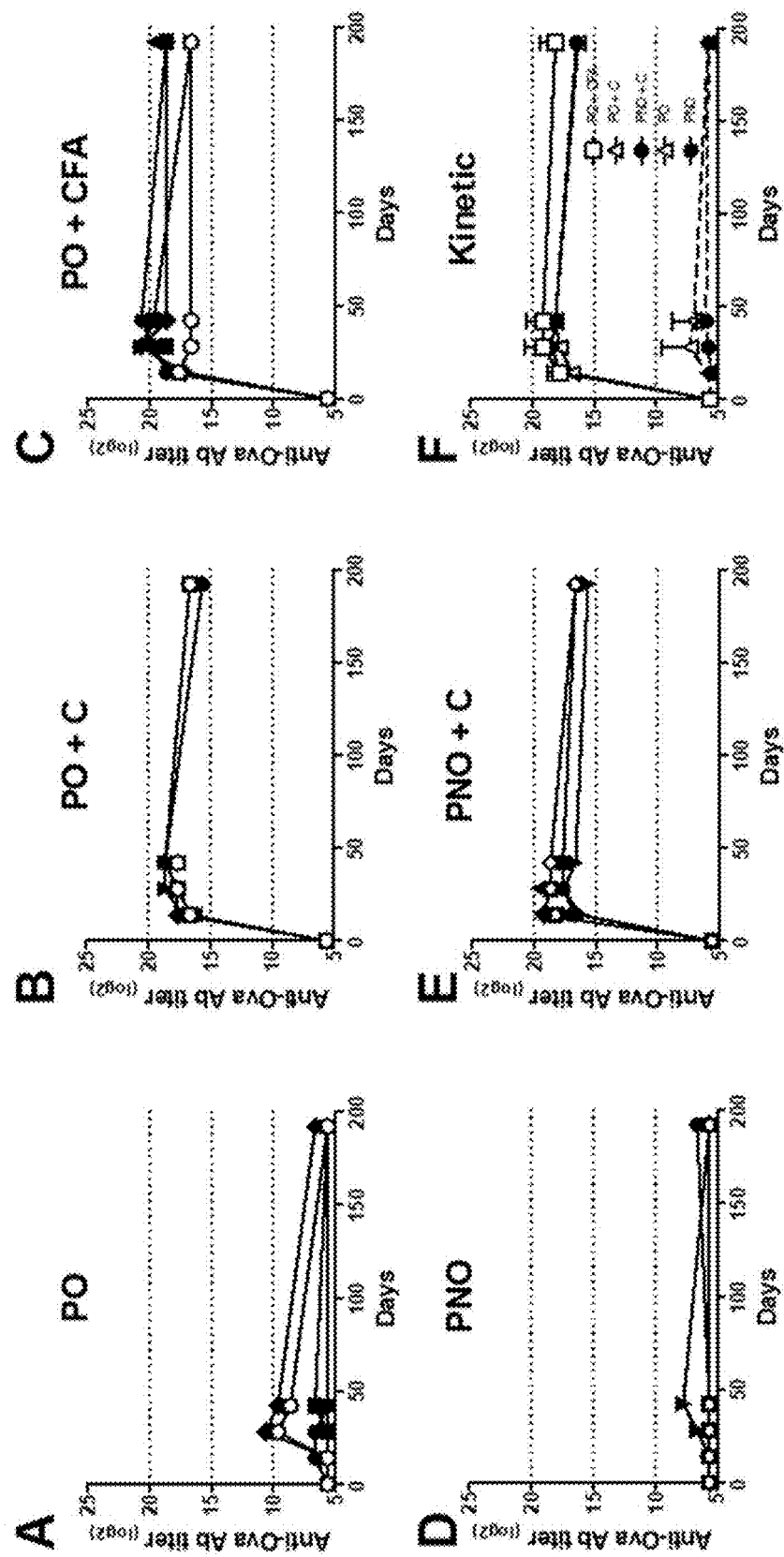
FIG. 10 shows the kinetics of the anti-Ovalbumin (Ova) antibody response induced by the pb10 fusion proteins. The mice were immunized subcutaneously with a dose of the PO or PNO fusion proteins alone or associated with purified phage capsids or complete Freund's adjuvant. The total anti-Ova antibodies (IgG) were quantified by ELISA at different times after administration. A-E Each curve represents the results of individual mice (n=6). F Antibody response kinetics for each group (mean+standard deviation).

The data of FIG. 10 show that:

The PO and PNO proteins injected alone induce a small amount of anti-Ova antibody (IgG) production The PO and PNO proteins injected with purified phage T5 capsids induce strong Ab responses with a plateau attained on day 28 after administration of vaccine preparations. This response is long-lasting since anti-Ova antibodies are still detected at high levels 192 days after administration of PO or PNO associated with purified capsids.

The anti-Ova Ab response kinetics (Total IgG) in the groups injected with PO or PNO plus capsids is comparable to that obtained when the mice are co-injected with PO+CFA (response positive control).

The coadministration of the pb10 fusion proteins with purified phage T5 capsids induces a long-lasting antiOva Ab response completely comparable to that obtained with a standard adjuvant, Complete Freund's Adjuvant (CFA)

Figure 11:
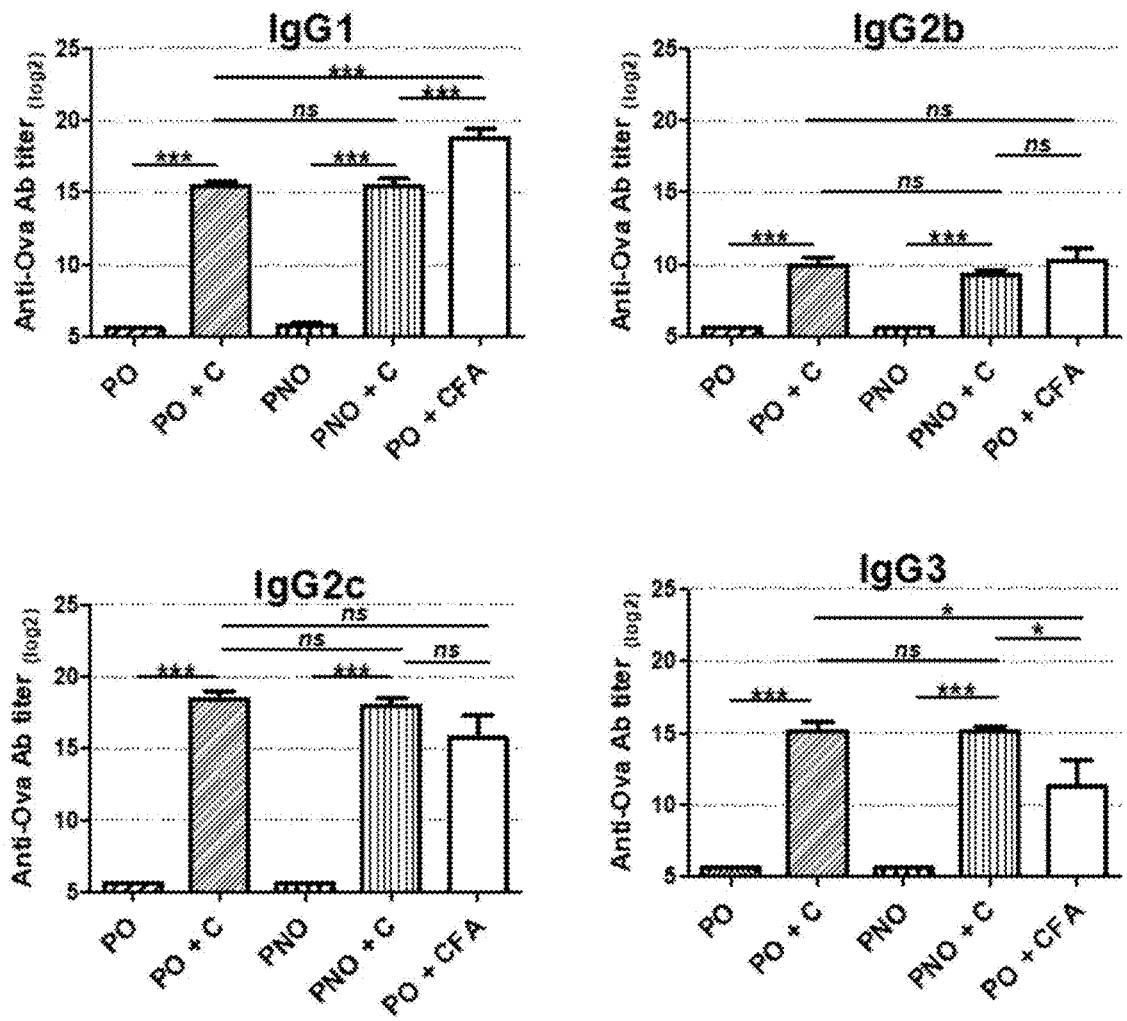
FIG. 11 shows the characterization of the nature of the antibodies induced by the pb10 fusion proteins. The mice were immunized subcutaneously with a dose of the PO or PNO fusion proteins alone or associated with purified T5 phage capsids or complete Freund's adjuvant. Anti-Ova antibodies of isotypes IgG1, IgG2b, IgG2c and IgG3 were quantified by ELISA on day 42. The data correspond to the mean+standard deviation SEM (n=6) ANOVA test followed by Tukey test: *, $p<0.005$; , $p<0.01$; *, $p<0.001$; ns, difference not significant.

The data of FIG. 11 show:

Very substantial production of anti-Ova Ab of type IgG1, IgG2b, IgG2c and IgG3 in the mice groups injected with PO+C or PNO+C, compared to the PO or PNO alone groups.

No difference in the isotypes produced between the PO+C and PNO+C groups which suggests that the N-terminal part of pb10 alone is sufficient and that the presence of a complete protein pb10 is not necessary for the production of anti-Ova Ab.

Compared to the PO+CFA group, the PO+C and PNO+C groups produce less anti-Ova antibody of type IgG1 but produce more Ab of type IgG3. There is no significant difference for anti-Ova Ab of isotype IgG2b and IgG2c (for IgG2c there is a trend to an increase).

The administration of PO or PNO proteins with purified capsids leads to an anti-Ova Ab response having a broad isotype profile. However, compared to that of CFA, a significant bias is observed in favor of IgG3 (complement-activating isotype) and a significant reduction of IgG1.

Figure 12:
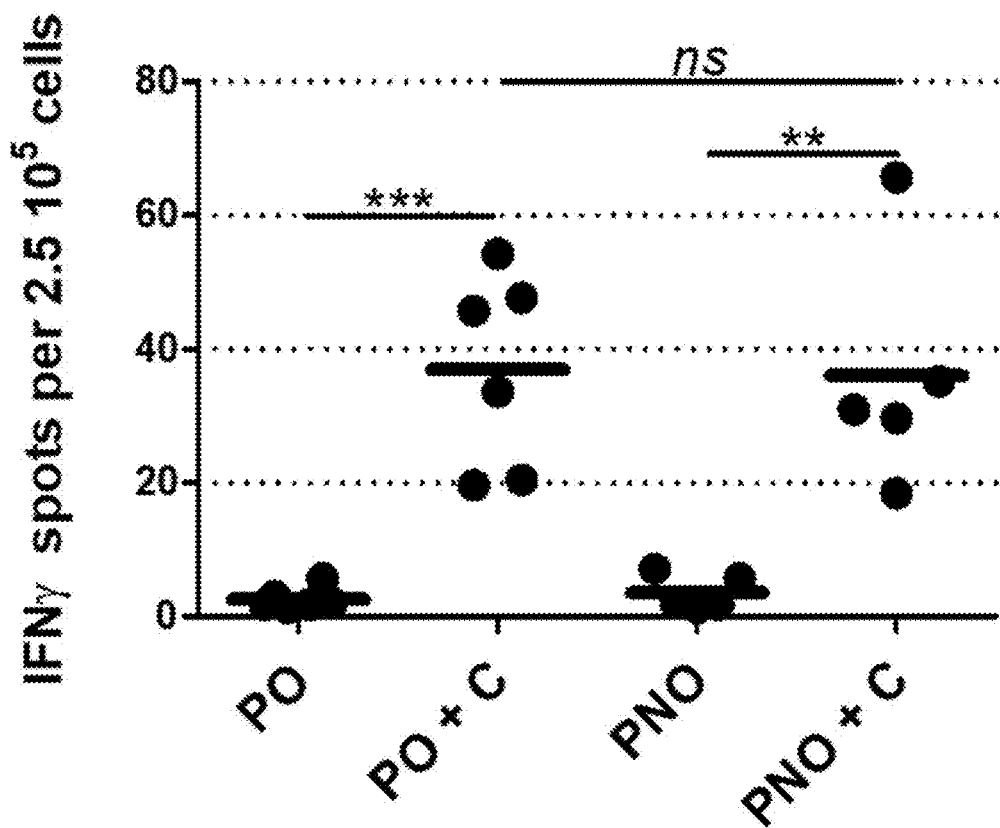
FIG. 12 shows the analysis of cellular responses induced by pb10 fusion proteins with Ova. The mice were immunized subcutaneously with a dose of the PO or PNO fusion proteins alone or associated with purified T5 phage capsids. Then they received a second administration of the same vaccine preparations on day 196. After 10 days, the splenocyte response to stimulation by the peptide$_{Ova257-264}$ was measured by quantifying by ELISPOT the number of splenocytes producing IFNγ. The bars show the means obtained for each group and the circles show the individual results obtained for each mouse (n=6). ANOVA test followed by Tukey test: , $p<0.01$; *, $p<0.001$; ns, difference not significant.

The data of FIG. 12 show that:

The test of splenocyte restimulation by the immunodominant peptide $Ova_{257-264}$ shows a larger number of splenocytes producing IFNγ for mice injected with PO+C or PNO+C compared to mice injected with PO or PNO alone. These results demonstrate that the mice vaccinated with fusion proteins+capsids have a greater anti-Ova T response. As the restimulation was carried out with a T epitope capable of associating with class I molecules of the major histocompatibility complex, this demonstrates that there is, in these mice, a higher production of CD8+ T cells specific for ovalbumin and that they are functional (production of IFNγ).

The number of splenocytes producing IFNγ is not significantly different between the PO+C and PNO+C groups, suggesting that the pb10 fusion protein does not necessarily need to contain the entire pb10 sequence.

pb10 fusion proteins coadministered with purified phage capsids induce strong cellular responses in mice.

Results from Experiment 3

Figure 13:
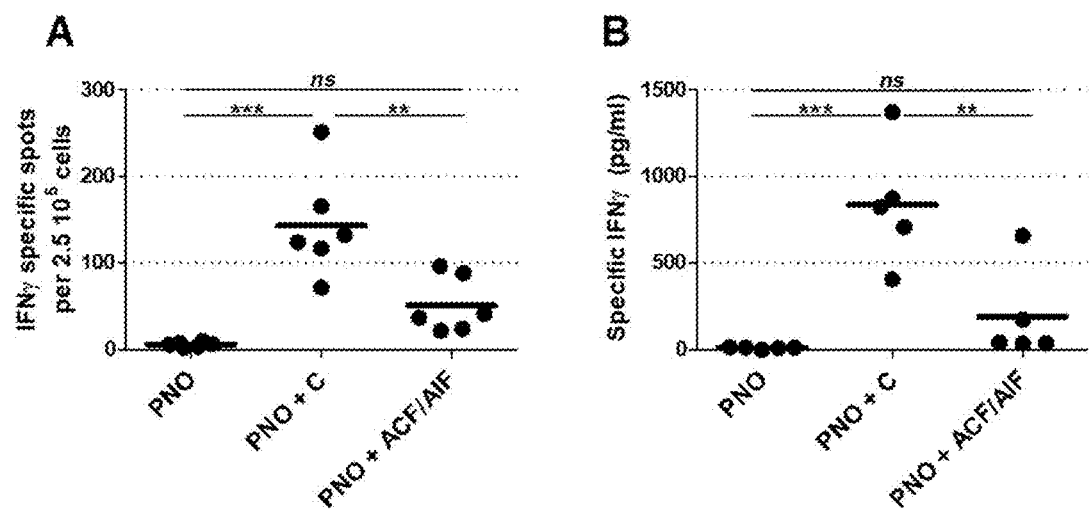
FIG. 13 shows the analysis of cellular responses induced by protein PNO. The mice were immunized subcutaneously with a dose of the PO fusion protein alone or associated with purified T5 phage capsids or complete Freund's adjuvant. Then they received a second administration of the same vaccine preparations on day 59. After 10 days, the response of splenocytes to antigenic stimulation by the peptide $Ova_{257-264}$ was measured and quantified by the number of splenocytes producing IFNγ (A) or by measuring the amount of IFNγ in splenocyte culture supernatants (B). The bars show the means obtained for each group and the circles show the individual results obtained for each mouse (n=5). ANOVA test followed by Tukey test: , $p<0.01$; *, $p<0.001$; ns, difference not significant.

The data of FIG. 13 show that:

The test of splenocyte restimulation by the immunodominant peptide Ova$_{257-264}$ shows a larger number of splenocytes producing IFNγ for mice injected with PNO+C compared to mice injected with PNO alone (FIG. 13A).

Likewise, the restimulation test shows a higher production of IFNγ in splenocyte supernatants derived from mice injected with PNO+C (FIG. 13B)

The number of splenocytes producing IFNγ or the quantity of IFNγ produced in the supernatant is greater than those found with splenocytes from mice injected with PNO+CFA.

The results show that the protein PNO induces a significantly-higher anti-Ova cellular response when it is associated with purified capsids. This response is also higher than that obtained when this protein is coadministered with CFA.

The invention claimed is:

1. Phage T5 capsid devoid of genomic DNA from said phage and exposing, on its surface, at least one fusion protein; said fusion protein comprising:
- at least one peptide or protein fragment having at least 80% identity with a fragment of the decoration protein pb10; and
- at least one functional fragment of an antigen, or at least one functional fragment of a toxin, or at least one receptor fragment, or at least one functional fragment of an addressing or targeting or transport signal, or at least one functional fragment of an enzyme, or at least one functional fragment of a hormone, or at least one functional fragment of an antibody, or at least one antigen, or at least one toxin, or at least one receptor, or at least one addressing or targeting or transport signal, or at least one enzyme, or at least one hormone, or at least one antibody, or any combination thereof, wherein said functional fragment performs said function with an efficacy equal to at least 30% of said antigen, toxin, receptor, targeting or transport signal, enzyme, hormone, or antibody.

2. Capsid according to claim 1, wherein the fragment of the decoration protein pb10 is selected from the group consisting of:
- i) a peptide or protein fragment having at least 80% identity with a portion of the N-terminal domain of a protein pb10;
- ii) a peptide or protein fragment having at least 80% identity with the N-terminal domain of a protein pb10;
- iii) a fragment or peptide of a protein comprising an amino acid sequence having at least 80% identity with SEQ ID NO:1;
- iv) a fragment or peptide of a protein consisting of an amino acid sequence having at least 80% identity with SEQ ID NO:1;
- v) a peptide comprising an amino acid sequence having at least 80% identity with SEQ ID NO:3
- vi) a peptide consisting of an amino acid sequence having at least 80% identity with SEQ ID NO:3; and
- vii) a fragment or peptide of a protein comprising an amino acid sequence having at least 80% identity with SEQ ID NO: 16.

3. Capsid according to claim 1, wherein the functional fragment of an antigen, the functional fragment of a toxin, the receptor fragment, the functional fragment of an addressing or targeting or transport signal, the functional fragment of an enzyme, the functional fragment of a hormone, the functional fragment of an antibody, the antigen, the toxin, the receptor, the addressing or targeting or transport signal, the enzyme, the hormone, the antibody, or any combination thereof, is a peptide, polypeptide, or protein comprising at least 10 consecutive amino acids.

4. Capsid according to claim 1, also comprising (i) at least one copy of a protein having at least 80% identity with a capsid protein pb8; or (ii) at least one copy of a protein having at least 80% identity with a portal protein pb7; or (iii) at least one copy of a protein having at least 80% identity with a protease pb11; or (iv) any combination of (i) through (iii).

5. Capsid according to claim 1, being in the mature expanded form.

6. Method for producing a capsid according to claim 1, comprising the following steps:
- a) production of a phage T5 capsid devoid of genomic DNA and devoid of protein pb10; and
- b) putting the capsid of step a) in contact with a fusion protein as defined in claim 1 in order to obtain a decorated capsid.

7. Method according to claim 6, wherein the capsid of step a) is obtained by a method comprising the following steps:
- a-1) obtaining a vector comprising:
  - (i) at least one gene coding for a protein having at least 80% identity with a capsid protein pb8;
  - (ii) at least one gene coding for a protein having at least 80% identity with a portal protein pb7; and
  - (iii) at least one gene coding for a protein having at least 80% identity with a protease pb11;
- wherein the genes (i) to (iii) are placed under the control of an inducible promoter; and
- a-2) expression of the vector of step a-1) by a bacterium in order to obtain a phage T5 capsid devoid of genomic DNA and devoid of protein pb10.

8. Method for producing a capsid according to claim 1, comprising the following steps:
- a) obtaining a vector comprising:
  - (i) at least one gene coding for a protein having at least 80% identity with a capsid protein pb8;
  - (ii) at least one gene coding for a protein having at least 80% identity with a portal protein pb7;
  - (iii) at least one gene coding for a protein having at least 80% identity with a protease pb11; and
  - (iv) at least one gene coding for a fusion protein as defined in claim 1;
- wherein the genes (i) to (iv) are placed under the control of an inducible promoter;
- b) expression of the vector of step a) by a bacterium in order to obtain a phage T5 capsid devoid of genomic DNA and exposing on its surface at least one copy of the fusion protein.

9. Vector as defined in claim 8.

10. Host cell comprising:
- (i) at least one capsid according to claim 1, or
- (ii) at least one capsid obtainable by a production method comprising the following steps:
  - a) production of a phage T5 capsid devoid of genomic DNA and devoid of protein pb10; and
  - b) putting the capsid of step a) in contact with a fusion protein of claim 1 in order to obtain a decorated capsid; or
- (iii) at least one vector comprising:
  - a) at least one gene coding for a protein having at least 80% identity with a capsid protein pb8;

b) at least one gene coding for a protein having at least 80% identity with a portal protein pb7;
c) at least one gene coding for a protein having at least 80% identity with a protease pb11; and
d) at least one gene coding for a fusion protein as defined in claim 1,
wherein genes a)-d) are placed under the control of an inducible promoter, or
(iv) any mixture thereof.

11. Fusion protein according to claim 1.

12. Nucleic acid coding for the fusion protein according to claim 11.

13. Nanoparticle comprising:
(i) at least one capsid according to claim 1, or
(ii) at least one capsid obtainable by a production method comprising the following steps:
a) production of a phage T5 capsid devoid of genomic DNA and devoid of protein pb10; and
b) putting the capsid of step a) in contact with a fusion protein of claim 1 in order to obtain a decorated capsid; or
(iii) at least one vector comprising:
a) at least one gene coding for a protein having at least 80% identity with a capsid protein pb8;
b) at least one gene coding for a protein having at least 80% identity with a portal protein pb7;
c) at least one gene coding for a protein having at least 80% identity with a protease pb11; and
d) at least one gene coding for a fusion protein as defined in claim 1,
wherein genes a)-d) are placed under the control of an inducible promoter, or
(iv) at least one host cell comprising said capsid or said vector, or
(v) any mixture thereof.

14. Pharmaceutical composition comprising:
(i) at least one capsid according to claim 1, or
(ii) at least one capsid obtainable by a production method comprising the following steps:
a) production of a phage T5 capsid devoid of genomic DNA and devoid of protein pb10; and
b) putting the capsid of step a) in contact with a fusion protein of claim 1 in order to obtain a decorated capsid; or
(iii) at least one vector comprising:
a) at least one gene coding for a protein having at least 80% identity with a capsid protein pb8;
b) at least one gene coding for a protein having at least 80% identity with a portal protein pb7;
c) at least one gene coding for a protein having at least 80% identity with a protease pb11; and
d) at least one gene coding for a fusion protein as defined in claim 1,
wherein genes a)-d) are placed under the control of an inducible promoter, or
(iv) at least one host cell comprising said capsid or said vector, or
(v) at least one nanoparticle comprising said capsid or said vector, or
(vi) any mixture thereof.

15. Method of treating or vaccinating a subject in need thereof, comprising administering to said subject:
(i) a capsid according to claim 1, or
(ii) a capsid obtainable by a production method comprising the following steps:
a) production of a phage T5 capsid devoid of genomic DNA and devoid of protein pb10; and
b) putting the capsid of step a) in contact with a fusion protein of claim 1 in order to obtain a decorated capsid; or
(iii) a vector comprising:
a) at least one gene coding for a protein having at least 80% identity with a capsid protein pb8;
b) at least one gene coding for a protein having at least 80% identity with a portal protein pb7;
c) at least one gene coding for a protein having at least 80% identity with a protease pb11; and
d) at least one gene coding for a fusion protein as defined in claim 1,
wherein genes a)-d) are placed under the control of an inducible promoter, or
(iv) a host cell comprising said capsid or said vector, or
(v) a nanoparticle comprising said capsid or said vector, or
(vi) a pharmaceutical composition comprising said capsid, said vector, said host cell, or said nanoparticle.

16. Method of treating or preventing at least one selected from the group consisting of an infection; an autoimmune disease; a metabolic disease; a dermatological disease, a cardiovascular disease; a respiratory disease; a neurodegenerative disease; a genetic disease; an endocrine disease; a psychiatric illness; a cancer; and a disease linked to an infection and/or a toxin;
said method comprising administering to a subject in need thereof:
(i) a capsid according to claim 1, or
(ii) a capsid obtainable by a production method comprising the following steps:
a) production of a phage T5 capsid devoid of genomic DNA and devoid of protein pb10; and
b) putting the capsid of step a) in contact with a fusion protein of claim 1 in order to obtain a decorated capsid; or
(iii) a vector comprising:
a) at least one gene coding for a protein having at least 80% identity with a capsid protein pb8;
b) at least one gene coding for a protein having at least 80% identity with a portal protein pb7;
c) at least one gene coding for a protein having at least 80% identity with a protease pb11; and
d) at least one gene coding for a fusion protein as defined in claim 1,
wherein genes a)-d) are placed under the control of an inducible promoter, or
(iv) a host cell comprising said capsid or said vector, or
(v) a nanoparticle comprising said capsid or said vector, or
(vi) a pharmaceutical composition comprising said capsid, said vector, said host cell, or said nanoparticle.

17. Capsid obtainable by or obtained by a production method comprising the following steps:
a) production of a phage T5 capsid devoid of genomic DNA and devoid of protein pb10; and
b) putting the capsid of step a) in contact with a fusion protein of claim 1 in order to obtain a decorated capsid.

18. Capsid according to claim 1, wherein the fragment of the decoration protein pb10 comprises at least 76 consecutive amino acids of the N-terminal domain of a protein pb10.

19. The method according to claim 7, wherein said bacterium is of the *Escherichia* genus.

20. The method according to claim 8, wherein said bacterium is of the *Escherichia* genus.

* * * * *